United States Patent
Tsuji et al.

[19]

[11] Patent Number: 6,108,459
[45] Date of Patent: Aug. 22, 2000

[54] METHOD AND APPARATUS FOR PROCESSING AN IMAGE

[75] Inventors: Hiroyuki Tsuji, Yokohama; Akiko Kanno, Kashiwa; Yoshinobu Umeda, Tokyo, all of Japan

[73] Assignee: Canon Kabushiki Kaisha, Tokyo, Japan

[21] Appl. No.: 08/873,165

[22] Filed: Jun. 11, 1997

[30] Foreign Application Priority Data

Jun. 11, 1996 [JP] Japan .................................. 8-170735
Feb. 4, 1997 [JP] Japan .................................. 9-035648
Feb. 4, 1997 [JP] Japan .................................. 9-035649

[51] Int. Cl.[7] .................................................. G06K 9/32
[52] U.S. Cl. .................... 382/300; 382/276; 382/282; 358/452; 358/537
[58] Field of Search ......................... 382/382, 309–311, 382/282, 298–301, 276, 232; 358/451–453, 504, 406, 296, 500, 1.2, 537, 428, 525, 426, 261.4, 448, 434; 345/156, 326, 127–130, 328

[56] References Cited

U.S. PATENT DOCUMENTS

| | | | |
|---|---|---|---|
| 5,058,189 | 10/1991 | Kanno | 382/282 |
| 5,109,434 | 4/1992 | Shimizu et al. | 382/276 |
| 5,113,251 | 5/1992 | Ichiyanagi et al. | 358/500 |
| 5,361,141 | 11/1994 | Ayoma | 358/452 |
| 5,371,610 | 12/1994 | Sugawa | 358/434 |
| 5,398,293 | 3/1995 | Sato et al. | 382/309 |
| 5,408,328 | 4/1995 | Boliek et al. | 358/261.4 |
| 5,576,847 | 11/1996 | Sekine et al. | 358/448 |
| 5,631,980 | 5/1997 | Maruoka | 382/276 |

*Primary Examiner*—Leo H Boudreau
*Assistant Examiner*—Ishrat Sherali
*Attorney, Agent, or Firm*—Fitzpatrick, Cella, Harper & Scinto

[57] ABSTRACT

A method and apparatus for processing an image is characterized in that an interpolation processing circuit performs interpolation on an edit area signal output from a memory with reference to an image data which has not been subjected to the interpolation thereby reducing a gap (white gap) between an image edge and an edit area without having to increase the required memory capacity.

24 Claims, 39 Drawing Sheets

FIG. 6

| | INPUT | | | | | | | | OUTPUT |
|---|---|---|---|---|---|---|---|---|---|
| | OUTPUT OF THE SELECTOR 502 | | OUTPUT OF THE SELECTOR 501 | | OUTPUT OF THE SECOND ONE-LINE MEMORY 505 | | | | |
| NUMBER OF INPUT LINES | j/4 | | j | j | j-1 | j-1 | j-1 | | |
| NUMBER OF INPUT PIXELS | | i/4 | i | i+1 | i+1 | i | i-1 | | |
| | 1 | x | x | x | x | x | x | | 1 |
| | 0 | 1 | x | x | x | x | x | | 0 |
| | 0 | 0 | 0 | 0 | 0 | 0 | 0 | PATTERN 0 | (i-1, j) or (i-1, j-1) or (i, j-1) or (i+1, j-1) |
| | 0 | 0 | 0 | 0 | 0 | 0 | 1 | PATTERN 1 | (i-1, j) or (i, j-1) or (i+1, j-1) |
| | 0 | 0 | 0 | 0 | 0 | 1 | 0 | PATTERN 2 | (i-1, j) or (i-1, j-1) |
| | 0 | 0 | 0 | 0 | 0 | 1 | 1 | PATTERN 3 | (i-1, j) or (i-1, j-1) |
| | 0 | 0 | 0 | 0 | 1 | 0 | 0 | PATTERN 4 | (i-1, j) or (i, j-1) or (i+1, j-1) |
| | 0 | 0 | 0 | 0 | 1 | 0 | 1 | PATTERN 5 | (i-1, j) or (i, j-1) |
| | 0 | 0 | 0 | 0 | 1 | 1 | 0 | PATTERN 6 | (i-1, j) |
| | 0 | 0 | 0 | 0 | 1 | 1 | 1 | PATTERN 7 | (i-1, j) |
| | 0 | 0 | 0 | 1 | 0 | 0 | 0 | PATTERN 8 | (i-1, j-1) or (i, j-1) or (i+1, j-1) |
| | 0 | 0 | 0 | 1 | 0 | 0 | 1 | PATTERN 9 | (i-1, j-1) or (i, j-1) |
| | 0 | 0 | 0 | 1 | 0 | 1 | 0 | PATTERN 10 | DATA IN THE PERIPHERAL DATA MEMORY 503 |
| | 0 | 0 | 0 | 1 | 0 | 1 | 1 | PATTERN 11 | DATA IN THE PERIPHERAL DATA MEMORY 503 |
| | 0 | 0 | 0 | 1 | 1 | 0 | 0 | PATTERN 12 | (i, j-1) or (i+1, j-1) |
| | 0 | 0 | 0 | 1 | 1 | 0 | 1 | PATTERN 13 | (i, j-1) |
| | 0 | 0 | 0 | 1 | 1 | 1 | 0 | PATTERN 14 | DATA IN THE PERIPHERAL DATA MEMORY 503 |
| | 0 | 0 | 0 | 1 | 1 | 1 | 1 | PATTERN 15 | DATA IN THE PERIPHERAL DATA MEMORY 503 |

| a | b | c |
|---|---|---|
| d | e | f |
| g | h | i |

| 1 | 0 | 0 |
|---|---|---|
| 1 | 1 | 0 |
| 1 | 1 | 0 |

| 1 | 1 | 0 | 0 |
|---|---|---|---|
| 1 | 1 | 1 | 0 |
| 1 | 1 | 1 | 0 |
| 1 | 1 | 1 | 1 |

FIG. 19A
FIG. 19B
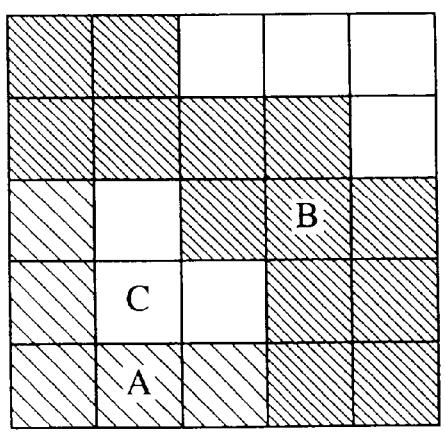
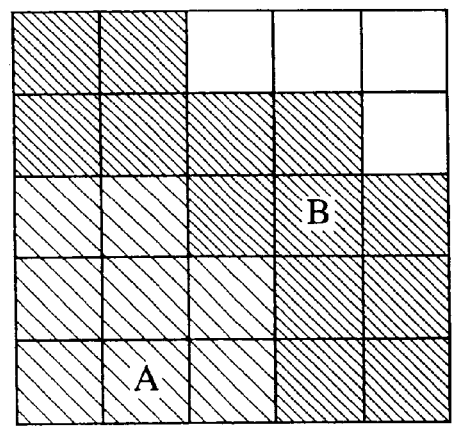

FIG. 28

| | | INPUT | | | | | | OUTPUT |
|---|---|---|---|---|---|---|---|---|
| | OUTPUT OF THE SELECTOR 2501 | OUTPUT OF THE DATA MEMORY 1508 | | OUTPUT OF THE SECOND ONE-LINE MEMORY 2504 | | | | |
| NUMBER OF INPUT LINES | j/4 | j | j | j-1 | j-1 | j-1 | | |
| NUMBER OF INPUT PIXELS | i/4 | i | i+1 | i+1 | i | i-1 | | |
| | 1 | x | x | x | x | x | | 1 |
| | 0 | 1 | x | x | x | x | | 0 |
| | 0 | 0 | 0 | 0 | 0 | 0 | PATTERN 0 | (i-1, j) or (i-1, j-1) or (i, j-1) or (i+1, j-1) |
| | 0 | 0 | 0 | 0 | 0 | 1 | PATTERN 1 | (i-1, j) or (i, j-1) or (i+1, j-1) |
| | 0 | 0 | 0 | 0 | 1 | 0 | PATTERN 2 | (i-1, j) or (i-1, j-1) |
| | 0 | 0 | 0 | 0 | 1 | 1 | PATTERN 3 | (i-1, j) or (i-1, j-1) |
| | 0 | 0 | 0 | 1 | 0 | 0 | PATTERN 4 | (i-1, j) or (i, j-1) or (i+1, j-1) |
| | 0 | 0 | 0 | 1 | 0 | 1 | PATTERN 5 | (i-1, j) or (i, j-1) |
| | 0 | 0 | 0 | 1 | 1 | 0 | PATTERN 6 | (i-1, j) |
| | 0 | 0 | 0 | 1 | 1 | 1 | PATTERN 7 | (i-1, j) |
| | 0 | 0 | 1 | 0 | 0 | 0 | PATTERN 8 | (i-1, j-1) or (i, j-1) or (i+1, j-1) |
| | 0 | 0 | 1 | 0 | 0 | 1 | PATTERN 9 | (i-1, j-1) or (i, j-1) |
| | 0 | 0 | 1 | 0 | 1 | 0 | PATTERN 10 | DATA IN THE PERIPHERAL DATA MEMORY 2502 |
| | 0 | 0 | 1 | 0 | 1 | 1 | PATTERN 11 | DATA IN THE PERIPHERAL DATA MEMORY 2502 |
| | 0 | 0 | 1 | 1 | 0 | 0 | PATTERN 12 | (i, j-1) or (i+1, j-1) |
| | 0 | 0 | 1 | 1 | 0 | 1 | PATTERN 13 | (i, j-1) |
| | 0 | 0 | 1 | 1 | 1 | 0 | PATTERN 14 | DATA IN THE PERIPHERAL DATA MEMORY 2502 |
| | 0 | 0 | 1 | 1 | 1 | 1 | PATTERN 15 | DATA IN THE PERIPHERAL DATA MEMORY 2502 |

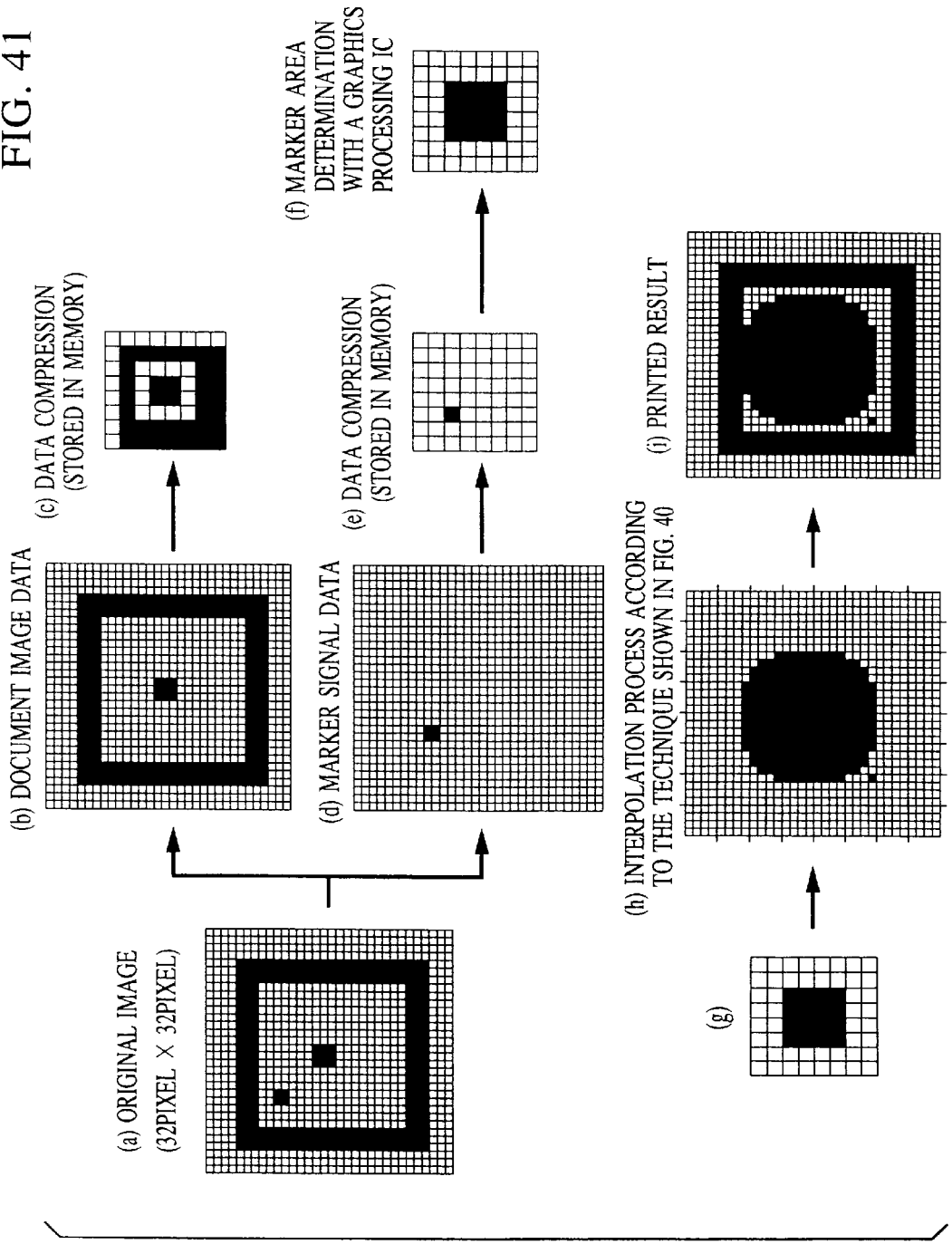

METHOD AND APPARATUS FOR PROCESSING AN IMAGE

BACKGROUND OF THE INVENTION

1. Field of the Invention

The present invention relates to an image processing method and apparatus by which an edit process is performed on an image for a particular area specified by a user, and an image processing operation during the operation of generating an image is switched in synchronization with the output of a bit-map memory in which a processing area is generated beforehand. The present invention also relates to a storage medium for use with such an image processing method and apparatus.

2. Description of the Related Art

A widely-used technique for a user to tell a copying machine which area should be edited is to specify an area using a pointing device such as a digitizer or to specify an area by writing a point or a closed curve on a document with a marker.

The information about the point or closed curve given via the pointing device or the marker is written into a memory via an image sensing device such as a CCD (charge-coupled device) or data representing such information is stored in a memory by a CPU at an address corresponding to the specified location on the document. The area is then expanded to the boundary or edge of a particular pattern area using an area generator IC (integrated circuit) and thus the area to be edited is finally defined.

FIGS. 35–38 are schematic diagrams illustrating the process of shading the edit area defined in the above-described manner.

FIG. 35 illustrates an example of a printing operation performed on a particular edit area specified by a single point given by a marker. More specifically, a closed area 3502 of a document is specified as an edit area by writing a point 3501 inside the area 3502 with a digitizer as shown in FIG. 35a, and the image of the document is sensed via a CCD. FIG. 35b illustrates a printed result corresponding to FIG. 35a. As can be seen from FIG. 35, the particular area specified as the edit area by writing the point 3501 inside the area 3502 as shown in FIG. 35a is expanded to the entire area 3503 corresponding to the inner area 3502, and the expanded area 3503 is shaded as shown in FIG. 35b.

FIG. 36a illustrates a document in which a particular area is specified as an edit area 3602 by a closed curve 3601 drawn by a marker, and which is to be sensed via a CCD. FIG. 36b illustrates a printed result corresponding to FIG. 36a. In this case, as shown in FIG. 36, the circular area 3602 surrounded by the closed curve 3601 shown in FIG. 36a is specified as an edit area, and this specified area is shaded as shown in FIG. 36b.

FIG. 37 illustrates an example of a printing operation performed on a particular edit area specified by a single point written via a digitizer. More specifically, an area 3702 of a document is specified as an edit area by writing a point 3701 inside the area 3702 with a digitizer as shown in FIG. 37a, and the document is sensed via the CCD. FIG. 37b illustrates a printed result corresponding to FIG. 37a. As can be seen from FIG. 37, the particular area is specified as an edit area by writing the point 3701 inside the area 3702 as shown in FIG. 37a, and then the point is expanded to an area 3703 corresponding to the entire inner area 3702, and the expanded area 3703 is shaded as shown in FIG. 37b.

FIG. 38 illustrates an example of a printing operation performed on a particular edit area specified by two points written via a digitizer. More specifically, an edit area of a document is defined by the locations of two points 3801-1 and 3801-2 as shown in FIG. 38a, and the document is sensed via the CCD. FIG. 38b illustrates a printed result corresponding to FIG. 38a. As shown in FIG. 38, the particular edit area in the form of a rectangle whose diagonal is defined by the two points 3801-1 and 3801-2 shown in FIG. 38a is shaded as shown in FIG. 38b.

The area expansion process from a point (points) or a curve written with a marker or a digitizer to a final edit area should be performed before a printer section starts a printing operation. That is, in a copying operation, a document is sensed via the CCD, and obtained image data (boundary data) and data representing an edit area specified with a marker or the digitizer are stored in a memory. Then edit area expanding process is performed on the data stored in the memory as shown in FIGS. 35–38. After the edit area expansion process, the document is sensed again via the CCD wherein the image data of the edit area stored in the memory is also read out in synchronization with the operation of sensing the document so that an editing process such as coloring is performed on the particular part of the document corresponding to the specified edit area.

In the above technique, if the image data of the entire page of a document and the data representing an edit area specified by a marker or the digitizer are stored in the memory, the memory has to have a great capacity. This causes an increase in cost. Furthermore, the edit area expansion takes a long time, and thus a long time is needed to perform a copying operation.

One common technique to avoid the above problems is to compress (or thin) the image data before storing it into a memory so as to reduce the amount of data to be stored in the memory. When data is read from the memory, interpolation is performed so as to obtain data corresponding to the original image data, and an editing operation is performed on the data obtained via the interpolation process.

FIG. 39 illustrates a specific example of the data compression technique. In FIG. 39, flip-flops (F/Fs) 3901a–3901l cause the input image data to have a delay corresponding to one pixel in the direction (main scanning direction) in which the CCD senses the image data. One-line delay circuits 3902a–3902c store one line of image data sensed in the main scanning direction and output the stored image data so that the output image data has a delay corresponding to one line in a direction (sub-scanning direction) perpendicular to the main scanning direction of the CCD. An OR gate 3903 performs an OR operation on input data associated with 16 lines and outputs a resultant signal. A timing control circuit 3904 outputs an enable signal so that one pixel is enabled every four pixels and one line is enabled every four lines. In response to an enable signal output from the timing control circuit 3904, a flip-flop (F/F) 3905 with an enable terminal (ENB) 3905 a gets output data of the OR gate 3903 and outputs the obtained data.

With the arrangement described above, the data reduction block shown in FIG. 39 performs an OR operation on the 4 lines×4 pixels image data and outputs a resultant data to the memory. That is, 4×4 pixel data is reduced to 1-pixel data and thus the amount of data is reduced to 1/16.

The data which has been reduced by the process described above in conjunction with FIG. 39 may be expanded for example using 4×4 interpolation by means of a pattern matching operation as shown in FIG. 40. In FIG. 40, the data output from the memory is given to the respective locations a, b, c, d, e, f, g, h, and i. Then the values for neighboring pixels around e are calculated using the values of other pixels by means of interpolation according to the equations shown in FIG. 40. For example, the value for a pixel located above and on the left of the pixel e is determined in such a manner that the value of the pixel d is employed as the value of the pixel of interest when all the values of the pixels a, b, d, and g are equal, while the value of either d or e which is greater than the other is employed when the values of pixels a, b, and d are equal.

FIG. 41 illustrates an example of an edit area signal obtained by performing data reduction on an input image data using the technique described above in conjunction with FIG. 39 and further performing data interpolation illustrated in FIG. 40 thereby expanding the edit area. In this figure, (a) illustrates an original image, (b) image data of document, (c) image data of document after subjected to data reduction (and stored in memory), (d) marker signal data, (e) marker signal data after subjected to data reduction (and stored in memory), (f) and (g) a marker area determined on the basis of the reduced image data of the document and the reduced data of marker signal, (h) interpolation process according to the technique shown in FIG. 40, and (i) printed result.

In the above technique, because data reduction is performed on the input data before it is stored in the memory and then interpolation is performed on the data expanded to the edit area on the memory as described above in conjunction with FIGS. 39 and 40, a gap (white gap) is produced between the edit area and the boundary line (represented by a black line) on the document as shown in FIG. 41$i$, and thus the editing process is not performed for all the area inside the boundary. The above problem is particularly serious when the boundary line to be printed is black.

In the conventional technique described above, the area memory used in the editing process requires as large a capacity as 400 Mbytes to process an A3-size image with a resolution of 400 dpi, and the required memory capacity increases with the number of edit areas. To reduce the memory capacity, the area is generated so that it has a lower resolution than the original image signal. However, the image becomes rough particularly in slanted lines compared with the original image. Furthermore, in the case where a particular area of an input image surrounded by a closed curve is filled with a color, fine structures such as thin lines or narrow gaps cannot be represented because of the poor resolution of the image store in the memory.

SUMMARY OF THE INVENTION

In view of the problems in the conventional techniques described above, it is an object of the present invention to provide an image processing method and apparatus capable of suppressing the generation of a gap between an edit area and a boundary without increasing memory capacity.

It is another object of the present invention to provide an image processing method and apparatus capable of generating a smoother area and obtaining a more natural image with less memory capacity.

It is still another object of the present invention to provide a storage medium which can properly control the above image processing apparatus.

According to an aspect of the present invention, there is provided a method of processing an image, including: a document scanning step in which a document is scanned and sensed; a data extracting step in which data used to specify an image edit area is extracted from the document image data obtained in the document scanning step; a data compression step in which the document image data obtained in the document scanning step is compressed thereby generating first data; a first data storing step in which the first data generated in the data compression step is stored in a memory; a position detecting step in which the location, on the document, of the data specifying the image edit area extracted in the data extracting step is detected; a second data storing step in which second data is stored in a memory at a particular location according to the output obtained in the position detecting step; a calculation step in which a calculation is performed using the first data and the second data; a calculation result storing step in which the calculation result of the calculation step is stored in a memory; a data expanding step in which data is expanded with reference to the document image data obtained in the document scanning step and the data stored in the memory; an edit area determining step in which the data expanded in the data expanding step is employed as an edit area; and an image editing step in which a predetermined editing process is performed on the document image data obtained in the document scanning step in accordance with the output of the edit area determining step.

According to another aspect of the invention, there is provided an apparatus for processing an image, including: document scanning means for scanning and sensing a document; data extracting means for extracting data used to specify an image edit area from the document image data obtained by the document scanning means; data compression means for compressing the document image data obtained in the document scanning means thereby generating first data; first data storing means for storing the first data generated by the data compression means in a memory; position detecting means for detecting the location, on the document, of the data specifying the image edit area extracted by the data extracting means; second data storing means for storing second data in a memory at a particular location according to the output of the position detecting means; calculation means for performing a calculation using the first data and the second data; calculation result storing means for storing the calculation result of the calculation means in a memory; data expanding means for expanding data with reference to the document image data obtained by the document scanning means and the data stored in the memory; edit area determining means for employing the data expanded by the data expanding means as an edit area; and image editing means for performing a predetermined editing process on the document image data obtained by the document scanning means in accordance with the output of the edit area determining means.

According to still another aspect of the invention, there is provided a method of processing an image, including: a processing area specifying step in which an image processing area is specified; a processing area generating step in which an image processing area is generated in accordance with the input given in the processing area specifying step; and a resolution converting step in which the resolution of the output signal generated in the processing area generating step is converted to a value higher than that of the input signal given in the processing area specifying step; wherein the resolution converting step includes: a pattern comparing step in which the shape of a part of the area generated in the processing area generating step is compared with a plurality of shape patterns; and a switching step in which the conversion mode in the resolution converting step is switched in accordance with the comparison result obtained in the pattern comparing step.

According to a further aspect of the invention, there is provided an apparatus for processing an image, including:

processing area specifying means for specifying an image processing area; processing area generating means for generating an image processing area in accordance with the input of the processing area specifying means; and resolution converting means for converting the resolution of the output signal generated by the processing area generating means to a value higher than that of the input signal of the processing area specifying means; wherein the resolution converting means includes: pattern comparing means for comparing the shape of a part of the area generated by the processing area generating means with a plurality of shape patterns; and switching means for switching the conversion mode of the resolution converting means in accordance with the comparison result given by the pattern comparing means.

These and other objects and advantages of the present invention will become more apparent from the following detailed description.

BRIEF DESCRIPTION OF THE DRAWINGS

FIG. 6 is an input-output correspondence table associated with a calculation unit in the interpolation processing circuit;

FIGS. 19 A&B illustrate an example of the process performed on a portion located in the vicinity of and outside of a closed loop area;

FIG. 28 is a correspondence table illustrating the relationship between the input and output data of a calculation unit of the interpolation processing circuit;

FIG. 41 is a schematic representation of the interpolation process performed on a data, which has been projected to data compression, in accordance with the equations shown in FIG. 40.

DESCRIPTION OF THE PREFERRED EMBODIMENTS

The present invention will be described in further detail below with reference to preferred embodiments in conjunction with the accompanying drawings.

First Embodiment

Figure 1:
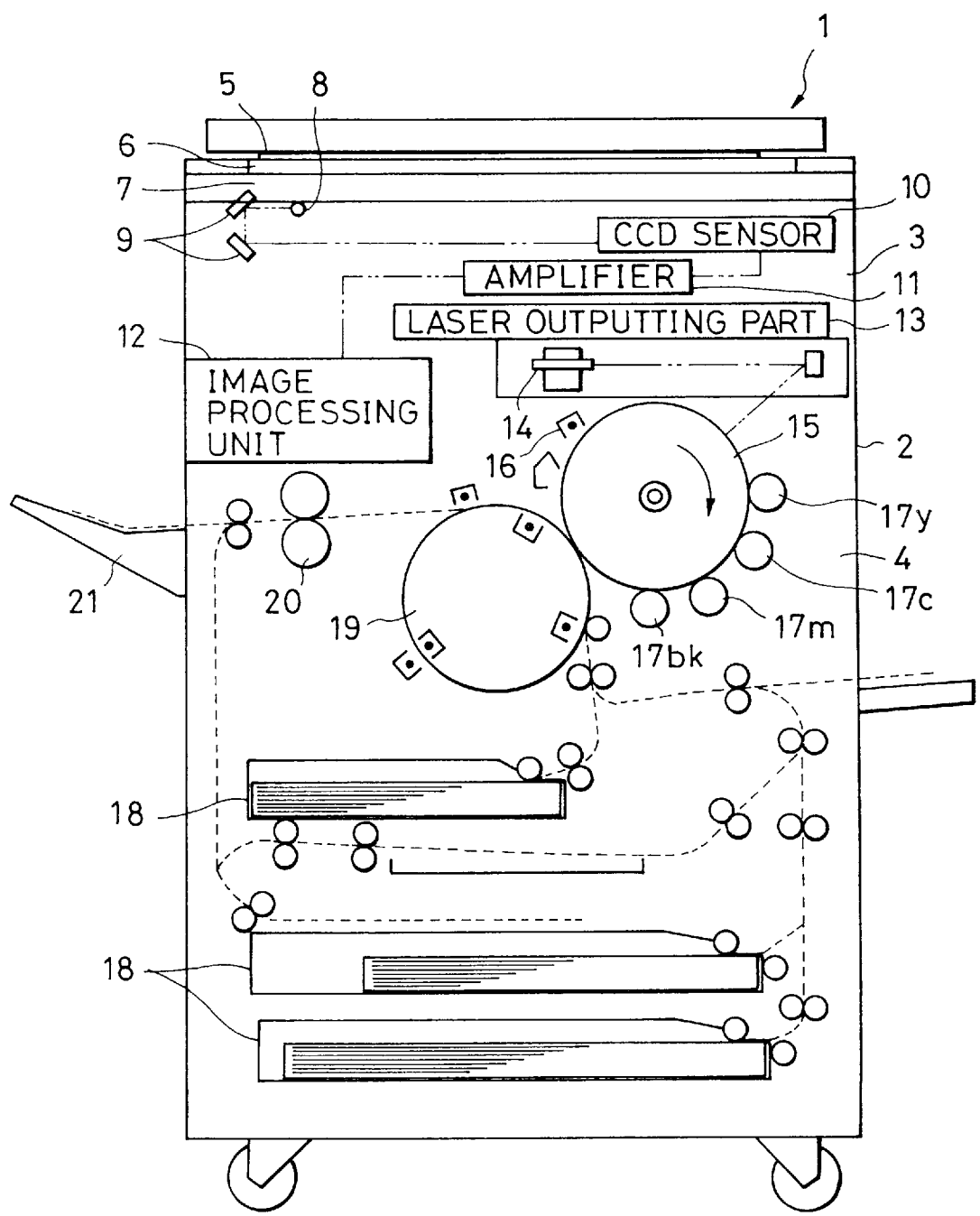
FIG. 1 is a side view illustrating the internal structure of an image processing apparatus according to a first embodiment of the invention.
Figure 2:
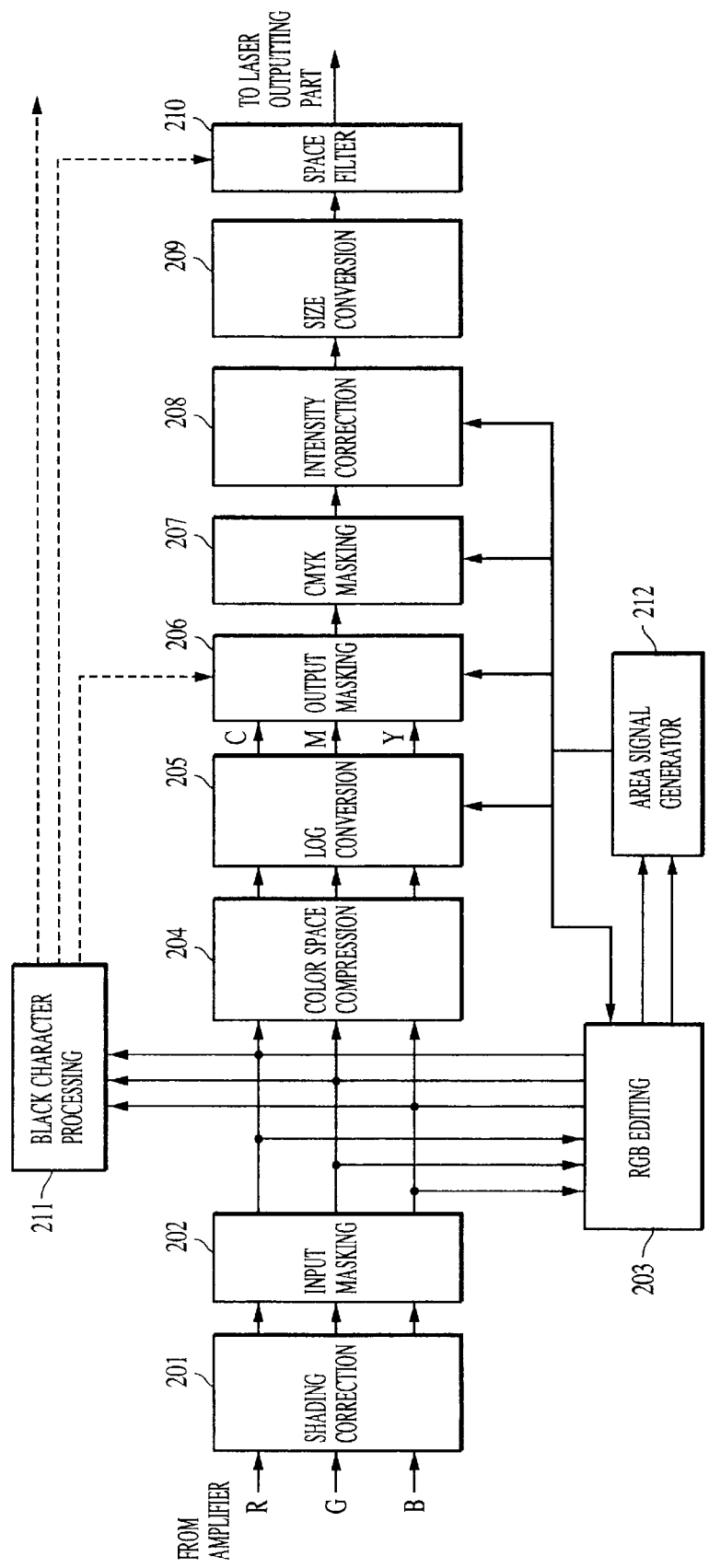
FIG. 2 is a block diagram illustrating the internal structure of an image processing unit in the image processing apparatus.
Figure 3:
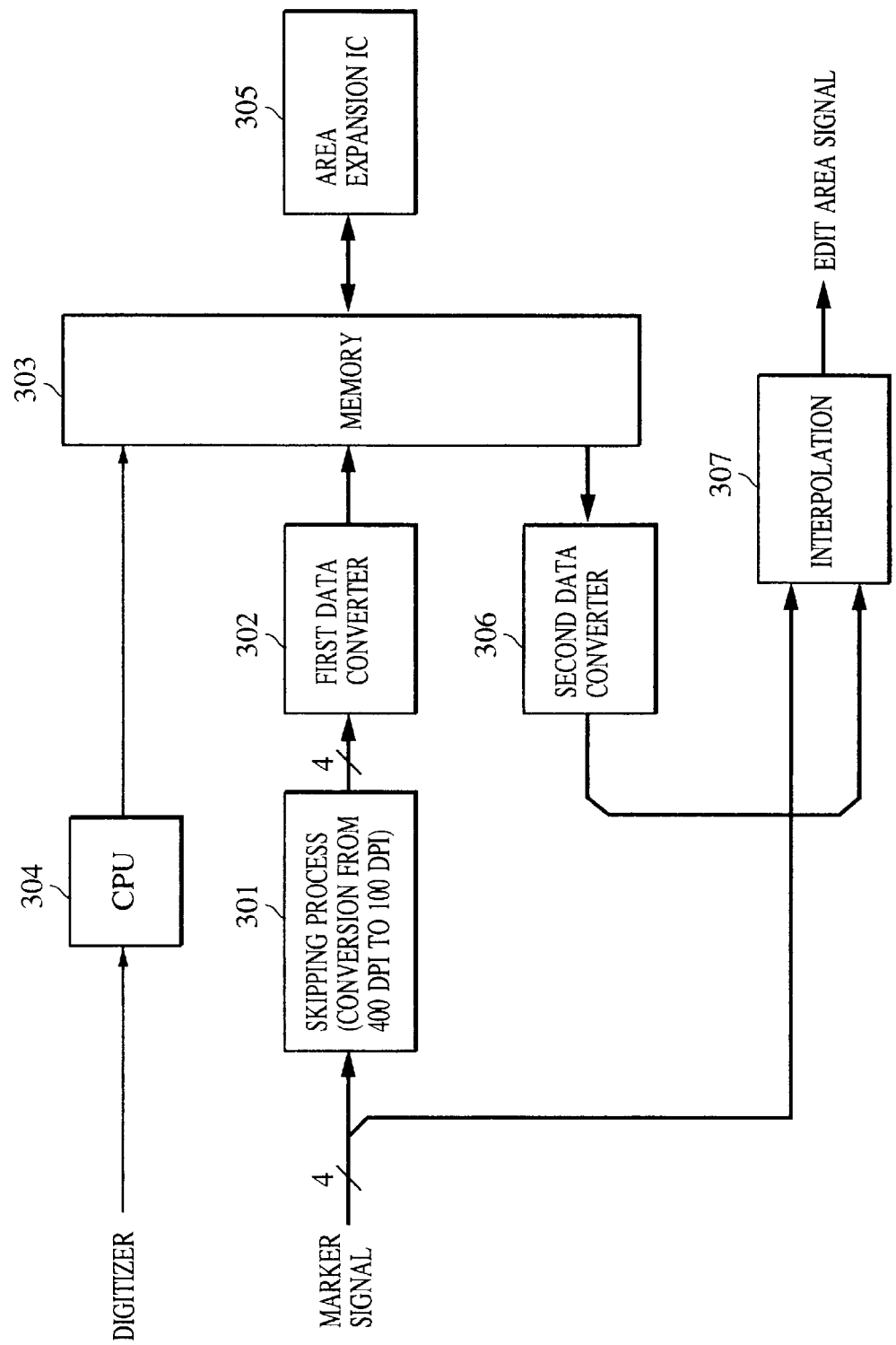
FIG. 3 is a block diagram illustrating the internal structure of an area signal generator in the image processing unit.
Figure 4:
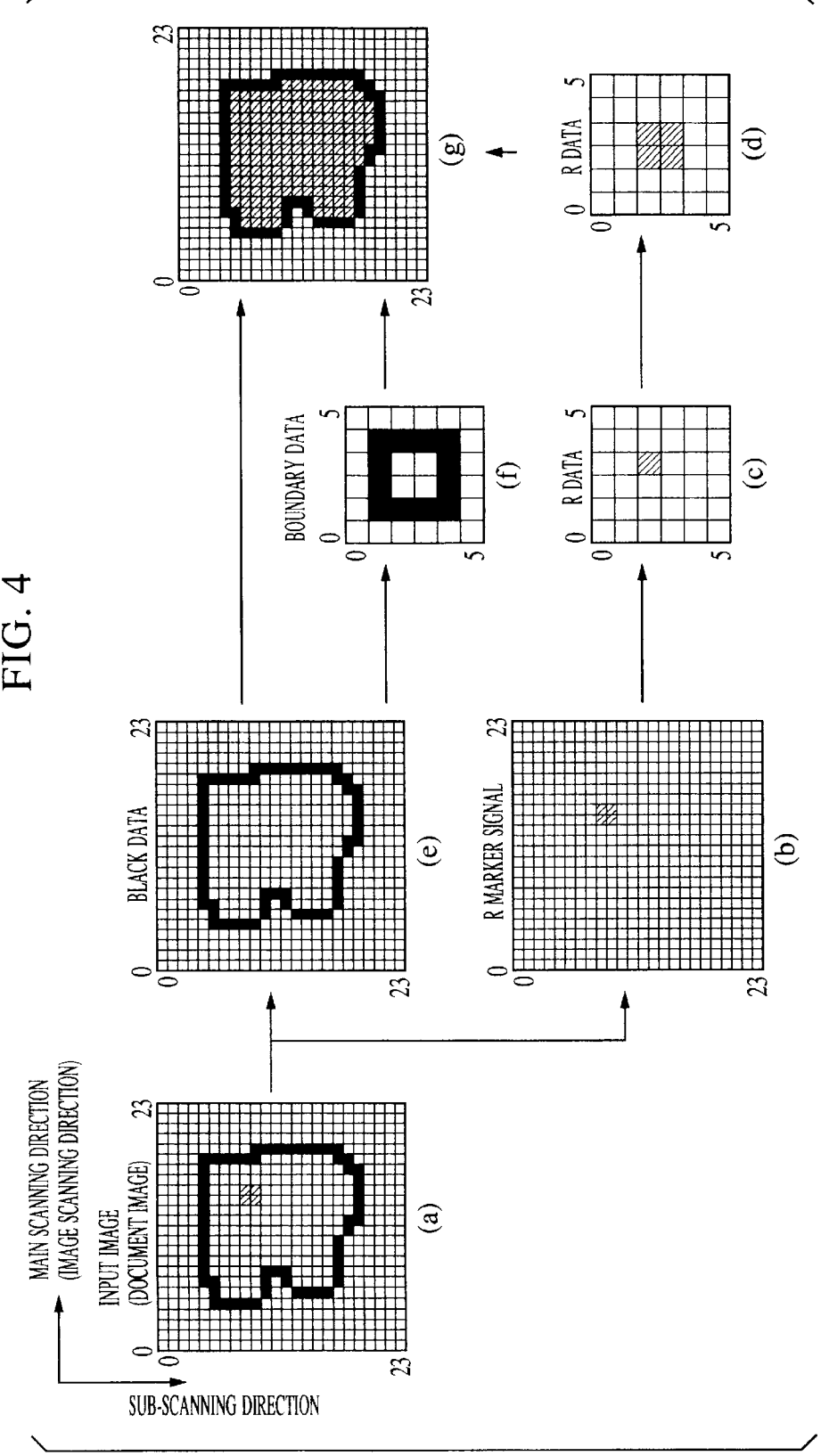
FIG. 4 is a schematic diagram illustrating the output result obtained by performing interpolating process using an interpolation processing circuit of the area signal generator.
Figure 5:
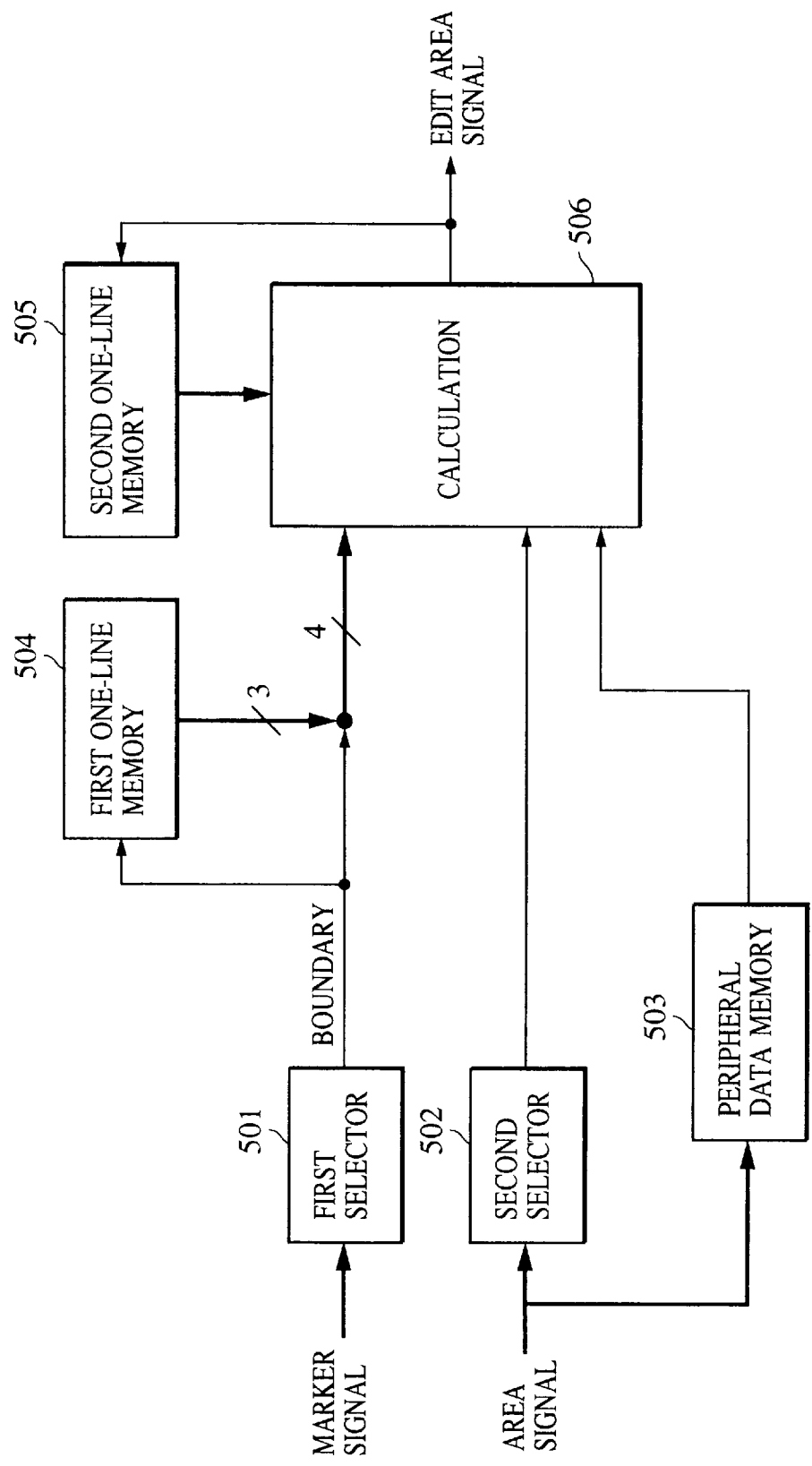
FIG. 5 is a block diagram illustrating the internal structure of the interpolation processing circuit in the area signal generator.
Figure 7:
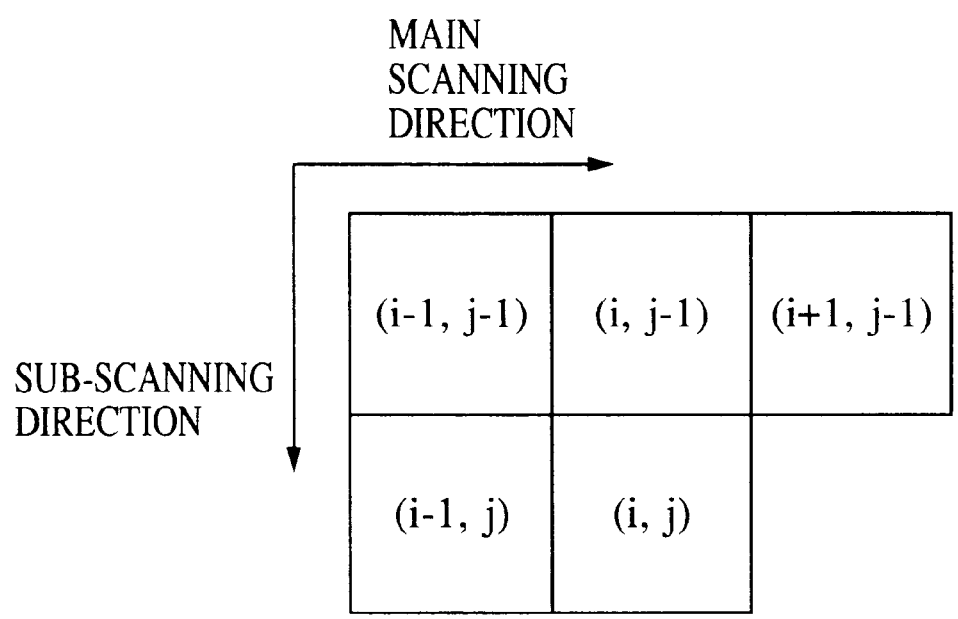
FIG. 7 is a schematic diagram illustrating the relationship between the data processed by the calculation unit and the scanning direction.

Referring to FIGS. 1 to 7, a first embodiment of the invention will be described below. FIG. 1 is a side view illustrating the internal structure of an image processing apparatus according to a first embodiment of the invention. FIG. 2 is a block diagram illustrating the internal structure of an image processing unit in the image processing apparatus shown in FIG. 1. FIG. 3 is a block diagram illustrating the internal structure of an area signal generator in the image processing unit shown in FIG. 2. FIG. 5 is a block diagram illustrating the internal structure of an interpolation processing circuit in the area signal generator shown in FIG. 3. FIG. 4 is a schematic diagram illustrating the output result obtained by performing interpolating process using the interpolation processing circuit shown in FIG. 5. FIG. 6 is an input-output correspondence table associated with a calculation unit in the interpolation processing circuit shown in FIG. 5. FIG. 7 is a schematic diagram illustrating the relationships among the number of input lines, the number of input pixels, and the scanning direction shown in the input-output correspondence table shown in FIG. 6.

In FIG. 1, reference numeral 1 denotes an image processing apparatus (a digital color copying machine in this specific embodiment) including a digital color image scanner unit (hereinafter referred to simply as a scanner unit) 3 disposed at an upper location inside the case 2 and a digital color image printer unit (hereinafter referred to simply as a printer unit) 4 disposed below the scanner unit 3.

In the scanner unit 3, if a document 5 is placed on a document glass plate 6 and a start button (not shown) on a control panel 7 is pressed, then an operation is started. The document 5 is scanned and exposed by an exposure lamp 8 and the light reflected from the document 5 is focused via a lens 9 onto a full color sensor (CCD sensor) 10 thereby obtaining an image signal for each separated color. In the present embodiment, a 3-line CCD with R (red), G (green), and B (blue) filters located adjacent to each other is employed as the full color sensor 10. The image signal for each separated color is supplied via an amplifier 11 to the image processing unit 12 and subjected to image processing including edit processing. The resultant data is supplied to the printer unit 4.

In the printer unit 4, the image signal from the scanner unit 3 is supplied to a laser unit 13 and converted to a laser beam signal. The laser beam is reflected by a polygon mirror 14 and then projected onto the surface of a photosensitive drum 15. During an operation of forming an image, the photosensitive drum 15 is rotated in a clockwise direction (denoted by an arrow) as shown in the figure so that the photosensitive drum 15 is uniformly charged by a charger 16. The photosensitive drum 15 is then illuminated by optical images of the respective separated colors thereby forming a latent image thereon.

A proper developing unit of a plurality of developing units 17y, 17c, 17m, and 17bk is operated so as to develop the latent image thereby forming a toner image on the photosensitive drum 15. A recording medium (such as copying paper) is carried from a cassette 18 and wrapped around a transfer drum 19. The recording medium is carried by means of the rotation of the transfer drum 19 to a location where the recording medium faces the photosensitive drum 15. The above toner image is transferred to the recording medium. As the transfer drum 19 is rotated a plurality of times, the toner image of each color formed on the photosensitive drum 15 is transferred to the recording medium thereby forming a superimposed image on the recording medium. As described above, the image consisting of a desired number of colors is transferred to the recording medium thereby forming a full color image thereon.

In the case of a full color image, after a four-color toner image has been transferred, the recording medium is separated from the transfer drum 19 and transported to a copied-paper tray 21 via a fixing unit 20.

FIG. 2 illustrates the internal structure of the image processing unit 12. As shown in FIG. 2, the image processing unit 12 includes a shading correction circuit 201, an input masking circuit 202, an RGB edit circuit 203, a color space compression circuit 204, a light intensity-to-toner intensity level conversion (LOG conversion) circuit 205, an output masking circuit 206, a CMYK edit circuit 207, a gray level correction circuit 208, a size conversion circuit 209, a space filter 210, a black character processing circuit 211, and an area signal generator 212.

In FIG. 2, an image is sensed by the CCD sensor 10 (refer to FIG. 1) and then converted by the amplifier 11 (refer to FIG. 1) into digital image signals R, G, and B. The digital image signals R, G, and B are then supplied to the shading correction circuit 201 and subjected to correction in terms of angle deviation of illumination light emitted by the exposure lamp 8 (refer to FIG. 1) and in terms of sensitivity variation of the CCD sensor 10 (refer to FIG. 1). The signals are then converted by the input masking circuit 202 into three signals represented in the standard color space. The resultant signals are supplied to the RGB edit circuit 203 in which the signals are subjected to part of edit processing such as color conversion, mixing with an image supplied from an external device, or generation of a character processing signal. Then the color space compression circuit 204 compresses the color space associated with the signals so that the image may be represented within the color reproduction range of the printer unit 4 (refer to FIG. 1) without degrading the color quality of the document 5 (refer to FIG. 1). Furthermore, the LOG conversion circuit 205 converts the image signals R, G, and B representing light intensity to signals representing the density of developers (such as toners) of C (cyan), M (magenta), and Y (yellow).

The output masking circuit 206 located at the following stage converts the three-color signals of C, M, and Y to four-color signals of C, M, Y, and Bk depending on the spectrum characteristics of the developers. The resultant signals C, M, Y, and Bk are sequentially output one color to another so as to form an image. The CMYK edit circuit 207 performs additional edit processes such as painting and coloring. The signals are further processed by the gray-level correction circuit 209, the size conversion circuit 209, and the space filter 210, and finally supplied to the laser unit 13 (refer to FIG. 1).

On the other hand, the black character processing circuit 211 detects the degree of boldness, edges, and colors of the image from the image signals R, G, and B. In accordance with the detection result, the operation conditions of the output masking circuit 206, the coefficients of the space filter 210, and the number of line density scanned by the laser are adjusted. The area signal generator 212 generates an area signal in accordance with the area specified via a digitizer or a marker.

FIG. 3 illustrates the internal structure of area signal generator 212. As shown in FIG. 3, the area signal generator 212 includes a data compression unit 301, a first data converter 302, a memory 303, a CPU (central processing unit) 304, an area expansion IC 305, and a second data converter 306.

Referring to FIG. 3, the operation of the area signal generator 212 will be described below for a specific case where a 24 pixels×24 lines image data is sensed via the CCD sensor 10 (refer to FIG. 1) as shown in FIG. 4a. In FIG. 4a, a black line with a width equal to the size of one pixel denotes a black image and four shaded pixels denote a red marker.

At the beginning of the operation associated with the area signal generator 212, the CCD sensor 10 (refer to FIG. 1) scans and senses image data shown in FIG. 4a so as to detect an image area. A marker signal, which will be input to the area signal generator 212, is generated inside the RGB edit circuit 203 (refer to FIG. 2) from the data output from the CCD sensor 10. The marker signal consists of 4 bits representing black (K) data associated with the document image data and the respective marker colors R, G, and B.

FIG. 4b illustrates the input marker signal. In the following description, only the red marker signal and black data will be described.

Figure 39:
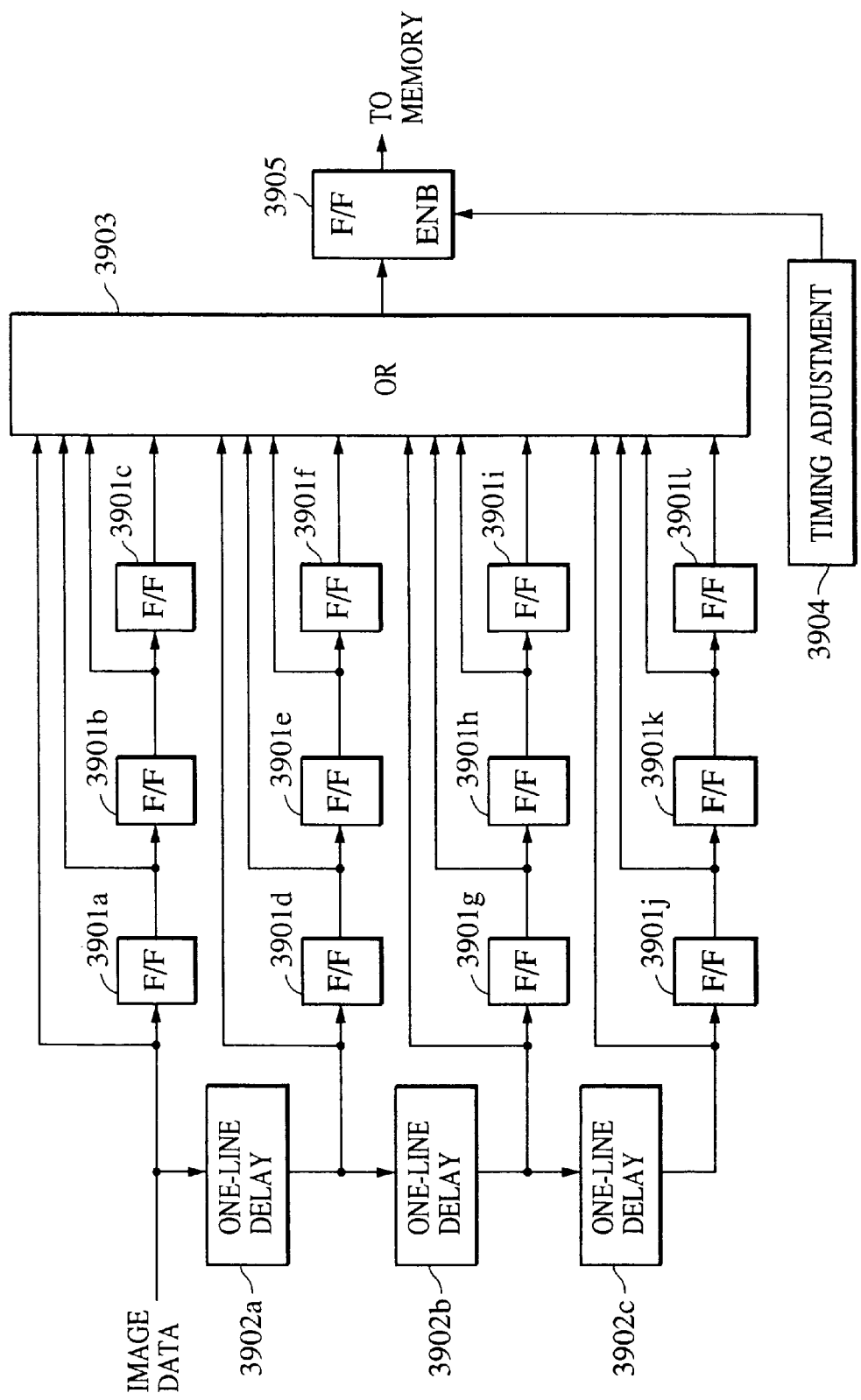
FIG. 39 is a block diagram illustrating the internal structure of an interpolation processing circuit for performing interpolation process on an image data.
Figure 40:
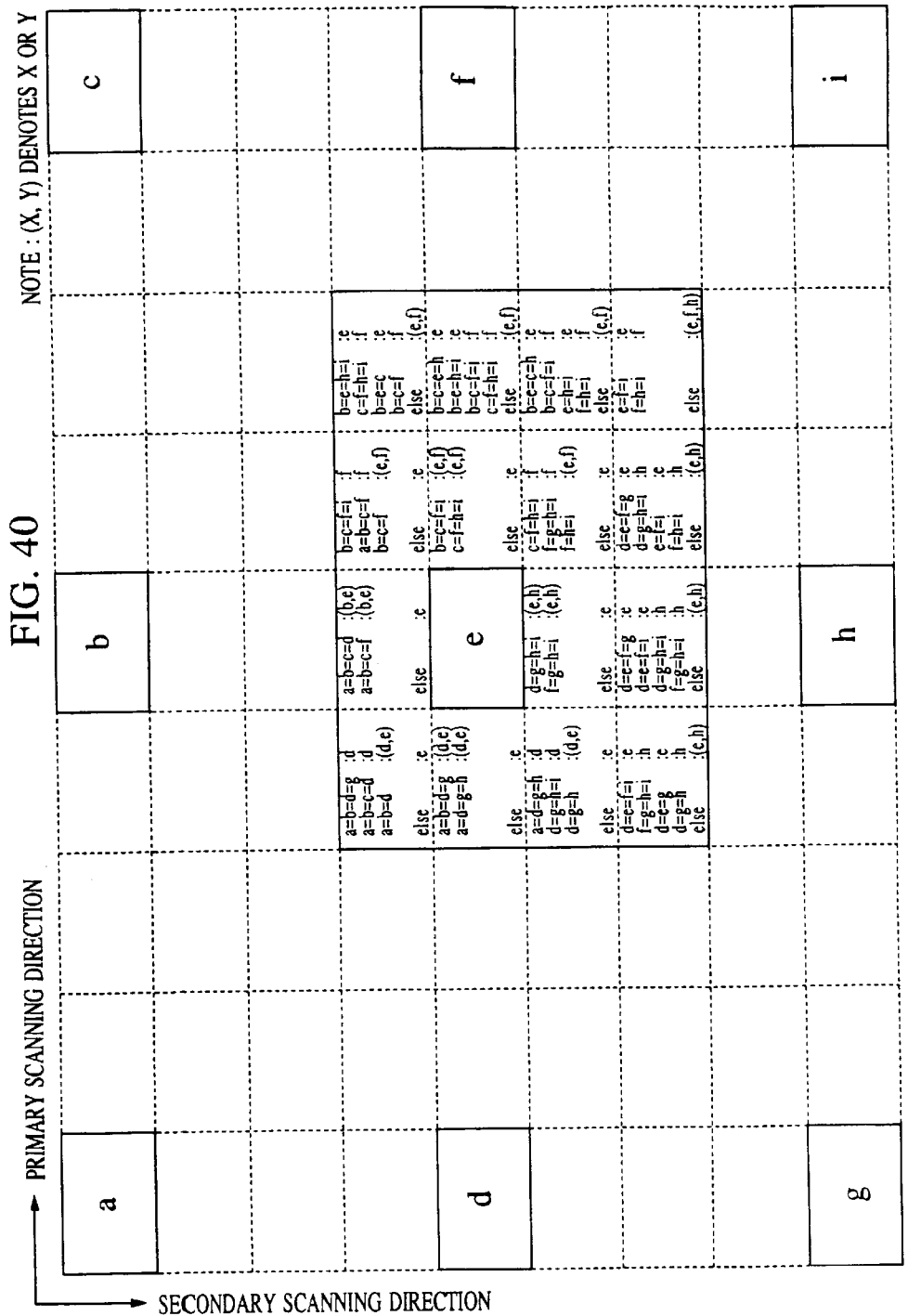
FIG. 40 illustrates equations used in the interpolation process on an image data.

If the area signal generator 212 receives the marker signal, the signal is supplied to the data compression unit 301 and subjected to data compression processing. The data compression unit 301 performs the data compression processing in a manner similar to that employed in the conventional technique described above with reference to the block diagram shown in FIG. 39. Thus, the marker signal which originally consists of 16 pixels or 4 pixels×4 lines is compressed to data consisting of one pixel, and the resultant data is output. The black data (FIG. 4e) input to the data compression unit 301 is also compressed in a similar manner and resultant data is output as shown in FIG. 4f.

The data output from the data compression unit 301 is supplied to the first data converter 302 and subjected to serial-to-parallel conversion. The resultant data is stored in the memory 303. The R marker signal shown in FIG. 4b extracted from the image data shown in FIG. 4a is compressed by the data compression unit 301 and the resultant compressed data is stored in the memory 303 via the data converter 302. FIG. 4c illustrates the data compressed and stored in the memory 303. The compressed black data shown in FIG. 4f is also stored in the memory 303.

After being compressed and stored in the memory 303, the R marker signal and black data are read out and supplied to the area expansion IC (integrated circuit) 305. The area expansion IC 305 expands the area represented by the R marker signal shown in FIG. 4c to the boundary line represented by the black data shown in FIG. 4f. In this specific example, a graphics processing IC AGDCII available from NEC is employed as the area expansion IC 305 for expanding the area. AGDCII has various drawing commands. Of these commands, "fill" command is used to expand the area. FIG. 4d illustrates an expanded area signal. The expanded area signal is stored in the memory 303.

After completion of the area expansion process by the area expansion IC 305, the CCD sensor 10 (refer to FIG. 1) starts an operation of scanning and sensing the image so as to obtain data used in printing operation. The second data converter 306 starts to read the data representing the expanded area from the memory 303 and performs process such as parallel-to-serial conversion which is inverse to the process performed by the data converter 302. In response to the marker signal supplied from the RGB edit circuit 203 (refer to FIG. 2), the data converter 302 outputs data to the interpolation processing circuit 307.

The interpolation processing circuit 307 performs interpolation processing with reference to the area signal output from the memory 303 and the marker signal supplied from the RGB edit circuit 203 (refer to FIG. 2). The result is output as an edit area signal (FIG. 4g).

The signal from the digitizer is input to the CPU 304. The output signal of the CPU 304 is stored in the memory 303.

FIG. 5 illustrates the internal structure of the interpolation processing circuit 307. In FIG. 5, a first selector 501 extracts the data representing the boundary line of the edit area from the marker signal received from the RGB edit circuit 203 (refer to FIG. 2) and outputs the extracted data. In this specific example, the black data shown in FIG. 4e is extracted. A second selector 502 extracts a signal, which will be used in a desired edit process, from the area signal output from the memory 303 (refer to FIG. 3). In this specific example, the area signal obtained from the R marker signal shown in FIG. 4d is extracted. For example, when interpolation process is performed to obtain an edit area signal for the data at the ith pixel on the jth line of the document shown in FIG. 4a, the data at the (i/4)th location in the main scanning direction and at the (j/4)th location in the sub-scanning direction is input to the second selector 502. The data at that location is read from the memory 303 (refer to FIG. 3) and supplied to the calculation unit 506 via the selector 502.

A neighboring data memory 503 is a memory area for storing data which is one pixel and one line ahead with respect to the data extracted by the second selector 502. For example, when interpolation process is performed to obtain an edit area signal for the data at the ith pixel on the jth line of the document, the data at the (i/4+1)th location in the main scanning direction and at the (j/4+1)th location in the sub-scanning direction is read from the memory 303 (refer to FIG. 3) and stored in the neighboring data memory 503. The stored data is supplied to the calculation unit 506 which will be described later. A first one-line memory 504 stores one-line data of the data representing the boundary line output from the first selector 501. For example, when the data at the (i+1)th pixel on the jth line is output from the first selector 501, the first one-line memory outputs the data at (i−1)th, ith, and (i+1)th pixels on the (j−1)th line of the boundary line data.

A second one-line memory 505 is a memory area for storing one-line data of the edit area signal output from the calculation unit 506 of the interpolation processing circuit 307 in the area signal generator 212. When data at the (i+1)th pixel on the jth line is output from the first selector 501, the second one-line memory 505 outputs an edit area signal at the (i−1)th pixel on the jth line, and at (i−1)th, ith, and (i+1)th pixels on the (j−1)th line. The calculation unit 506 generates an edit area signal using data received from the first and second selectors 501 and 502, the first line memory 504, the second line memory 505, and the neighboring data memory 503.

For example, when the calculation unit 506 generates an edit area signal at the ith pixel on the jth line, it uses an edit area signal at the (i−1)th pixel on the jth line and (i−1)th, ith, and (i+1)th pixels on the (j−1)th line from the second one-line memory 505; boundary line data at (i−1)th and ith pixels on the jth line and at (i−1)th, ith, and (i+1)th pixels on the (j−1)th line from the first selector 501 and the first one-line memory 504; memory data at the (i/4)th pixel on the (j/4)th line and also memory data at the (i/4+1)th pixel on the (j/4+1)th line from the second selector 502 and the neighboring data memory 503.

FIG. 6 illustrates the correspondence between the input data and the value output as an edit area signal. FIG. 7 illustrates the relationships among the number of lines, the number of input pixels, and the scanning direction, shown in the input-output correspondence table of FIG. 6.

In FIG. 6, for example, when the memory data at the (i/4)th pixel on the (j/4)th line input from the second selector 502 (refer to FIG. 5) has a value at a level 1, the pixels at the ith through (i+3)th locations on jth through (j+3)th lines represented by the memory data are all within an edit area. In this case, the calculation unit 506 (shown in FIG. 5) outputs a 1-level signal as an edit area signal for the ith pixel on the jth line wherein the signal at the level 1 indicates that the pixel of interest is within the edit area. For example, the 12th pixel on the 12th line in FIG. 4a is such a case.

On the other hand, if the memory data input from the second selector 502 (shown in FIG. 5) has a value at a level 0 indicating that the corresponding pixel is out of the edit area, and if the memory data output from the first selector 501 (shown in FIG. 5) has a value at a level 1 indicating that the data is a boundary line data (black data) at the ith pixel on the jth line, then the ith pixel on the jth line is located on the boundary line of the edit area or is out of the edit area, and thus the calculation unit 506 (shown in FIG. 5) outputs a 0-level signal as an edit area signal for the ith pixel on the jth line wherein the signal at the level 0 indicates that the pixel of interest is out of the edit area. For example, the 8th pixel on the 4th line in FIG. 4a is the case.

If the memory data input from the second selector 502 (shown in FIG. 5) has a value at a level 0 indicating that the data is out of the edit area and if the memory data output from the first selector 501 (shown in FIG. 5) has a value at a level 0 indicating that the data is not a boundary line data (black data) at the ith pixel on the jth line, then the calculation unit 506 outputs an edit area signal for the ith pixel on the jth line at a level determined by referring to the boundary line data of neighboring pixels stored in the first one-line memory 504 and also the edit area signals of neighboring pixels output from the second one-line memory 505 (shown in FIG. 5). For example, the 8th pixel on the 5th line, the 18th pixel on the 10th line, etc., in FIG. 4a are such cases.

In the case of patterns 10, 11, 14, and 15 (shown in FIG. 6), however, when the edit area signals at neighboring pixels are referred to, the signals can be at the outside of the boundary line. To avoid the above problem, the memory data at the (i/4)th pixel on the (i/4+1)th line output from the neighboring data memory 503 (shown in FIG. 5) is output as an edit area signal for the four cases described above. For example, the 7th pixel on the 5th line, the 6th pixel on the 13th line, etc., in FIG. 4a are such cases.

FIG. 4g illustrates the result of the above interpolation process performed on the document image shown in FIG. 4a. In this way, all pixels inside the black data representing the boundary line are taken into the edit area as shown in FIG. 4g.

In the specific example described above, the edit area is specified by indicating one point on the document with a marker. However, the edit area may also be specified using a digitizer. In this case, as a marker signal to the area signal generator 212 (shown in FIG. 2), only black data representing an image (boundary line) is written via the CPU 304 (shown in FIG. 3) in the memory 303 (shown in FIG. 3) at the corresponding locations. After that, the operation is performed in a manner similar to the above example.

Figure 36A:
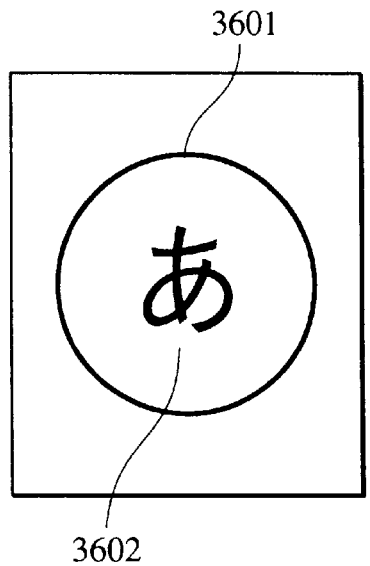
FIGS. 36 A&B are schematic diagrams illustrating the process of printing an image for an area specified by a loop drawn on a document with a marker.
Figure 36B:
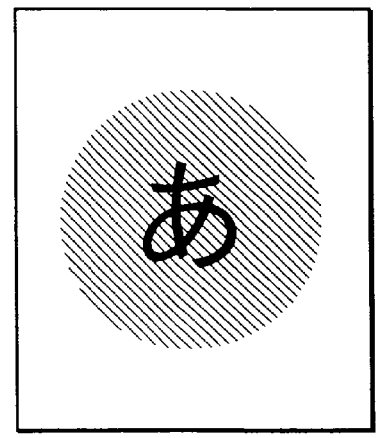
Figure 37A:
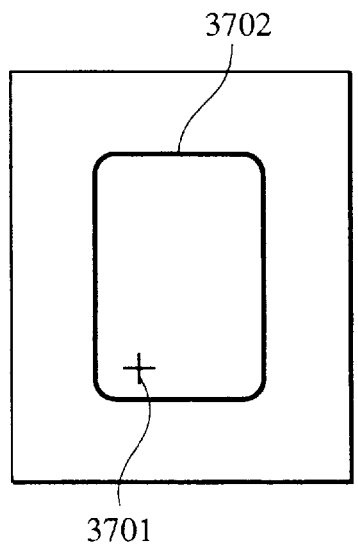
FIGS. 37 A&B are schematic diagrams illustrating the process of printing an image for an area specified by a point drawn on document via a digitizer.
Figure 37B:
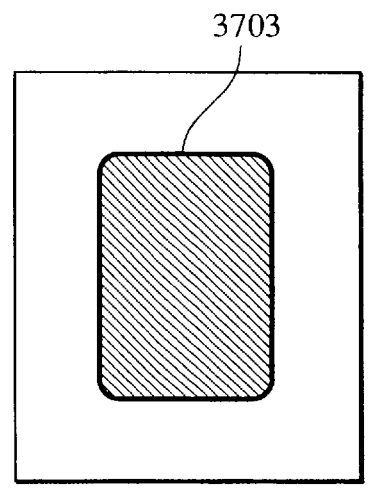
Figure 38A:
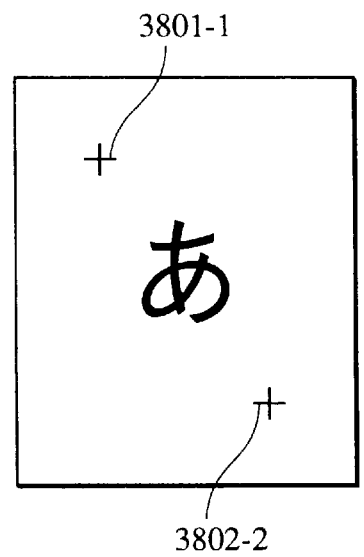
FIGS. 38 A&B are schematic diagrams illustrating the process of printing an image for a closed area on a document specified via a digitizer.
Figure 38B:
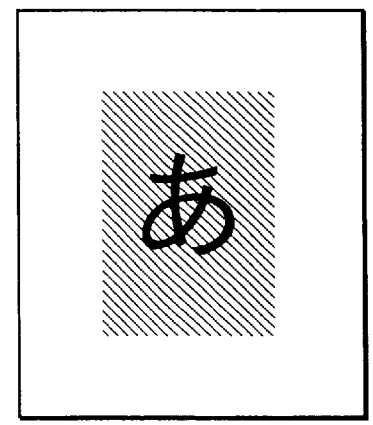

When an edit area is specified using a marker in accordance with the conventional technique described above with reference to FIG. 36, a marker signal having a color representing a closed curve (loop) given via the first selector 501 shown in FIG. 5 is employed as a boundary line and all pixels inside the boundary line represented by the marker data are taken into the edit area.

Second Embodiment

Figure 8:
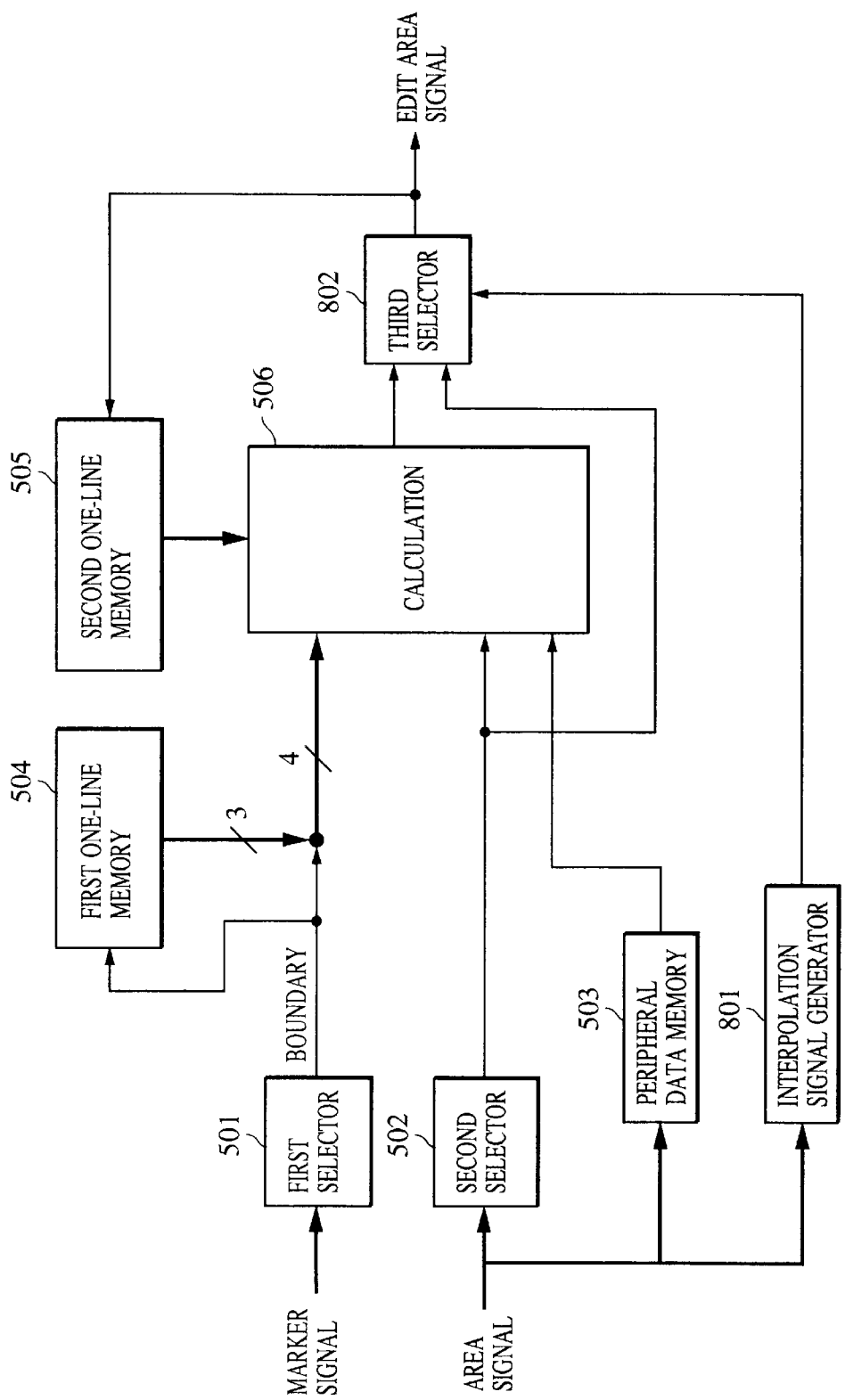
FIG. 8 is a block diagram illustrating the internal structure of an interpolation processing circuit used in an image processing apparatus according to a second embodiment of the invention.
Figure 9:
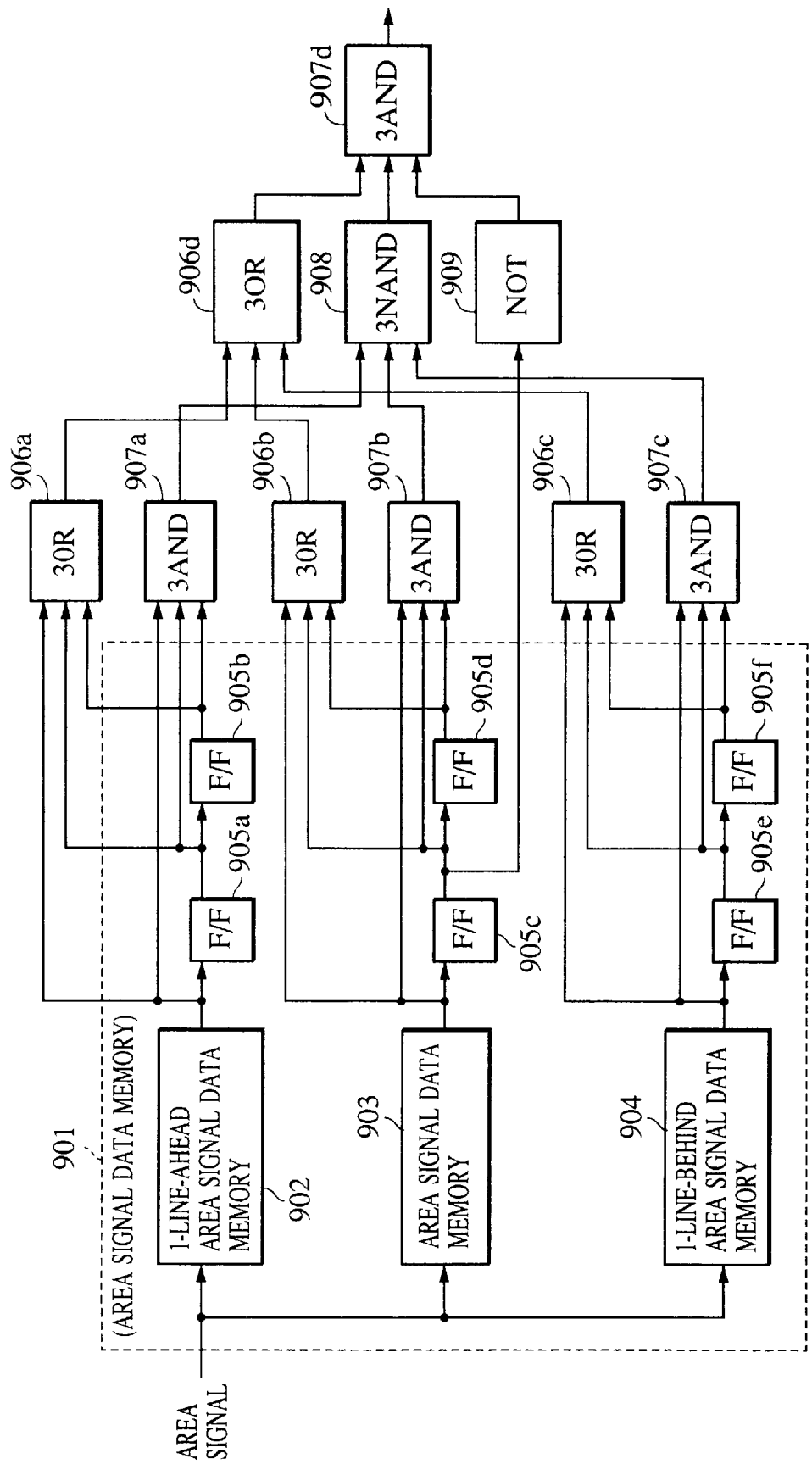
FIG. 9 is a block diagram illustrating the internal structure of the interpolation processing circuit of the area signal generator.

Referring to FIGS. 8 and 9, a second embodiment of the invention will be described below. In the present embodiment, the basic construction of the image processing apparatus is similar to that employed in the first embodiment described above with reference to FIGS. 1–3, and thus these figures will also be referred to in the following description.

FIG. 8 is a block diagram illustrating the internal structure of an interpolation processing circuit used in the image processing apparatus according to the second embodiment of the invention. FIG. 9 is a block diagram illustrating the details of the interpolation signal generator shown in FIG. 8.

In FIG. 8, parts or elements similar to those of the first embodiment shown in FIG. 5 are denoted by similar reference numerals. The interpolation processing circuit shown in FIG. 8 differs from that shown in FIG. 5 in that it further includes the interpolation signal generator 801 and a third selector 802.

The interpolation signal generator 801 stores 9 data consisting of 3 data of an area signal in the main scanning direction×3 data in the sub-scanning direction output from the memory 303 (shown in FIG. 3), and performs calculation to determine an area where interpolation is to be performed. The third selector 802 outputs the signal from the calculation unit 506 as an edit area signal when the interpolation signal generator 801 outputs an interpolation signal (=1), while the third selector outputs the edit signal, which has been output from the second selector 502 and stored in the memory 303, as an edit area signal if no interpolation signal is output (or the output signal of the interpolation signal generator is at a 0 level).

FIG. 9 illustrates the internal structure of interpolation signal generator 801. In FIG. 9, an area signal memory 901 stores 9 data consisting of 3 data of an area signal in the main scanning direction×3 data in the sub-scanning direction output from the memory 303 (shown in FIG. 3). The area signal memory 901 includes a one-line-ahead area signal data memory 902, an area signal data memory 903, a one-line-behind area signal data memory 904, and first through sixth flip-flops (F/Fs) 905a–905f.

The interpolation signal generator 801 also includes first through fourth 3-input OR gates 906a–906d. The input terminals of the first 3-input OR gate 906a are connected to the output terminal of the output terminal of the one-line-ahead area signal data memory 902, and the output terminals of the first and second flip-flops 905a and 905b, respectively. The input terminals of the second 3-input OR gate 906b are connected to the output terminal of the area signal data memory 903 and the output terminals of the third and fourth flip-flops 905c and 905d, respectively. The input terminals of the third 3-input OR gate 906c are connected to the output terminal of the one-line-behind area signal data memory 904 and the output terminals of the fifth and sixth flip-flops 905e and 905f, respectively. The output terminals of the first through third 3-input OR gates 906a–906c are connected to the respective input terminals of the fourth 3-input OR gate 906d.

The 3-input OR gate 906d outputs a signal representing the result of OR operation among 9 area data stored in the area signal memory 901. If at least one of the area signals stored in the area signal memory 901 has a value at a level 1 which indicates that the data of interest is within an edit area, the 3-input OR gate 906d outputs a 1-level signal.

The input terminals of a first 3-input AND gate 907a are connected to the output terminal of the one-line-ahead area signal data memory 902 and the output terminals of the first and second flip-flops 905a and 905b, respectively. The input terminals of a second 3-input AND gate 907b are connected to the output terminal of the area signal data memory 903 and the output terminals of the third and fourth flip-flops 905c and 905d, respectively. The input terminals of a third 3-input AND gate 907c are connected to the output terminal of the one-line-behind area signal data memory 904 and the output terminals of the fifth and sixth flip-flops 905e and 905f, respectively. The input terminals of a fourth 3-input AND gate 907d are connected to the output terminal of the fourth 3-input OR gate 906d, the output terminal of a 3-input NAND circuit 908 which will be described later, and the output terminal of a NOT gate 909 which will be described later, respectively.

The condition for the fourth 3-input AND gate 907d to output an interpolation signal at a level 1 is that the data of interest (the central data) is not within an edit area and some neighboring data is within the edit area, that is, the data of interest is in contact with the edit area.

The input terminals of the 3-input NAND gate 908 are connected to the respective output terminals of the first through third 3-input AND gates 907a–907c. The output terminal of 3-input NAND gate 908 is connected to an input terminal of the fourth 3-input AND gate 907d. The 3-input NAND gate 908 outputs a signal representing the result of NAND operation among 9 area data stored in the area signal memory 901. Therefore, if at least one of the area signals stored in the area signal memory 901 has a value at a level 0 which indicates that the data is not within an edit area, the 3-input NAND gate 908 outputs a 1-level signal.

The input of the NOT gate 909 is connected to the output terminal of the third flip-flop 905c and the output terminal of the NOT gate 909 is connected to an input terminal of the fourth 3-input AND gate 907d. The NOT gate 909 outputs a signal which is an inverted signal of the central data of the 9 area signal data stored in the area signal memory 901. Accordingly, "1" is output when the central data stored in the area signal memory 901 is "0" which indicates that the data is not within an edit area.

In this embodiment of the invention, as described above, the interpolation processing circuit 307 (FIG. 3) of the image processing apparatus outputs an edit area signal in such a manner that when data stored in the memory 303 (FIG. 3) is in contact with the edit area signal, the data is output after being subjected to interpolation process in the calculation unit 506 (FIG. 8), while the edit area signal from the memory 303 (FIG. 3) is directly output for the other portions. This makes it possible to perform interpolation process only on such portions near the boundary line where a white gap can appear.

Third Embodiment

A third embodiment of the invention will be described below with reference to FIGS. 10–21.

Figure 10:
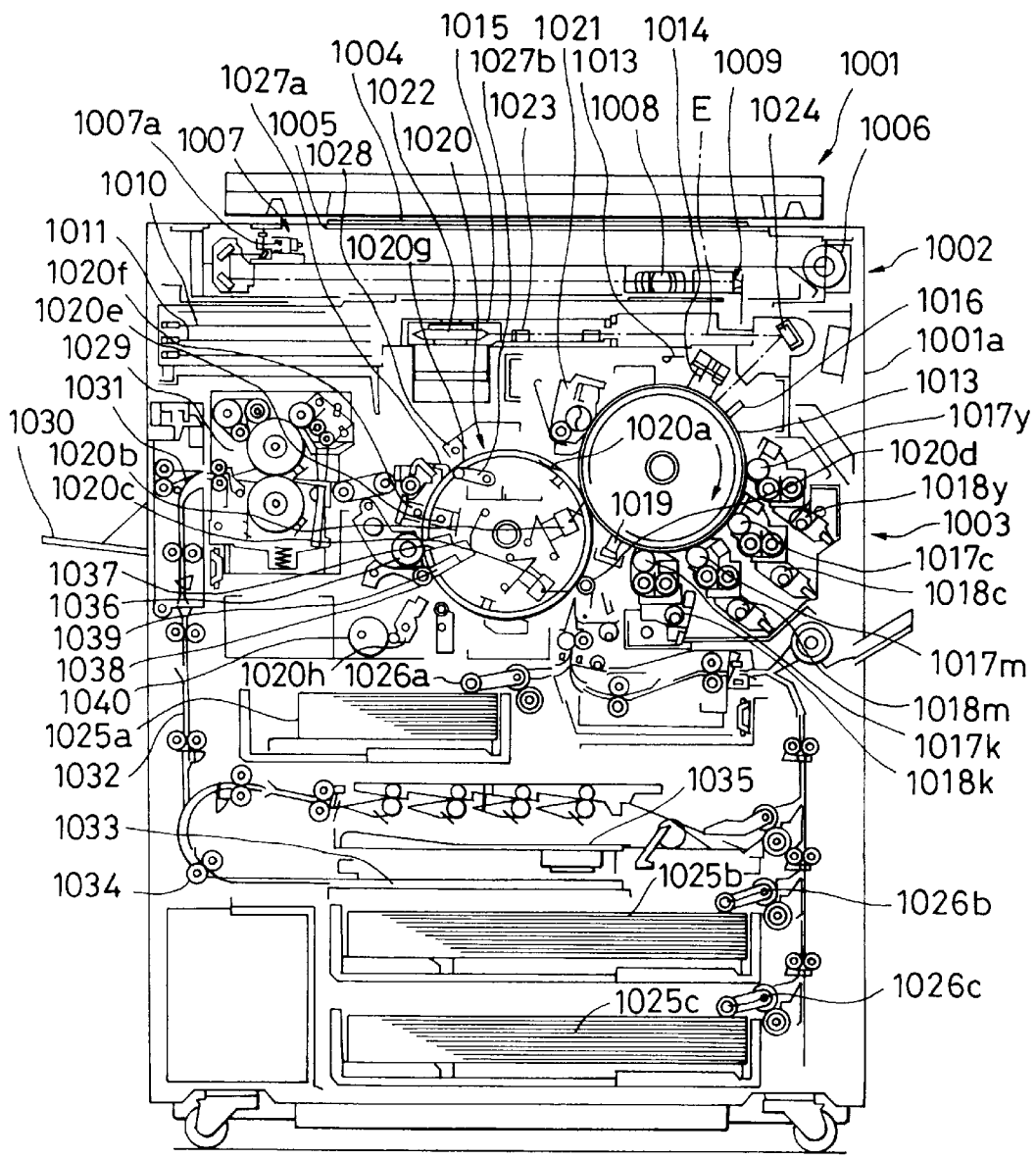
FIG. 10 is a side view illustrating the internal structure of an image processing apparatus according to a third embodiment of the invention.

FIG. 10 is a side view illustrating the internal structure of a digital color copy machine which is embodied herein as an image processing apparatus according to the present invention. In FIG. 1, reference numeral 1001 denotes the image processing apparatus (digital color copying machine) including a digital color image scanner unit (hereinafter referred to simply as a scanner unit) 1002 disposed at an upper location inside the case 1001a and a digital color image printer unit (hereinafter referred to simply as a printer unit) 1003 disposed below the scanner 1003.

In the scanner unit 1002, a document 1004 is placed on a document glass plate 1005 and a document scanning unit 1007 including an exposure lamp 1007a is driven by a driving motor 1006 thereby scanning and exposing the document 1004 at a constant rate. The light reflected from the document 1004 is focused via a lens 1008 onto a full color sensor (CCD sensor) 1009 thereby obtaining an image signal for each separated color. In the present embodiment, a 3-line CCD with R (red), G (green), and B (blue) filters located adjacent to each other is employed as the full color sensor 1009. The image signal for each separated color is then subjected to image processing in an image processing unit 1010 and a controller 1011. The resultant signal is supplied to the printer unit 1003.

In a peripheral area outside the document glass plate 1005, there is provided a control panel 1005a on which switches for controlling the various modes associated with copying process and various displays are disposed.

A photosensitive drum 1012 serving as an image forming member is disposed in the printer unit 1003 in such a manner that it can be rotated in a direction denoted by an arrow in the figure. Around the photosensitive drum 1012, there are disposed a pre-exposure lamp 1013, a corona charger 1014, a laser exposing optical system 1015, a potential sensor 1016, four different developing units 1017y, 1017c, 1017m, and 1017Bk, eccentric cams 1018y, 1018c, 1018m, and 1018Bk for driving the developing units 1017y, 1017c, 1017m, and 1017Bk, drum light intensity detecting means 1019 for detecting the intensity of light striking the surface of the photosensitive drum 1012, a transfer unit 1020, and a cleaning unit 1021.

In the laser exposing optical system 1015, an image signal from the scanner unit 1002 is converted into an optical signal by the laser unit (not shown). The converted laser beam is reflected by a polygon mirror 1022 and projected onto the surface of a photosensitive drum 12 via a lens 1023 and a mirror 1024.

During an operation of forming an image in the printer unit 1002, the photosensitive drum 1012 is rotated in the direction denoted by the arrow in the figure so that the photosensitive drum 1012, which has been discharged by the pre-exposure lamp 1013, is uniformly charged by a charger 1014. The photosensitive drum 1012 is then illuminated by an optical image E for each separated color thereby forming a latent image thereon.

A proper developing unit of those 1017*y*, 1017*c*, 1017*m*, and 1017*k* is operated so as to develop the latent image on the photosensitive drum thereby forming a toner image on the photosensitive drum 1012, wherein the toner contains resin as a base material. The respective developing units 1017*y*, 1017*c*, 1017*m*, and 1017*k* are selectively moved by the corresponding eccentric cams 1018*y*, 1018*c*, 1018*m*, and 1018*k* to locations near the photosensitive drum 1012 in accordance with the separated colors.

From a cassette selected from a plurality of recording medium cassettes 1025*a*, 1025*b*, and 1025*c*, a recording medium (copying paper) is fed and carried via a transporting system and a transfer unit 1020 to a location where the recording medium faces the photosensitive drum 1012. Then the above toner image formed on the photosensitive drum 1012 is transferred to the recording medium. In the above operation, the selection of the recording medium cassettes is performed by driving one of pick-up rollers 1026*a*, 1026*b*, and 1026*c* in response to a control signal which is generated by the controller 1011 depending on the size of the image to be recorded.

In the present embodiment, the transfer unit 1020 includes a transfer drum 1020*a*, a transfer charger 1020*b*, an electrostatic adhesion charger 1020*c* for electrostatically charging the recording medium, an adhesion roller 1020*d* located at a position opposite to the electrostatic adhesion charger 1020*c*, an inner charger 1020*e*, and an outer charger 1020*f*. The transfer drum 1020*a* is supported by a shaft so that it can be rotated. A recording medium holding sheet 1020*g* of a dielectric sheet such as a polycarbonate film is disposed over a circumferential surface opening area of the transfer drum 1020*a* in such a manner that the transfer drum 1020*a* has a cylindrical shape formed in an integral fashion. As the transfer unit 1020 in the drum shape or the transfer drum 1020*a* is rotated, the toner image formed on the photosensitive drum 1012 is transferred to the recording medium held on the recording medium holding sheet 1020*g* by means of the transfer charger 1020*b*.

As described above, an image consisting of a desired number of colors is transferred to a recording medium which is held on the recording medium holding sheet 1020*g* and carried thereby. Thus a full color image is formed on the recording medium.

In the case of a full color image, after completion of transferring a 4-color toner image to a recording medium, the recording medium is separated from the transfer drum 1020*a* by means of a separation claw 1027*a*, a pushing-up separation roller 1027*b*, and a separation charger 1028. The recording medium is then ejected onto a copied paper tray 1030 via a heat fixing roller 1029.

After completion of the transfer operation, residual toner remaining on the surface of the photosensitive drum 1012 is removed by a cleaning unit 1021 so that the photosensitive drum 1012 may be used in a following image forming process.

When an image is formed on both sides of a recording medium, a transport path switching guide 1031 is driven immediately after the recording medium has passed through the fixing unit 1029 so that the recording medium is carried into a turning-around path via a transport path 1032, and then is carried by means of a reversal roller 1034 in such a manner that the recording medium moves with the trailing end of the recording medium in the forward motion is now at the leading end until it reaches an intermediate tray 1035. After that, an image is formed on the other side of the recording medium in a manner similar to that described above.

Then cleaning is performed so as to prevent a powder from depositing on the recording medium holding sheet 1020*g* of the transfer drum 1020*a* and also prevent oil from depositing on the recording medium, wherein the cleaning is performed by means of a fur brush 1036 and a first backup brush 1037 disposed on the other side of the recording medium holding sheet 1020*g* opposite to the fur brush 1036 and by means of an oil removing roller 1038 and a second backup brush 1039 disposed on the other side of the recording medium holding sheet 1020*g* opposite to the oil removing roller 1038. The cleaning is performed either during the operation of forming an image or after an image has been formed. If jamming (paper jamming) occurs, cleaning is also performed after removing the paper.

In the present embodiment, the eccentric cams 1040 are operated so as to drive a CAM follower 1020*h* formed in an integral fashion with the transfer drum 1020*a* so that a desired amount of gap is produced between the recording medium holding sheet 1020*g* and the photosensitive drum 1012. The gap between the transfer drum 1020*a* and the photosensitive drum 1012 is increased when the apparatus is in a standby state or when the electric power is turned off.

Figure 11:
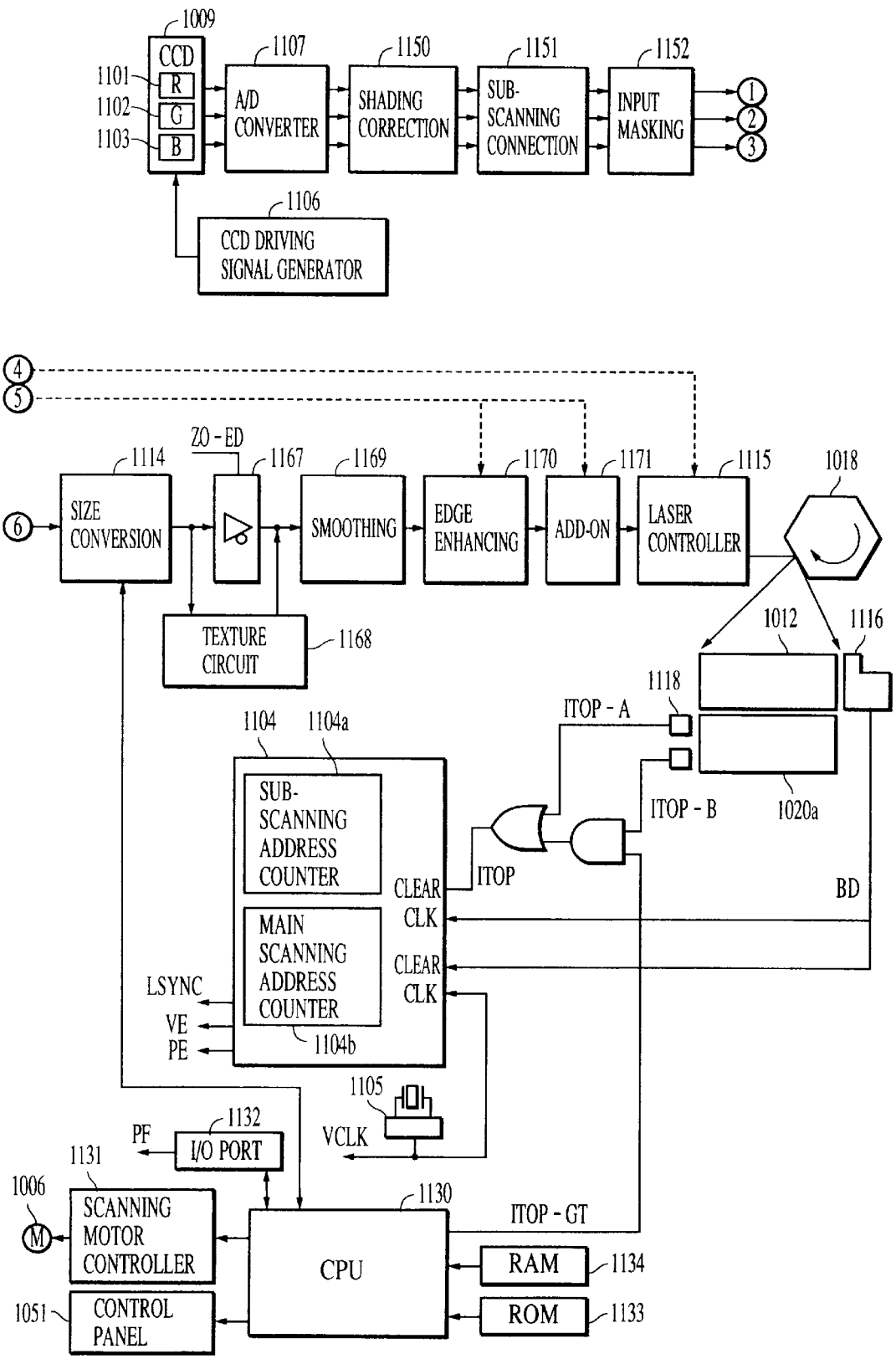
FIG. 11 is a block diagrams illustrating the constructions of an image processing unit, a controller, and peripheral parts controlled by the controller, in the image processing apparatus.
Figure 12:
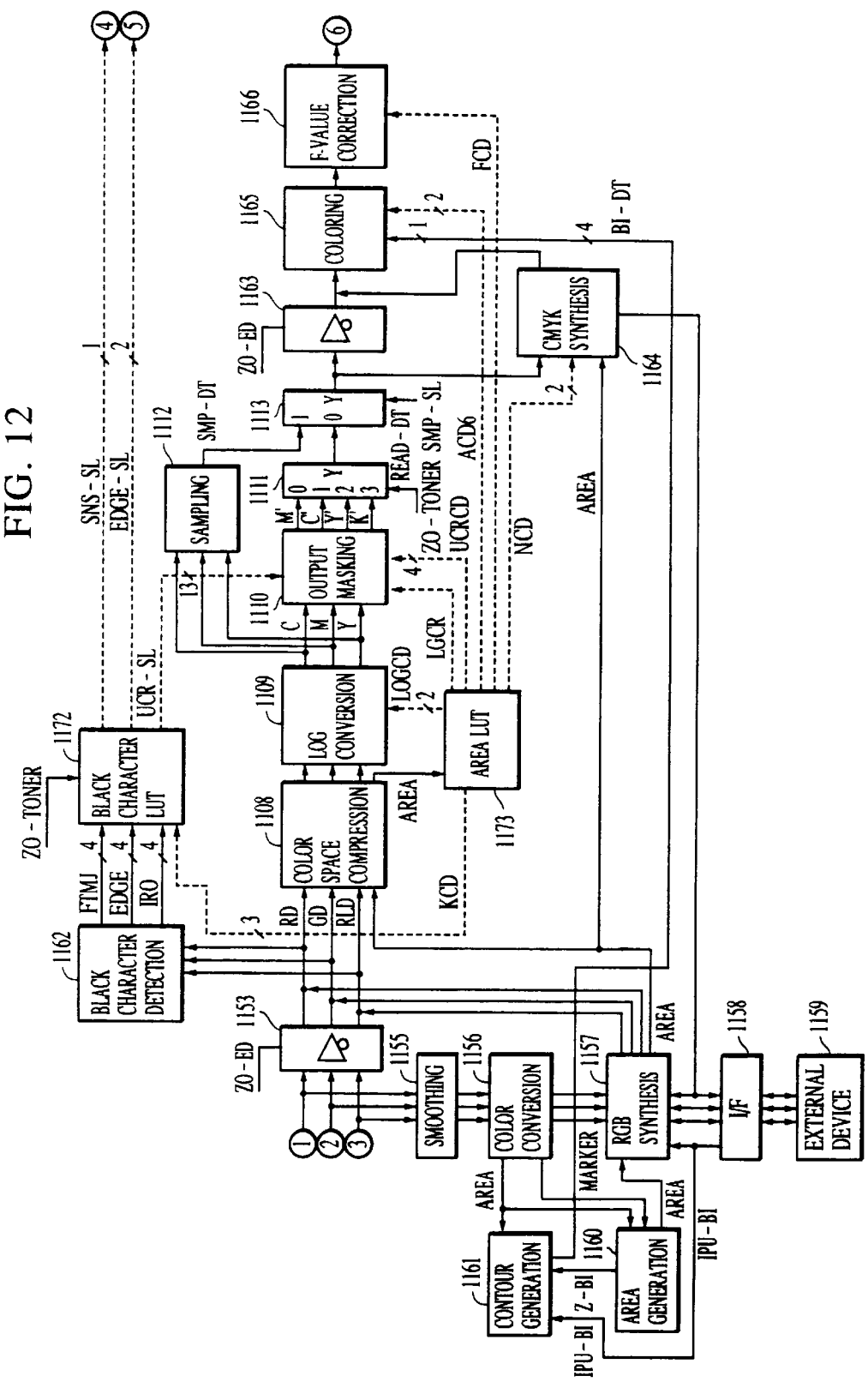
FIG. 12 is a block diagrams illustrating the constructions of the image processing unit, the controller, and peripheral parts controlled by the controller, in the image processing apparatus.

The image processing block including the image processing unit 1010 and the controller 1011 will be described below with reference to FIGS. 11 and 12. FIGS. 11 and 12 are block diagrams illustrating the constructions of the image processing unit 1010, the controller 1011, and peripheral parts which are controlled by the controller 1011. In FIG. 11, the full color sensor (CCD) 1009 includes three lines of CCDs 1101, 1102, and 1103 of R (red), G (green), and B (blue). The full color sensor 1009 senses one line of document image and converts the optical information to an electric signal for each color of R, G, and B at a resolution of 400 dpi. In this embodiment, one line can be 297 mm long at maximum (for the case of a vertical A4 size). In the maximum case, the CCD outputs an image consisting of 4677 pixels/line for each color of R, G, and B.

In FIG. 11, a synchronizing signal generator 1104 includes a main scanning address counter 1104*a* and a sub-scanning address counter 1104*b*. The main scanning address counter 1104*a* is reset for each line by a BD signal serving as a synchronizing signal for the operation of forming one line of image on the photosensitive drum 1012 (FIG. 10) by means of a laser beam. After being reset, the main scanning address counter 1104*a* counts VCLK signals generated by a pixel clock signal generator 1105 and outputs a counted signal H-ADR corresponding to each pixel of one-line image information output from the full color sensor 1009. The signal H-ADR is up-counted from 0 to 5000 which is great enough to read one line of image signal from the full color sensor 1009. The synchronizing signal generator 1104 generates various timing control signals including a line synchronizing signal LSYNC, a main scanning effective period signal VE associated with an image signal, and a sub-scanning effective period signal PE.

In FIG. 11, CCD driving signal generator 1106 decodes an H-ADR signal thereby generating various signals for driving or controlling the full color sensor 1009. The signals generated include a shift pulse, a reset pulse, and a CCD-DRIVE signal serving as a transfer clock signal. In synchronization with the VCLK signal, the full color sensor 1009 sequentially outputs image signals for the respective colors R, G, and B for the same pixel. An analog-to-digital converter 1107 converts the respective image signals of R, G, and B to 8-bit digital signals. A shading correction circuit 1150 makes correction for the variation in the output signal of the full color sensor 1009 from pixel to pixel. The shading correction circuit 1150 has a memory for storing one line of signal of each color R, G, and B. An image of a white board having a standard gray level is sensed via an optical system, and the resultant signal is stored as a reference signal in the above memory.

A sub-scanning connection circuit 1151 operates to prevent the image signal sensed by the full color sensor 1009 from being shifted by 8 lines in the sub-scanning direction.

An input masking circuit 1152 removes color impurity of the input signal for each color R, G, and B.

In FIGS. 11 and 12, buffers 1153, 1163, and 1167 pass the image signals when a ZO-ED signal is at a low level while they block the image signals when the ZO-ED signal is at a high level. When an editing operation is performed, the ZO-ED signal is usually at a low level.

In FIG. 12, a smoothing circuit 1155 consists of a filter for smoothing the image signal wherein the smoothing is accomplished by means of 5×5 matrix operation. A color conversion circuit 1156 converts an image signal represented by a combination of RGB to a signal represented by HSL color space coordinates in which particular colors are converted to other specified colors, and then the image signal is converted back to a signal represented in the original RGB color space. The color conversion circuit 1156 can also convert a multilevel signal to a bilevel signal using a particular threshold value. Furthermore, an external device 1159 includes a storage device for storing an image signal with the A4 size at maximum and a computer for controlling the storage device. The image signal from the external device 1159 may be a signal represented either by a combination of RGB (red, green, blue) or by a combination of CMYK (cyan, magenta, yellow, black) in a bilevel form. An interface (I/F) circuit 1158 serves to adjust the timing and the speed in the communication between the external device 1159 and the internal circuits of the apparatus.

In FIG. 12, an area generating circuit 1160 generates data representing the area specified via an editor or the like and stores the resultant data. A MARKER signal extracted from an image drawn on a document using a marker pen or the like is also stored as data representing an area in the memory. An SC-BI signal is obtained by converting the image signal sensed via the full color sensor 1009 shown in FIG. 11 to a bilevel form, and is output as a Z-BI signal in the form of a bilevel image signal. The area generating circuit 1160 includes a memory writing section and a memory reading section used in the operation of generating an area as will be described in detail later.

In FIG. 12, an RGB image mixing circuit 1157 combines an RGB image signal sensed via the full color sensor 1009 shown in FIG. 11 with an RGB image signal input from an external device 1159 shown in FIG. 12. The RGB image mixing circuit 1157 can also combine an RGB image signal sensed via the full color sensor 1009 shown in FIG. 11 with a bilevel image signal input from the external device 1159 shown in FIG. 12. The image areas to be mixed are specified by either an AREA signal from the area generating circuit 1160 or an IPU-BI signal from the external device 1159. The mixing of images may be performed either in a manner such that an image signal sensed via the full color sensor 1009 shown in FIG. 11 and an image signal input from the external device 1159 shown in FIG. 12 are replaced by each other for individual areas, or in a manner such that the two images are superimposed in a transparent fashion. In the case of the transparent superimposing, the degree of transparency of each image may be properly selected.

In FIG. 12, a contour generating circuit 1161 extracts contours from an SC-BI signal which is a bilevel signal converted from an image signal sensed via the full color sensor 1009 shown in FIG. 11, or from an IPU-BI signal in the form of a bilevel signal input from the external device 1159 shown in FIG. 12, or otherwise from a Z-BI signal in the form of a bilevel signal generated by the area generating circuit 1160. The contour generating circuit 1161 then generates shades. A black character detecting circuit 1162 detects the features of the input image signal and outputs an eight-level character boldness signal FTMJ, an edge signal EDGE, and a color signal IRO.

In FIG. 12, a color space compression circuit 1108 performs a matrix operation according to the following equation (1).

$$\begin{pmatrix} R' \\ G' \\ B' \end{pmatrix} = \begin{pmatrix} R \\ G \\ B \end{pmatrix} + \begin{pmatrix} a11 a12 a13 a14 a15 a16 a17 a18 \\ a21 a22 a23 a24 a25 a26 a28 \\ a31 a32 a33 a34 a35 a36 a37 a38 \end{pmatrix} \times \qquad (1)$$

$$\begin{pmatrix} R - X \\ G - X \\ B - X \\ (R - X) \times (G - X) \\ (G - X) \times (B - X) \\ (B - X) \times (R - X) \\ R \times G \times B \\ (255 - R) \times (255 - G) \times (255 - B) \end{pmatrix}$$

where X denotes a minimum value of R, G, and B.

The color space compression circuit 1108 can be set so that color space compression is either performed or not depending on the area signal AREA.

In FIG. 12, a light intensity-to-toner density conversion circuit (LOG conversion circuit) 1109 converts an 8-bit light intensity signal represented in the RGB (red, green, blue) color model to an 8-bit toner density signal represented in the CMY (cyan, magenta, yellow) color model. An output masking circuit 1110 extracts a black level from the intensity signals of three colors in the CMY model by means of a known UCR (undercolor removing) processing technique, and also performs a known masking process so as to remove the impurity of the developers corresponding to the respective intensity signals.

In FIG. 12, a first selector 1111 selects a color signal corresponding to a current developer from the M', C', Y', K' signals generated in the above-described manner. The CPU 1130 shown in FIG. 11 generates a ZO-TONER signal consisting of 2 bits to control the selection of the color, as will be described below. When the ZO-TONER signal is equal to 0, the M' signal is output as a READ-DT signal. Similarly, if the ZO-TONER signal is equal to 1, then the C' signal is output; if 2, then the Y' signal; and if 3, then the K' signal is output.

In FIG. 12, a sampling circuit 1112 samples the input image signals R, G, and B and also the intensity signal ND generated from the R, G, and B signals every 4 pixels, and outputs R, G, B, and ND signals in serial. In this processing, the intensity signal ND is given for example by (R+G+B)/3. A second selector 1113 selects the image signal READ-DT when the CPU 130 sets the SMP-SL signal at a low level, while it selects the sampling signal SMP-DT if the SMP-SL signal is set at a high level by the CPU 130 shown in FIG. 11.

In FIG. 12, a CMYK mixing circuit 1164 combines an image signal sensed via the full color sensor 1009 shown in FIG. 11 with a CMYK image signal input from the external device 1159 shown in FIG. 12. In the CMYK mixing process, a color signal, corresponding to a currently used developer depending on the image signal input via the full color sensor 1009 shown in FIG. 11, is input page by page from the external device 1159 shown in FIG. 12. As in the RGB mixing circuit 1157 shown in FIG. 12, areas to be mixed are switched in response to the AREA signal or the IPU-BI signal. The mixing may also be performed in a transparent fashion.

In FIG. 12, a coloring circuit 1165 for example paints a black-and-white image with a predetermined color. The coloring may also be performed on an bilevel image signal IPU-BI input from the external device 1159 shown in FIG. 12. The coloring circuit 1165 can also produce a grading pattern having gradually varying color intensity. An F-value correcting circuit 1166 performs gamma conversion depending on the developing characteristics of the printer unit 1003 shown in FIG. 10. In the gamma conversion, the conversion characteristic may be set for each mode.

In FIG. 11, a size converting circuit 1114 having a memory capable of storing one line of image signal expands or reduces the size of the image signal in the main scanning direction. It can also slant the image. When the sampling operation is performed, the above memory is used to store sampled data thereby produce a histogram. A texture circuit 1168 combines an image signal sensed via the full color sensor 1009 with another image signal which has been sensed beforehand via the full color sensor 1009 and converted into a bilevel form, or with a bilevel pattern input from the external device 1159 shown in FIG. 12. The resultant combined image signal is output from the texture circuit 1168. Both smoothing circuit 1169 and edge enhancing circuit 1170 have 5×5 filters. An add-on circuit 1171 converts a given image signal to a pattern coded in a particular fashion. A laser controller 1115 controls the optical output power of the laser in accordance with a video signal which is an 8-bit color intensity signal. The emitted laser beam is scanned, via a polygon mirror 1022 shown in FIG. 10, across the surface of the photosensitive drum 1012 in its axial direction so that one line of electrostatic latent image is formed on the photosensitive drum 1012.

In FIG. 11, a photo detector 1116 is disposed adjacent to the photosensitive drum 1012. When the photo detector 1116 detects the passage of the laser beam which is going to strike the photosensitive drum 1012, it generates a synchronizing signal BD for each line.

In FIG. 12, an area LUT (look-up table) circuit 1173 sets each mode in accordance with the area signal (AREA) generated by the area generating circuit 1160. The area LUT circuit 1173 outputs a LOGCD signal so as to switch the LOG table of the LOG conversion circuit 1109 to a passing-through mode. The area LUT circuit 1173 also outputs a UCRCD signal to the output masking circuit 1110 so that the output masking circuit 1110 may perform trimming or masking processes. An FCD signal from the area LUT circuit 1173 is supplied to the F-value correcting circuit 1166 so as to properly set the F-value. Furthermore, the area LUT circuit 1173 outputs an ACD6 signal to the coloring circuit 1165, an NCD signal to the CMYK mixing circuit 1164, and a KCD signal to a black character LUT circuit 1172 which will be described later, thereby setting the various modes associated with these circuits.

In FIG. 12, the black character LUT circuit 1172 performs various operations depending on the output of the black character detecting circuit 1162. For example, a UCR-SL signal is output by the black character LUT circuit 1172 to change the amount of UCR performed by the output masking circuit 1110 so that when the character in an area of interest is regarded as having a high black intensity, the amount of black toner is increased while the amounts of C, M, and Y toners are reduced in the developing process. On the other hand, an EDGE-SL signal is output to switch the filters of the smoothing circuit 1169 and the edge enhancing circuit 1170 shown in FIG. 11 so that the edges of a character having a higher black intensity is enhanced to a greater degree. Furthermore, the black character LUT circuit 1172 shown in FIG. 12 outputs an SNS-SL signal to switch the number of lines between 400 and 200 lines in the PWM (pulse width modulation) operation performed by the laser controller 1115 shown in FIG. 11. That is, when the character is regarded as having a high black intensity, the number of lines is switched to 400 so that the character is developed with a high resolution while other areas are developed in 200 lines so that a greater number of gray levels may be represented.

In FIG. 11, when a photosensor 1118 detects that the transfer drum 1020a shown in FIG. 10 comes to a predetermined particular position, the photosensor 1118 generates a page synchronizing signal ITOP. In response to the page synchronizing signal ITOP, the sub-scanning address counter 1104b of the synchronizing signal generator 1104 is initialized. The page synchronizing signal ITOP is also supplied to the CPU (central processing unit) 1130 which controls the operation of sensing and recording an image. A scanning motor controller 1131 controls the direction (forward/backward) and the speed of the scanning motor shown in FIG. 10. Via an I/O port 1132, the CPU 1130 controls other sensors and actuators required in a copying operation. A PF signal is also output via the I/O port 1132 to control the operation of feeding a recording medium from recording medium cassettes 1025a–1025c. Furthermore, size sensors (not shown) attached to the recording medium cassettes 1025a–1025c shown in FIG. 10 detect the size of the recording media, and the detected signal is input to the CPU 1130 via the I/O port 1132.

In FIG. 11, via a control panel 1051, an operator can control the number of sheets to be copied and other various operation modes. A ROM (read only memory) 1133 stores a program used by the CPU 1130 and also stores other data representing the predetermined setting conditions. A RAM (random access memory) 1134 is used to store temporary data or data representing additional setting conditions.

Figure 13:
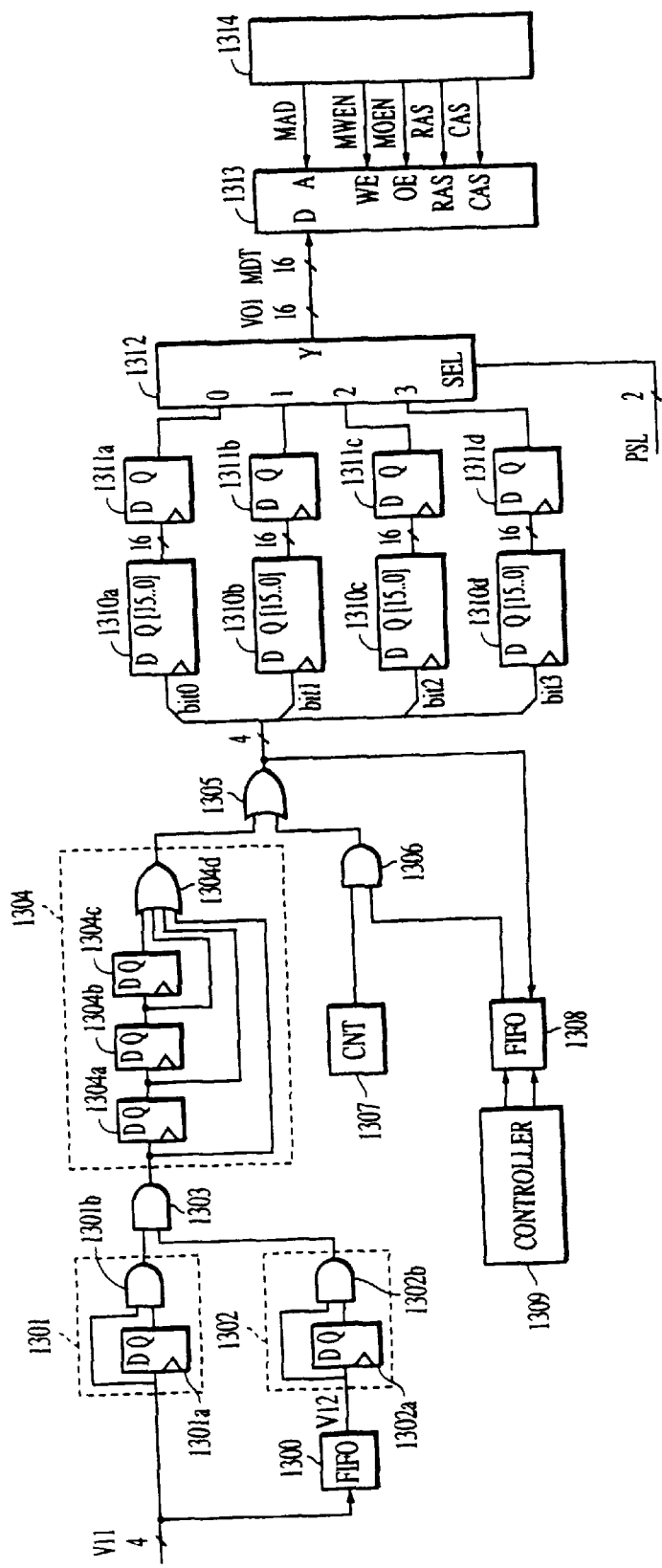
FIG. 13 is a block diagram illustrating the internal structure of the memory writing section of the area generating circuit in the image processing apparatus.

Referring to FIG. 13, the memory writing section of the area generating circuit 1160 shown in FIG. 12 will be described below. FIG. 13 is a block diagram illustrating the construction of the memory writing section of the area generating circuit 1160. In FIG. 13, an input signal V11 is a 400 dpi image signal corresponding to the MARKER signal shown in FIG. 12. Four different types of bilevel image signals may be input as the signal V11. A line memory (FIFO) 1300 stores data of 5120 pixels. The FIFO 1300 delays the signal V11 by an amount corresponding to one line and outputs a resultant signal V12. A first removing circuit 1301, consisting of a flip-flop (F/F) 1301a and an AND gate 1301b, removes an isolated pixel point from the signal V11. A second removing circuit 1302, consisting of a flip-flop (F/F) 1302a and an AND gate 1302b, removes an isolated pixel point from the signal V12. The output signals of the first and second removing circuits 1301 and 1302 are input to an AND gate 1303.

An OR gate 1304, consisting of three flip-flops 1304a, 1304b, and 1304c and an OR gate 1304d, performs an OR operation on four pixel signals. The area generating circuit 1160 also includes an OR gate 1305 and an AND gate 1306.

A line memory (FIFO) 1308 stores data of 5120 pixels. A controller (CNT) 1307 controls the signal from the FIFO 1308 by enabling via the AND gate 1306 for a period corresponding to 3 lines every 4 lines. The OR gate 1305 performs an OR operation on the image signal of 4 pixels in the main scanning direction×4 pixels in the sub-scanning direction and thus 16 pixels in total, and outputs a resultant signal.

A controller 1309 generates a read enable signal and a write enable signal to control the FIFO 1308. A ¼-pixel clock signal is supplied from the OR gate 1305 to serial-to-parallel converters 1310*a*, 1310*b*, 1310*c*, and 1310*d* so that the input signal is taken every 4 pixels and every 4 lines thereby converting each 16-pixel image signal into a 1-pixel image signal. The output signals of the serial-to-parallel converters 1310*a*–1310*d* are input to flip-flops (F/Fs) 1311*a*, 1311*b*, 1311*c*, and 1311*d*, respectively. The output signals of the flip-flops 1311*a*–1311*d* are input to a selector 1312. The output signal of the selector 1312 is input to a page memory 1313.

After the 16-pixel image signal is converted into the 1-pixel image signal by the serial-to-parallel converters 1310*a*–1310*d*, the resultant signal VO1 of the combination of 16 pixels is written into the page memory 1313 at a time determined by the flip-flops 1311*a*–1311*d* and the selector 1312. A select signal PSL is applied to the selector 1312 so that inputs 0, 1, 2, and 3 are selected periodically every 8 clocks. The signal VO1 is written into the page memory 1313 every 4 lines and every 64 clocks. As a result, the image signal is written in a skipped fashion so that the image signal is reduced to ¼ in both main and sub-scanning directions. Thus, the resultant image signal has a resolution corresponding to 100 dpi.

A control signal generator 1314 generates a write enable signal MWEN and address signals MAD, RAS, and CAS thereby controlling the page memory 1313.

Figure 15:
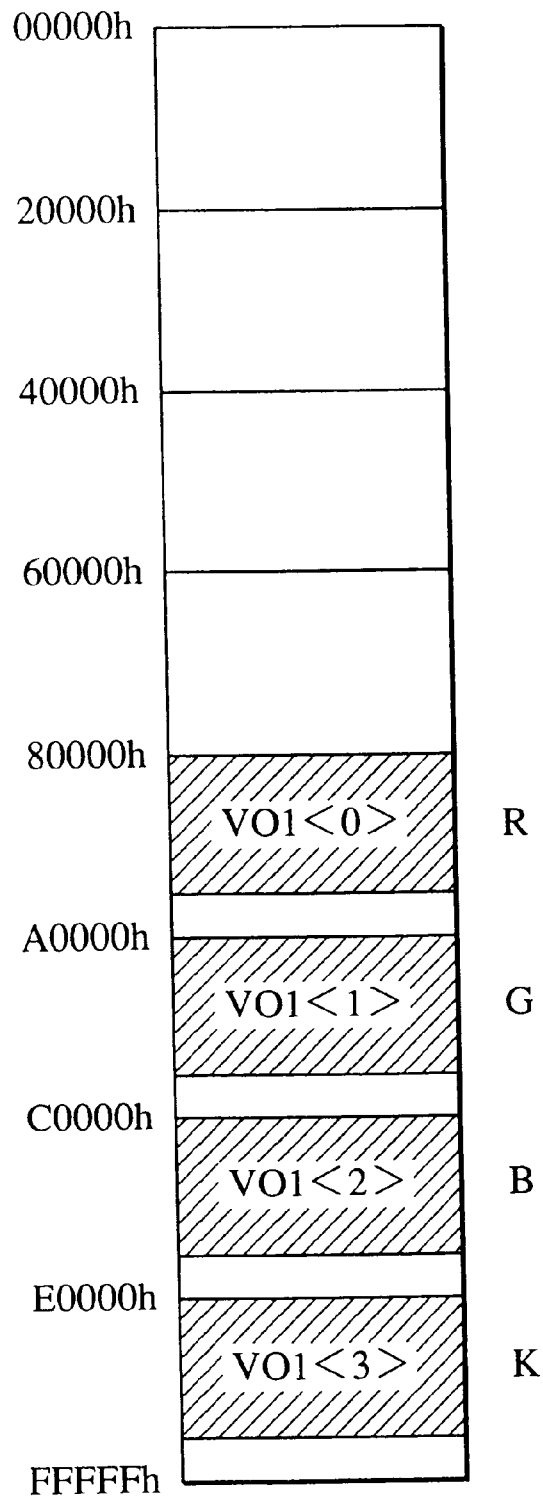
FIG. 15 is an address map associated with the operation of writing a signal into a page memory in the image processing apparatus.

FIG. 15 illustrates an address map at which the image signal is written into the page memory 1313. In FIG. 15, the memory area at addresses 80000h-FFFFFh is used to store area data wherein the memory area is divided into four blocks for storing R, G, B, and K signals, respectively.

Figure 17:
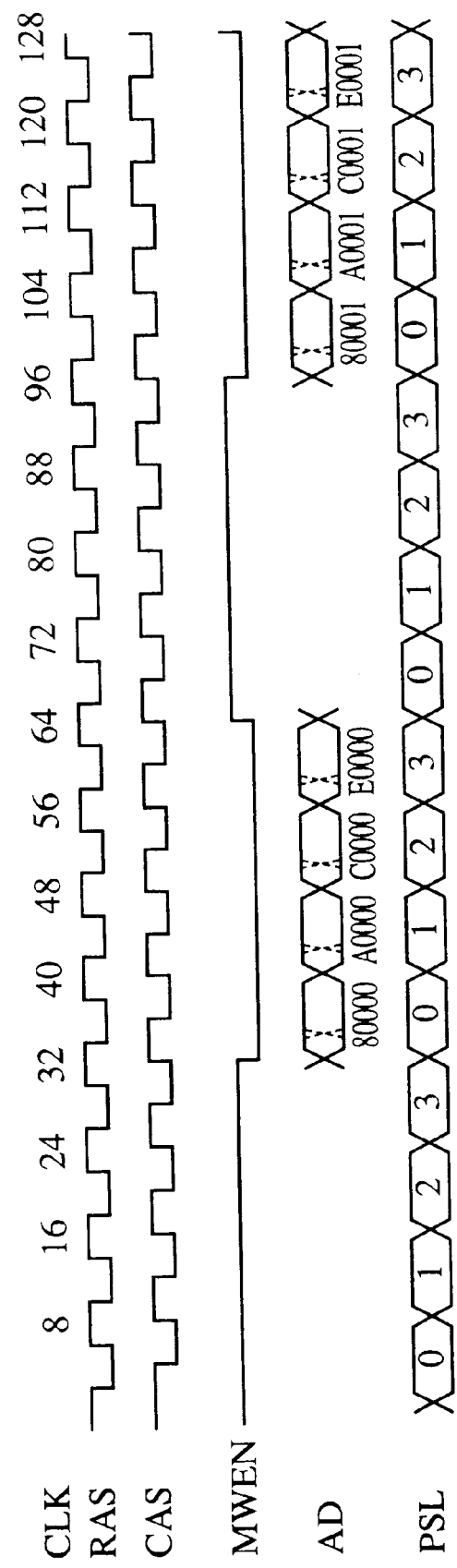
FIG. 17 is a timing chart associated with the control signals for controlling the operation of writing an image signal to the page memory in the image processing apparatus.

FIG. 17 illustrating the timing associated with the control signals for controlling the operation of writing the image signal to the page memory 1313. FIG. 17 illustrates the timing every 4 lines. As can be seen, 4 area image signals are written at different corresponding addresses every 64 clocks. No signals are written into the page memory 1313 for the first, second, and third lines.

Figure 14:
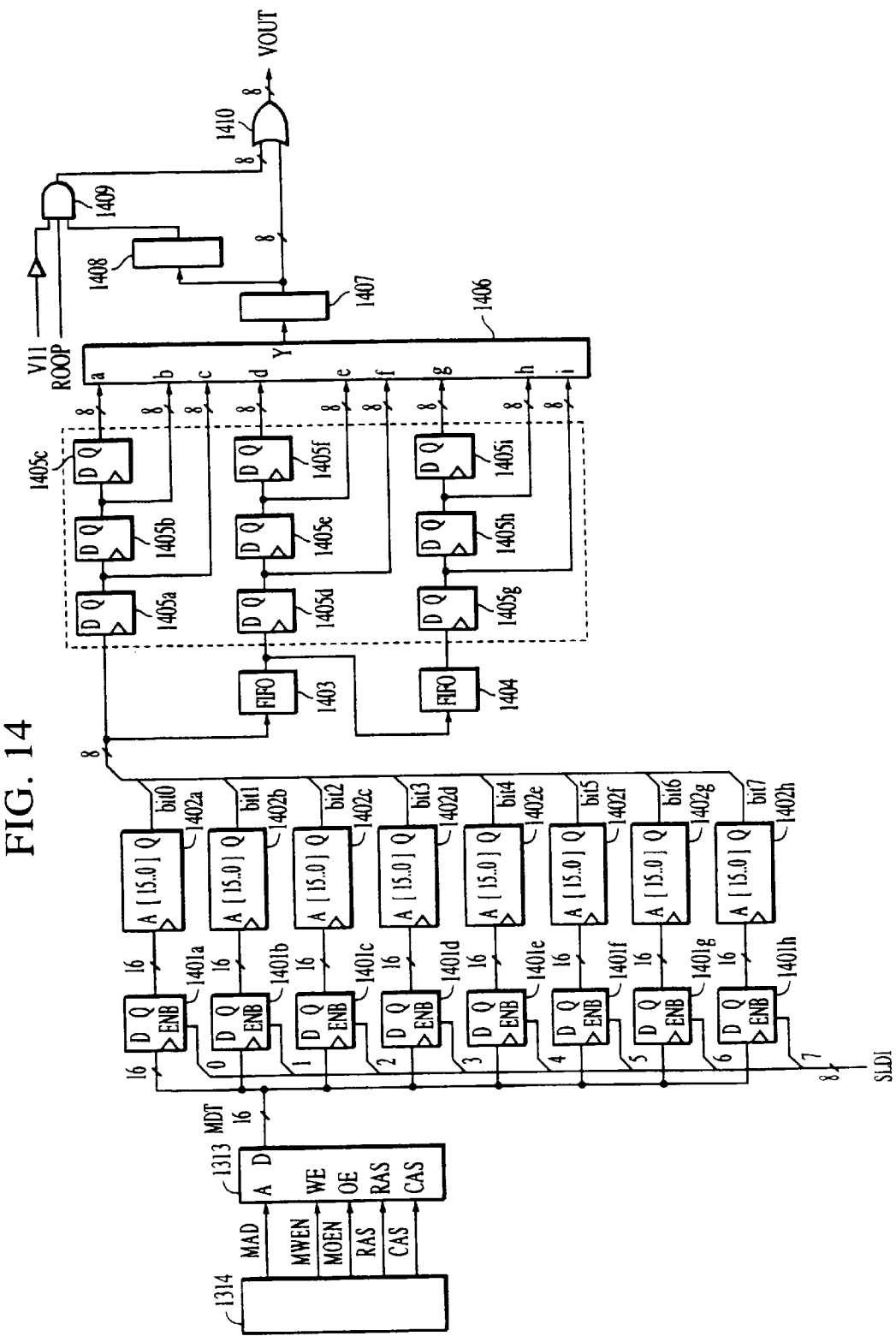
FIG. 14 is a block diagram illustrating the internal structure of the memory reading section of the area generating circuit in the image processing apparatus.

Referring to FIG. 14, the memory reading section of the area generating circuit 1160 shown in FIG. 12 will be described below. FIG. 14 is a block diagram illustrating the construction of the memory reading section of the area generating circuit 1160. In FIG. 14, flip-flops 1401*a*, 1401*b*, 1401*c*, 1401*d*, 1401*e*, 1401*f*, 1401*g*, and 1401*h* are switched every 8 clocks in response to an SLDI signal so that the image signal read from the page memory 1313 is latched by the flip-flops 1401*a*–1401*h* one by one. ¼ clock signals are applied from the respective flip-flops 1401*a*–1401*h* to corresponding parallel-to-serial converters 1402*a*, 1402*b*, 1402*c*, 1402*d*, 1402*e*, 1402*f*, 1402*g*, and 1402*h*, and the parallel-to-serial converters 1402*a*–1402*h* output an image signal of 16 pixels in a serial fashion from pixel to pixel. The same image signal is repeatedly output for 4 lines, and the image signal is updated every 4 lines.

Line memories (FIFO memories) 1403 and 1404 each produce a delay in the image signal by an amount corresponding to one line. The same image signals are output from these line memories for every 4 lines. The memory reading section also includes flip-flops 1405*a*, 1405*b*, 1405*c*, 1405*d*, 1405*e*, 1405*f*, 1405*g*, 1405*h*, and 1405*i*, wherein ¼ clock signals are input to the respective flip-flops.

A pattern detecting circuit 1406 compares 3×3 area signals with a plurality of patterns which have been stored beforehand. In accordance with the comparison result, a pattern output circuit 1407 outputs a proper pattern. As a result of the above process, the area signal is converted in resolution from 100 dpi to 400 dpi.

Figures 18A, 18B, 18C, 18D:
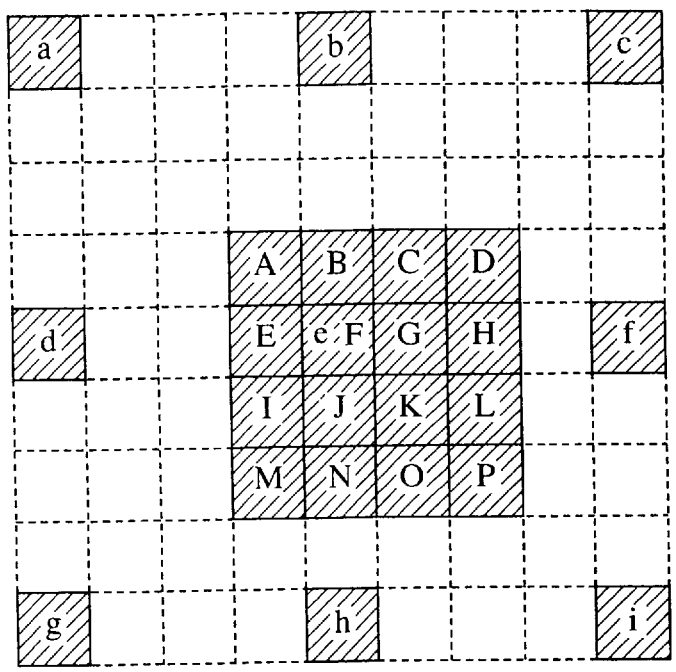
FIGS. 18 A–D illustrates patterns used in the image processing apparatus.

FIG. 18 illustrates an example of a pattern. In FIG. 18A, a, b, c, d, e, f, g, h, and i are 3×3 patterns used to detect the pattern. In FIG. 18*b*, a, b, c, d, e, f, g, h, and i are 3×3 patterns used to detect the pattern while A, B, C, D, E, F, G, H, I, J, K, L, M, N, O, and P are patterns corresponding to the area signals which are output after being converted to 400 dpi signals from the input patterns a–i. For example, if the pattern shown in FIG. 18C is detected by the pattern detecting circuit 1406, the pattern output circuit 1407 outputs the pattern shown in FIG. 18D.

In FIG. 14, an edge detecting circuit 1408 detects the outer edge of the area. In FIG. 14, V11 (K) denotes a bilevel 400 dpi black image signal, and ROOP denotes a signal indicating that the area of interest is a closed loop area. The signal ROOP is generated by referring to the addresses of the area memory, corresponding to the closed loop area. An AND gate 1409 converts the pixels, which are located in the vicinity of and outside of the closed loop area and which are not black signals, to area signals, and the obtained area signals are combined with other area signals via an OR gate 1410. In this way, the gap between the black signal and the closed loop area is filled.

FIG. 19 illustrates an example of the process performed on a portion located in the vicinity of and outside of a closed loop area. In FIG. 19A, a portion A is a closed loop area which is converted in resolution by the pattern output circuit 1407 shown in FIG. 14, while a portion B is a black image area. In the conversion process, it is concluded that the portion C in the vicinity of and outside of the closed loop area A must be within the area, and the portion C is incorporated into the area as shown in FIG. 19B.

Figure 16:
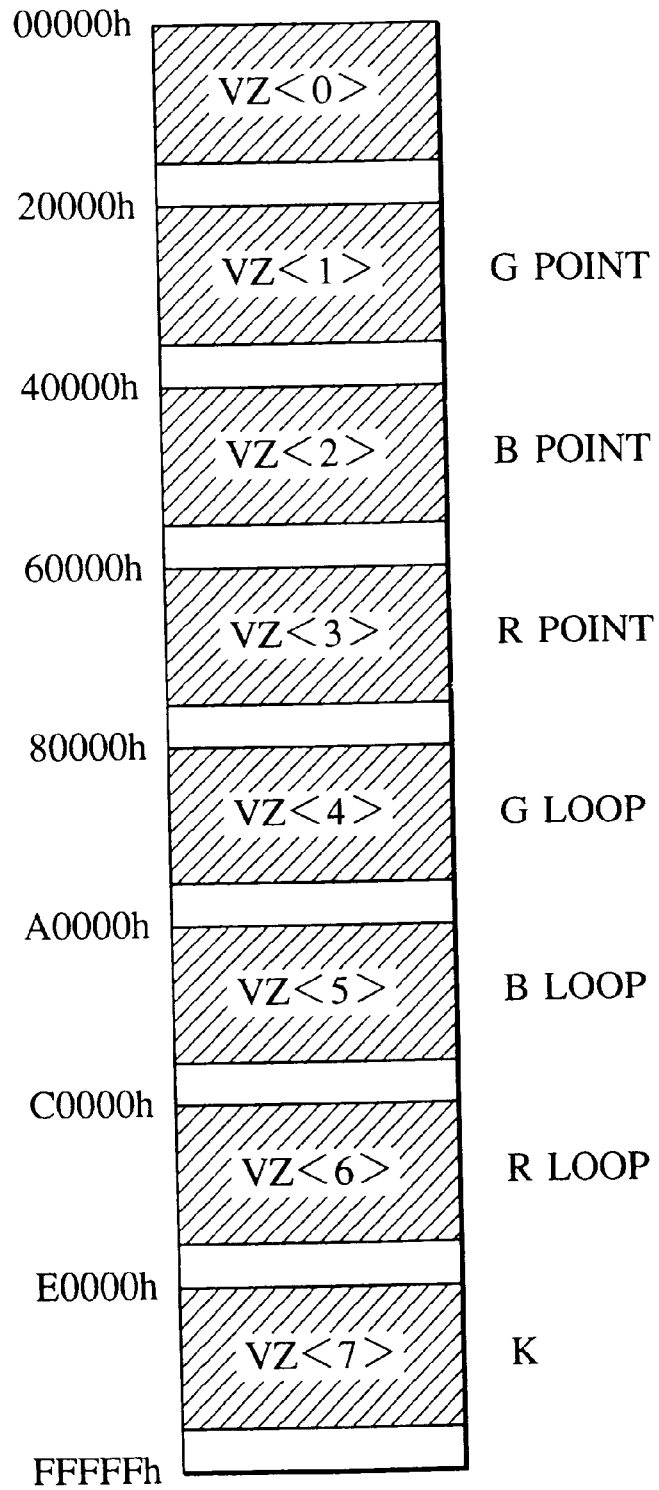
FIG. 16 is an address map associated with the operation of reading a signal from the page memory in the image processing apparatus.

FIG. 16 illustrates an example of a memory map associated with the operation reading a signal from the memory. As can be seen, the memory area is divided into 8 blocks corresponding to the respective colors of the edit area. In FIG. 16, the areas denoted by G, B, R points are such areas which are specified by a point and then edited. The areas denoted by G, B, R loops are such areas which are specified by a closed area and then edited. The area K is a black image area.

Figure 20:
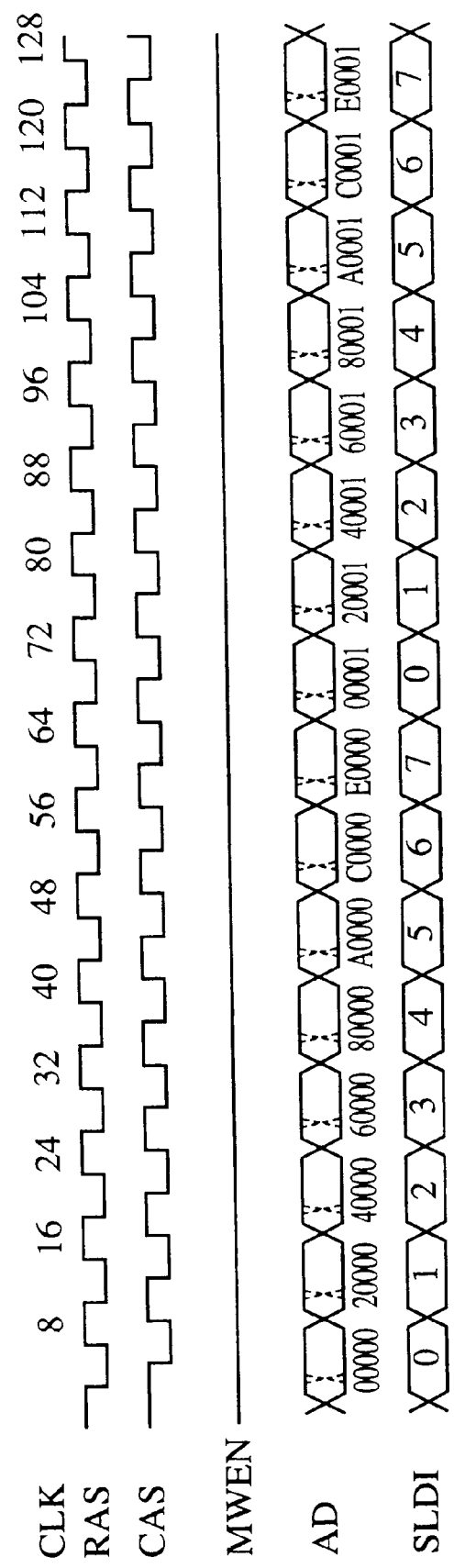
FIG. 20 is a timing chart associated with the control signals for controlling the operation of reading signals from the memory in the image processing apparatus.

FIG. 20 illustrates the timing associated with the control signals for controlling the operation of reading signals from the memory. As can be seen from FIG. 20, image signals are read one by one from the 8 blocks every 64 clocks. In the above operation of reading the image, the addresses are updated every 4 lines.

Figure 21:
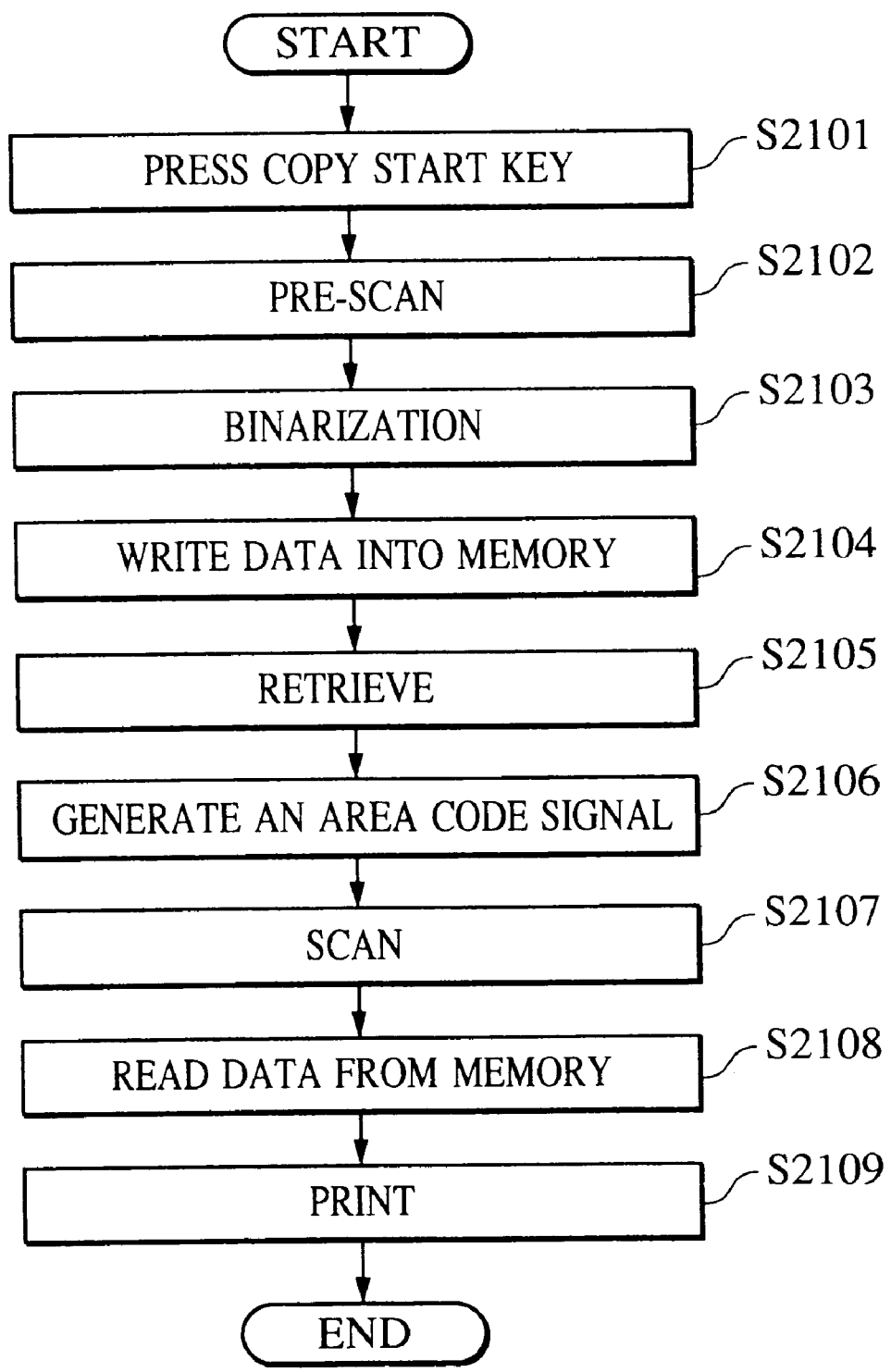
FIG. 21 is a flow chart illustrating the operation of the image processing apparatus.

Referring now to the flow chart shown in FIG. 21, the operation of the image processing apparatus described above will be described below. The operation shown in this flow chart is performed in accordance with the program stored in the ROM 1133 shown in FIG. 11. The CPU 1130 reads the program from the ROM 1133, and performs the process in accordance with the program.

First, an arbitrary edit area of a black-and-white document is marked for example with a color marker pen (such as a red marker pen). The document is then placed on the document glass plate 1005 shown in FIG. 10. Then in step S2101, the copy start key provided on the control panel 1005*a* shown in FIG. 10 is pressed. In step S2102, the document is pre-scanned via the optical system of the scanner unit 1002 shown in FIG. 10. Thus, image signals of R, G, and B are obtained. In step S2103, the obtained image signals R, G, and B are converted into an HSL space, and then binarized with reference to a threshold value within a particular range thereby generating marker signals of three colors R (red), G (green), and B (blue) and a black (Bk) image signal. In step S2104, the marker signals are input to the memory controller of the area generating circuit 1160 shown in FIG. 12 and the image signal of each color, which is reduced in data size by picking-up the signal every 4 pixels and every 4 lines, is written into the area memory.

In step S2105, the CPU 1130 or the area controller shown in FIG. 12 retrieves the addresses of the area memory where the R image signal is stored. Furthermore, in step S2106, the area inside the marker position corresponding to the addresses found in the previous step S2105 is filled with a corresponding color. Similar process is performed for other addresses so as to generate a 3-bit area code signal.

Then in step S2107, the document is scanned again via the optical system of the scanner unit 1002 shown in FIG. 10 so as to obtain an image signal again. In the next step S2108, the area code signal is read from the area memory, and converted from a serial form to a parallel form via the serial-to-parallel converters 1310*a*–1310*d*. During the above operation, the area code signal is also converted in resolution from 100 dpi to 400 dpi by means of pattern detection. In the above process, the gap between the black image and the closed loop area surrounded by the black image is filled. Furthermore, in step S2109, the image signal is developed by a proper developing unit of units 1017*y*, 1017*c*, 1017*m*, and 1017*k* shown in FIG. 10 thereby forming an image on a recording medium. The recording medium on which the image is formed is then ejected onto the tray 1030 shown in FIG. 10.

Fourth Embodiment

In the third embodiment described above, a gap between a 400-dpi black image signal and a closed loop area is detected and the detected gap is filled. The above process may also be performed by referring to a black image signal stored in the area memory. In this case, the 100-dpi black image signal stored in the area memory is removed by the CPU 1130 except for the image signal representing the closed loop. Then the image signal is read from the area memory, and only the area in the vicinity of the remaining 100-dpi black image signal area is examined to find a gap between the 400-dpi black image signal and the closed loop area. The detected gap is then filled.

In the third embodiment described above, only the black image signal is processed. Image signals of other colors may also be processed in a similar manner.

Furthermore, in the process of converting the resolution of an area, the resolution conversion may be performed either by means of pattern matching with respect to predetermined patterns or by using an image signal wherein the conversion may be performed in a fixed mode predetermined depending on the area specifying mode or the conversion mode may be automatically switched. The conversion mode may also be specified by a user via the control panel.

Fifth Embodiment

Figure 22:
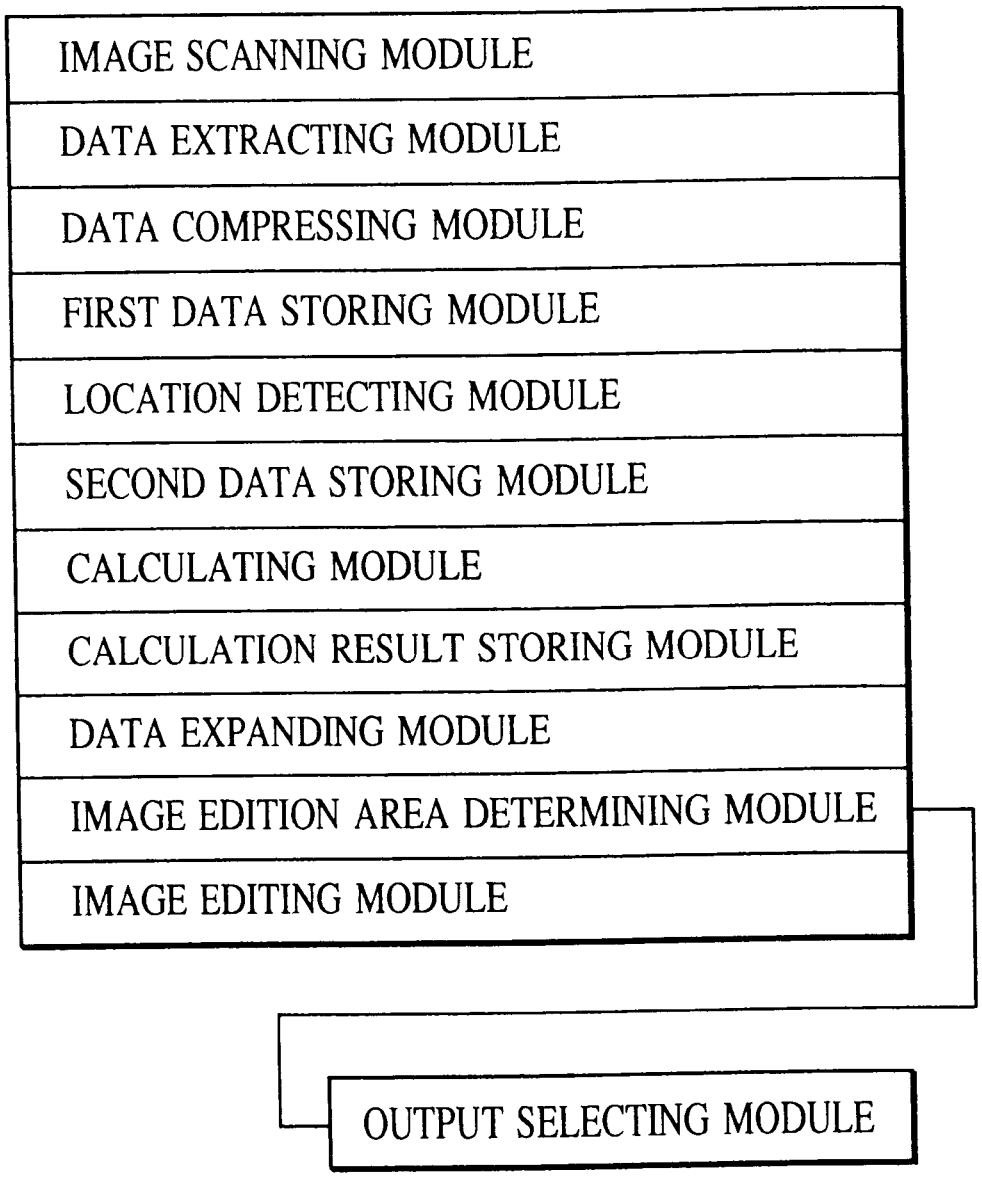
FIG. 22 is a schematic diagram illustrating various program modules of a program stored in a storage medium according to the present invention.
Figure 23:
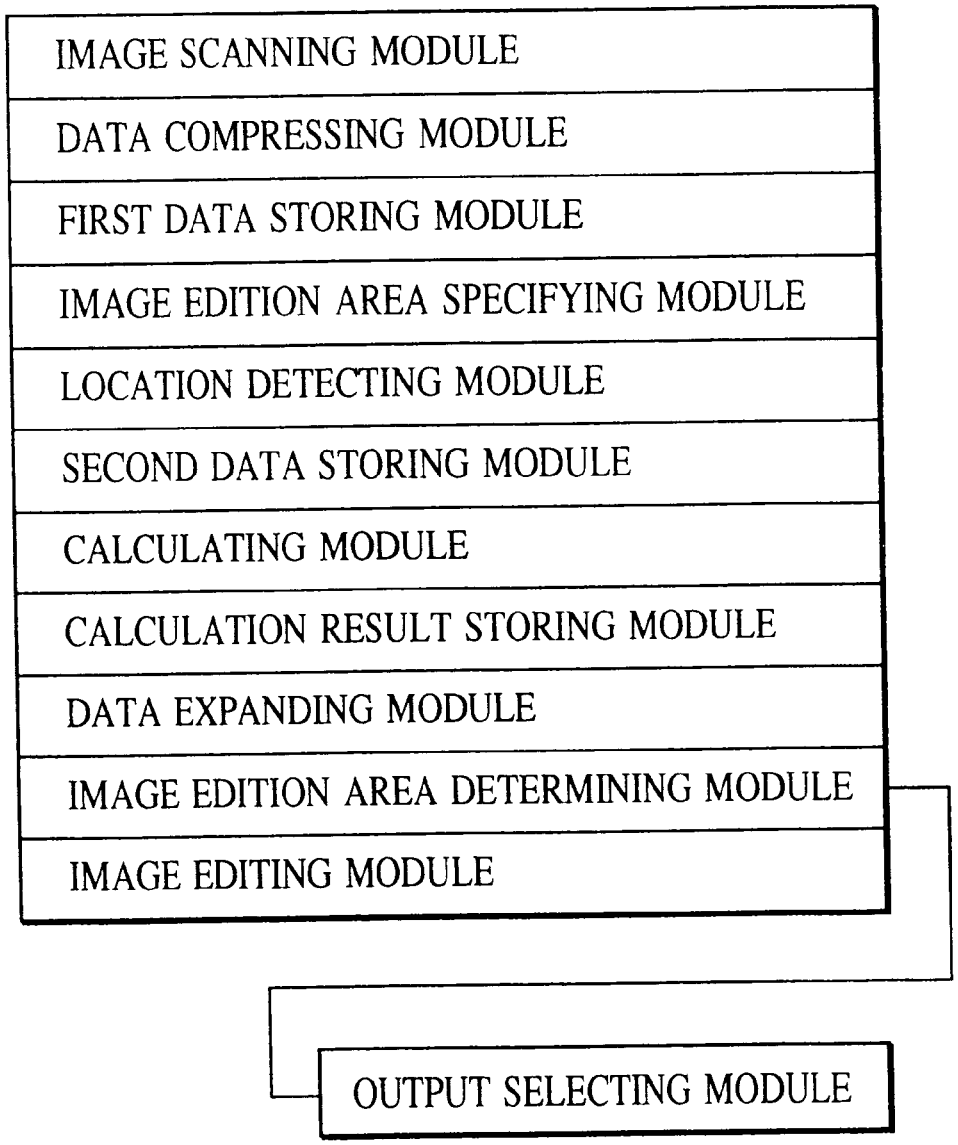
FIG. 23 is a schematic diagram illustrating various program modules of another program stored in a storage medium according to the present invention.

Referring now to FIGS. 22 and 23, a storage medium for use in the apparatus and method for processing an image, according to the present invention will be described below.

As shown in FIG. 22, the storage medium stores a program for controlling the image processing apparatus for performing an image editing operation, wherein the program includes at least a document scanning module, a data extracting module, a data compression module, a first data storing module, a position detecting module, a second data storing module, a calculation module, a calculation result storing module, a data expanding module, an edit area determining module, and an image editing module.

The document scanning module is a program module for scanning and sensing a document. The data extracting module is a program module for extracting data used to specify an image edit area from the document image data obtained by the document scanning module. The data compression module is a program module for compressing the document image data obtained by the document scanning module thereby generating first data. The first data storing module is a program module for storing the first data generated by the data compression module in a memory. The position detecting module is a program module for detecting the location, on the document, of the data specifying the image edit area extracted by the data extracting module. The second data storing module is a program module for storing second data in a memory at a particular location according to the output of the position detecting module. The calculation module is a program module for performing a calculation using the first data and the second data. The calculation result storing module is a program module for storing the calculation result obtained by the calculation module in a memory. The data expanding module is a program module for expanding data with reference to the document image data obtained by the document scanning module and the data stored in the above-described memory. The edit area determining module is a program module for employing the data expanded by the data expanding module as an edit area. The edit area determining module includes an output selecting module for selecting either the output of the data expanding module or the output of the calculation result storing module, in accordance with the data stored in the memory, and outputting the selected data. The image editing module is a program module for performing a predetermined editing process on the document image data obtained by the document scanning module in accordance with the output of the edit area determining module.

FIG. 23 illustrates another storage medium, different from that shown in FIG. 22, for storing a program for controlling the image processing apparatus for performing an image editing process, wherein the program includes at least a document scanning module, a data compression module, a first data storing module, an image area specifying module, a position detecting module, a second data storing module, a calculation module, a calculation result storing module, a data expanding module, an edit area determining module, and an image editing module.

The document scanning module is a program module for scanning and sensing a document. The data compression module is a program module for compressing the document image data obtained by the document scanning module thereby generating first data. The image area specifying module is a program module for specifying an image area. The first data storing module is a program module for storing the first data generated by the data compression module in a memory. The position detecting module is a program module for detecting the location on the document of the image area specified by the image area specifying module. The second data storing module is a program module for storing second data in a memory at a particular location according to the output of the position detecting module. The calculation module is a program module for performing a calculation using the first data and the second data. The calculation result storing module is a program module for storing the calculation result obtained by the calculation module in a memory. The data expanding module is a program module for expanding data with reference to the document image data obtained by the document scanning module and the data stored in the above-described memory. The edit area determining module is a program module for employing the data expanded by the data expanding module as an edit area. The edit area determining module includes an output selecting module for selecting either the output of the data expanding module or the output of the calculation result storing module in accordance with the data stored in the above-described memory and outputting the selected output. The image editing module is a program module for performing a predetermined editing process on the document image data obtained by the document scanning module in accordance with the output of the edit area determining module.

In FIGS. 22 and 23, the data specifying the image edit area may be a mark drawn on the document, wherein the mark may be a point, a closed curve, etc. The mark may be drawn with a fluorescent color.

Figure 24:
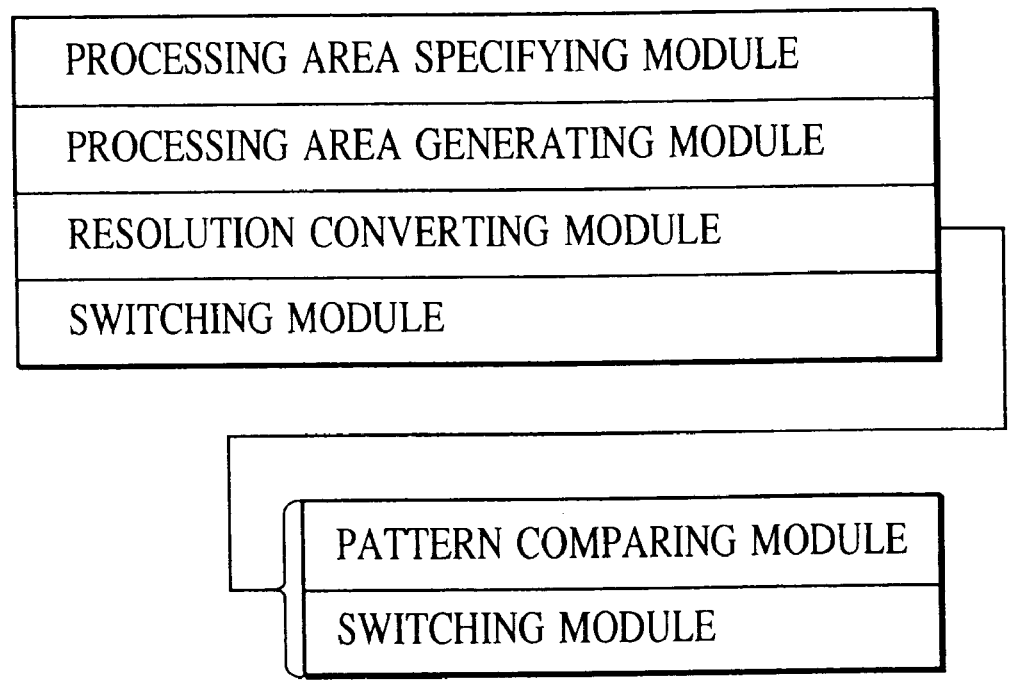
FIG. 24 is a schematic diagram illustrating various program modules of still another program stored in a storage medium according to the present invention.

FIG. 24 illustrates still another storage medium, different from those shown in FIGS. 22 and 23, for storing a program for controlling the image processing apparatus for performing an image editing process, wherein the program includes at least a processing area specifying module, a processing area generating module, a resolution converting module, and a switching module.

The processing area specifying module is a program module for specifying an image processing area. The processing area generating module is a program module for generating an image processing area in accordance with the input of the processing area specifying module. The resolution converting module is a program module for converting the resolution of the output signal generated by the processing area generating module to a value higher than that of the input signal of the processing area specifying module. The resolution converting module includes a pattern comparing module for comparing the shape of a part of the area generated by the processing area generating module with a plurality of shape patterns; and a resolution switching module for switching the conversion mode of the resolution converting module in accordance with the comparison result given by the pattern comparing module. The switching module is a program module for switching whether the image signal is used or not in accordance with the processing area specifying mode specified by the processing area specifying module. The comparing process performed by the pattern comparing module uses an image signal.

According to the above-described method and apparatus for processing an image, an edit area signal output from the memory is subjected to interpolation with reference to the edit area signal associated with neighboring pixels and with reference to the original image data thereby reducing gaps (white gaps) between the boundary line and the edit area without increasing the required memory capacity.

In the present embodiment, since the pattern matching is performed using the actual image data, fine structures which have been lost when the image data is written in the memory is recovered in the image which is finally output.

Furthermore, the storage medium of the invention can properly control the image processing apparatus to achieve the above advantages.

Sixth Embodiment

Referring now to FIGS. 25–29, a sixth embodiment of the present invention will be described below. In the present embodiment, the basic construction of the image processing apparatus is similar to that employed in the first embodiment described above with reference to FIGS. 1 and 2. Therefore these figures will also be referred to in the following description.

Figure 25:
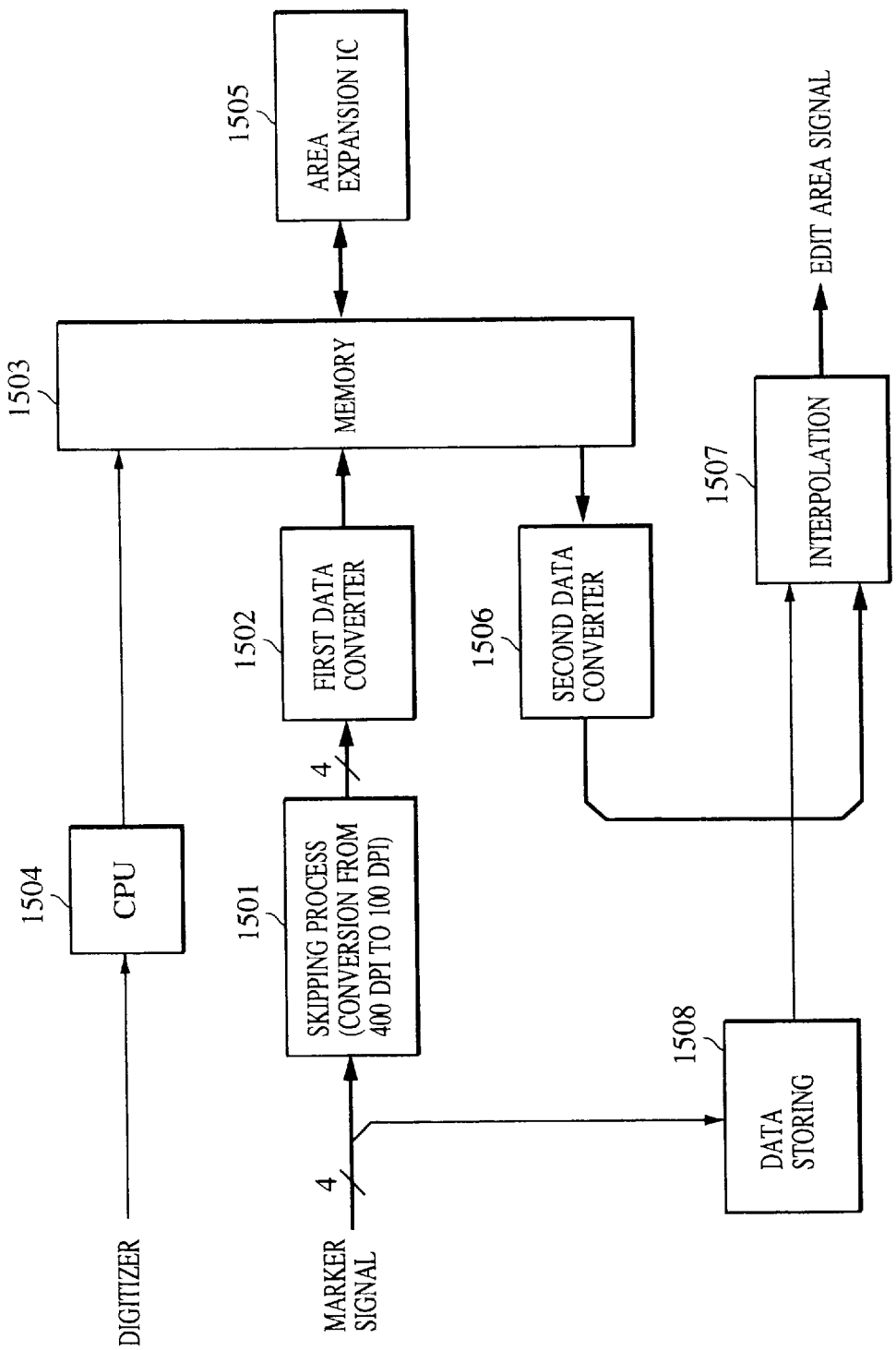
FIG. 25 is a block diagram illustrating the internal structure of an area signal generator according to a sixth embodiment of the invention.
Figure 26:
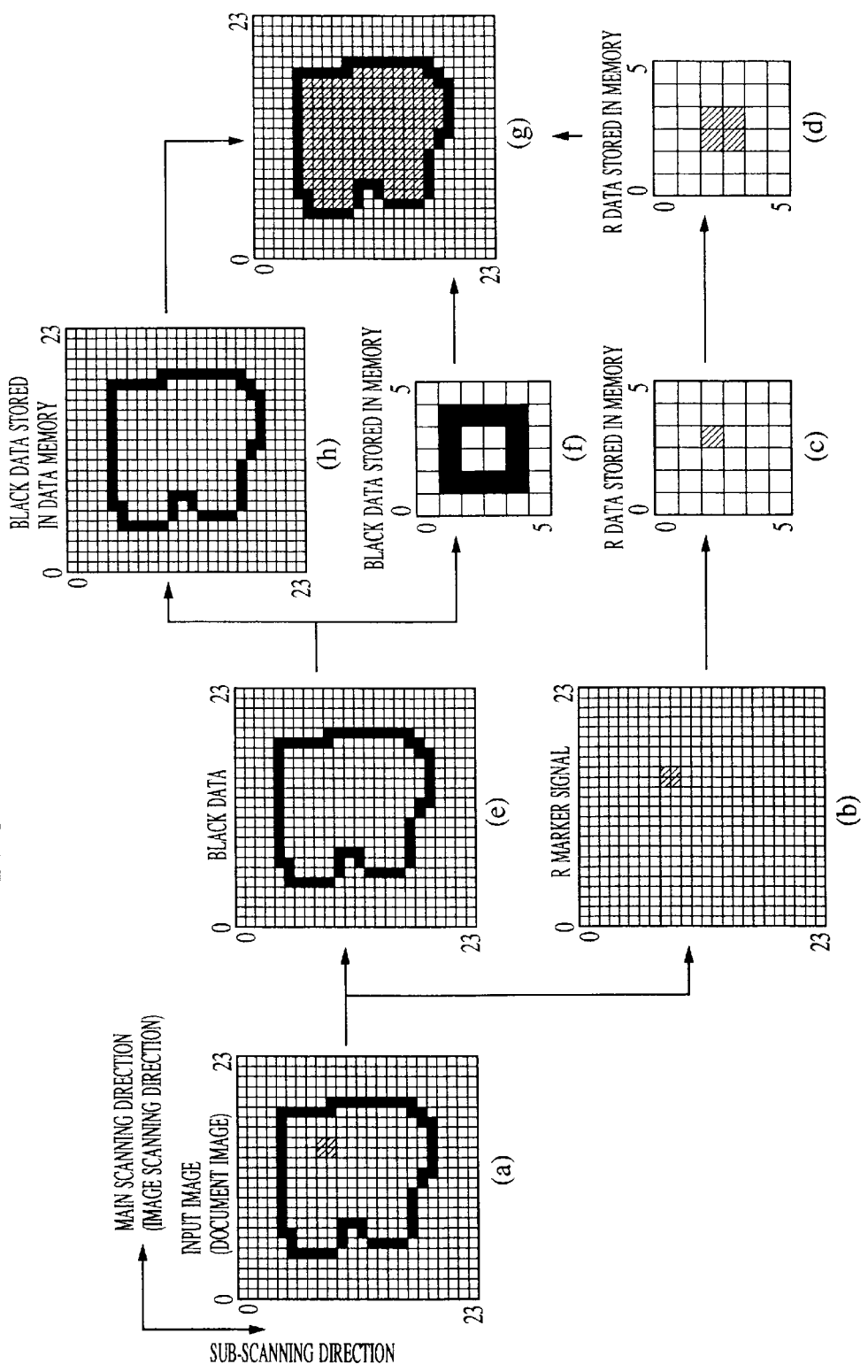
FIG. 26 is a schematic representation of interpolation process performed using an interpolation processing circuit of the area signal generator.

FIG. 25 illustrates the internal structure of the area signal generator 212 shown in FIG. 2. As shown in FIG. 25, the area signal generator 212 includes a data compression unit 1501, a first data converter 1502, a memory 1503, a CPU (central processing unit) 1504, an area expansion IC 1505, a second data converter 1506, an interpolation processing circuit 1507, and a data memory 1508.

Referring to FIG. 25, the operation of the area signal generator 212 of the present embodiment will be described below for a specific case where a 24 pixels×24 lines image data is sensed via the CCD sensor 10 (refer to FIG. 1) as shown in FIG. 26a. In FIG. 26a, a black line with a width equal to the size of one pixel represents a black image and four shaded pixels denote a red marker.

At the beginning of the operation associated with the area signal generator 212, the CCD sensor 10 (FIG. 1) scans and senses image data shown in FIG. 26a so as to detect an image area. A marker signal, which will be input to the area signal generator 212, is generated inside the RGB edit circuit 203 (refer to FIG. 2) from the data output from the CCD sensor 10. The marker signal consists of 4 bits representing black (K) data associated with the document image data and the respective marker colors R, G, and B.

FIGS. 26b and 26e illustrate the input marker signal and black data. In the following description, only the red marker signal and black data will be described.

If the area signal generator 212 receives the marker signal, the signal is supplied to the data compression unit 1501 and subjected to data compression processing. The black (K) data is stored in the data memory 1508 before being subjected to the data compression processing. The data compression unit 1501 performs the data compression processing in a manner similar to that employed in the conventional technique described above with reference to the block diagram shown in FIG. 39. Thus, the marker signal which originally consists of 16 pixels or 4 pixels×4 lines is compressed to data consisting of one pixel, and the resultant data is output. The black data (FIG. 26e) input to the data compression unit 1501 is also compressed in a similar manner and resultant data is output as shown in FIG. 26f.

The data output from the data compression unit 1501 is supplied to the first data converter 1502 and subjected to serial-to-parallel conversion. The resultant data is stored in the memory 1503. The image data shown in FIG. 26b and 26e are compressed by the data compression unit 1501 and the resultant compressed data is stored in the memory 1503 via the data converter 1502. FIGS. 26c and 26f illustrate the data compressed and stored in the memory 1503. FIG. 26h illustrates the data stored in the data memory 1508.

After being compressed and stored in the memory 1503, the red marker signal and black data are read from the memory 1503 and supplied to the area expansion IC (integrated circuit) 1505. The area expansion IC 1505 expands the area represented by the marker signal to the boundary line represented by the black data shown in FIG. 26f. In this specific example, a graphics processing IC AGDCII available from NEC is employed as the area expansion IC 1505 for expanding the area. AGDCII has various drawing commands. Of these commands, "fill" command is used to expand the area. FIG. 26*d* illustrates an expanded area signal. The expanded area signal is stored in the memory 1503.

After completion of the area expansion process by the area expansion IC 1505, the CCD sensor 10 (FIG. 1) starts an operation of scanning and sensing the image so as to obtain data used in printing operation. The second data converter 1506 starts to read the data representing the expanded area from the memory 1503 and performs process such as parallel-to-serial conversion which is inverse to the process performed by the data converter 1502. In synchronization with the area signal output from the second data converter 1506, the data memory 1508 sequentially outputs the K data (FIG. 26*h*) to the interpolation processing circuit 1507.

The interpolation processing circuit 1507 performs interpolation processing with reference to the area signal output from the memory 1503 and the K data supplied from the data memory 1508. The result is output as an edit area signal (FIG. 26*g*)

The signal from the digitizer is input to the CPU 1504. The output signal of the CPU 1504 is stored in the memory 1503.

Figure 27:
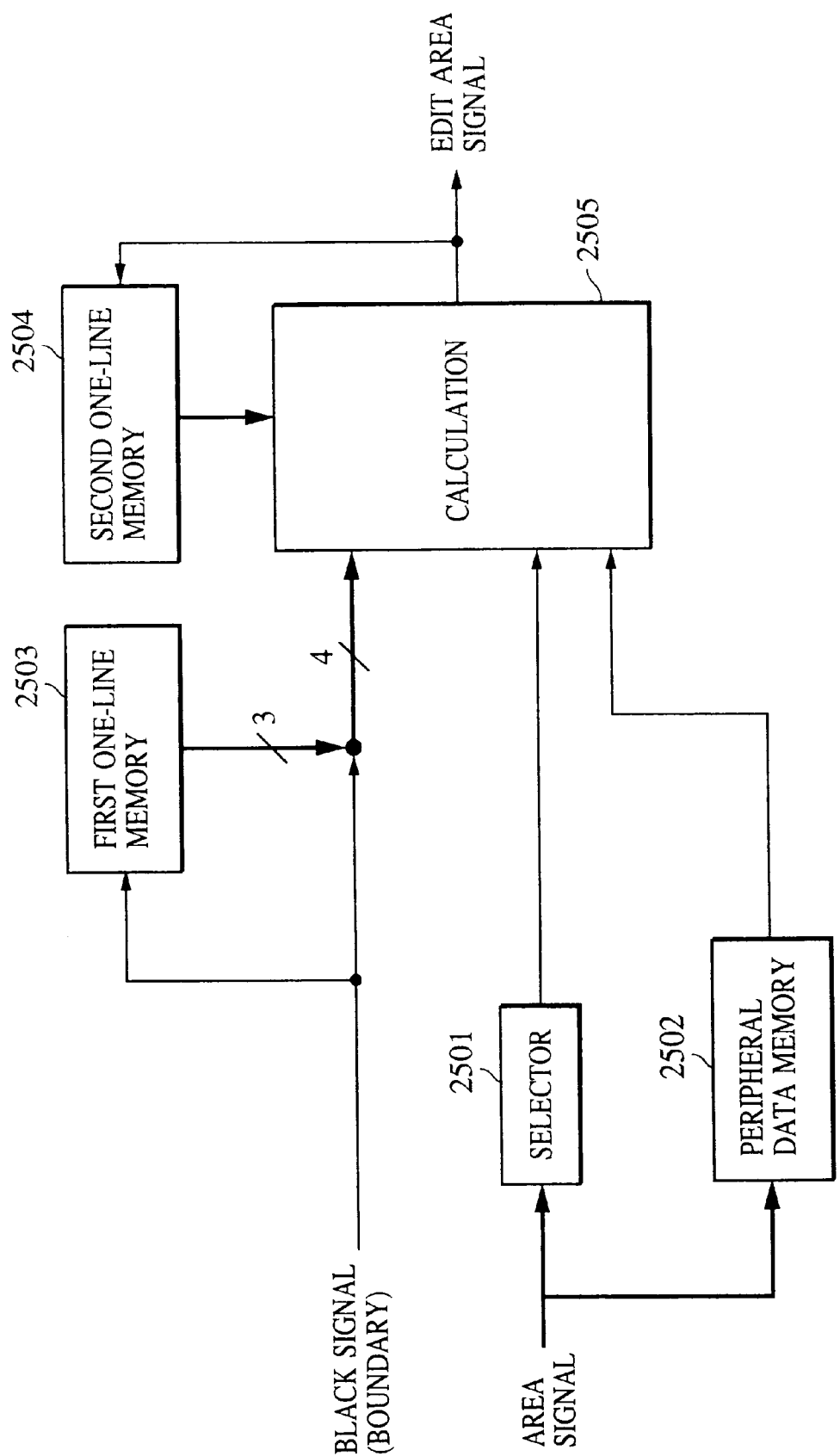
FIG. 27 is a block diagram illustrating the internal structure of the interpolation processing circuit in the area signal generator.

FIG. 27 illustrates the internal structure of the interpolation processing circuit 1507. In FIG. 27, a selector 2501 extracts a marker signal from the area signal output from the memory 1503 (FIG. 25). In this specific example, the R data shown in FIG. 26*d* is extracted. For example, when interpolation process is performed to obtain an edit area signal for the data at the ith pixel on the jth line of the input image (document image) shown in FIG. 26*a*, the data at the (i/4)th location in the main scanning direction and at the (j/4)th location in the sub-scanning direction is input to the selector 2501 (wherein decimal fractions are neglected). The data at that location is read from the memory 1503 (FIG. 25) and supplied to the calculation unit 2505 via the selector 2501.

A neighboring data memory 2502 is a memory area for storing data which is one pixel and one line ahead with respect to the data extracted by the selector 2501. For example, when interpolation process is performed to obtain an edit area signal for the data at the ith pixel on the jth line of the document, the data at the (i/4+1)th location in the main scanning direction and at the (j/4+1)th location in the sub-scanning direction is read from the memory 1503 (FIG. 25) and supplied to the calculation unit 2505 which will be described later. A first one-line memory 2503 stores one line of the black data (boundary line data) output from the first data memory 1508 (FIG. 25). For example, when the data at the (i+1)th pixel on the jth line is output from the data memory 1508, the first one-line memory outputs the data at (i−1)th, ith, and (i+1)th pixels on the (j−1)th line of the boundary line data.

A second one-line memory 2504 is a memory area for storing one line of the edit area signal output from the area signal generator 212 (FIG. 2). When data at the (i+1)th pixel on the jth line is output from the data memory 1508 (FIG. 25), the second one-line memory 2504 outputs an edit area signal at the (i−1)th pixel on the jth line, and at (i−1)th, ith, and (i+1)th pixels on the (j−1)th line. The calculation unit 2505 generates an edit area signal using data received from the selector 2501, the first one-line memory 2503, the second one-line memory 2504, and the neighboring data memory 2502.

For example when the calculation unit 2505 generates an edit area signal at the ith pixel on the jth line, it uses an edit area signal at the (i−1)th pixel on the jth line and (i−1)th, ith, and (i+1)th pixels on the (j−1)th line from the second one-line memory 2504; boundary line data at (i−1)th and ith pixels on the jth line and at (i−1)th, ith, and (i+1)th pixels on the (j−1)th line from the data memory 1508 and the first one-line memory 2503; memory data at the (i/4)th pixel on the (j/4)th line and also memory data at the (i/4+1)th pixel on the (j/4+1)th line from the selector 2501 and the neighboring data memory 2502.

Figure 29:
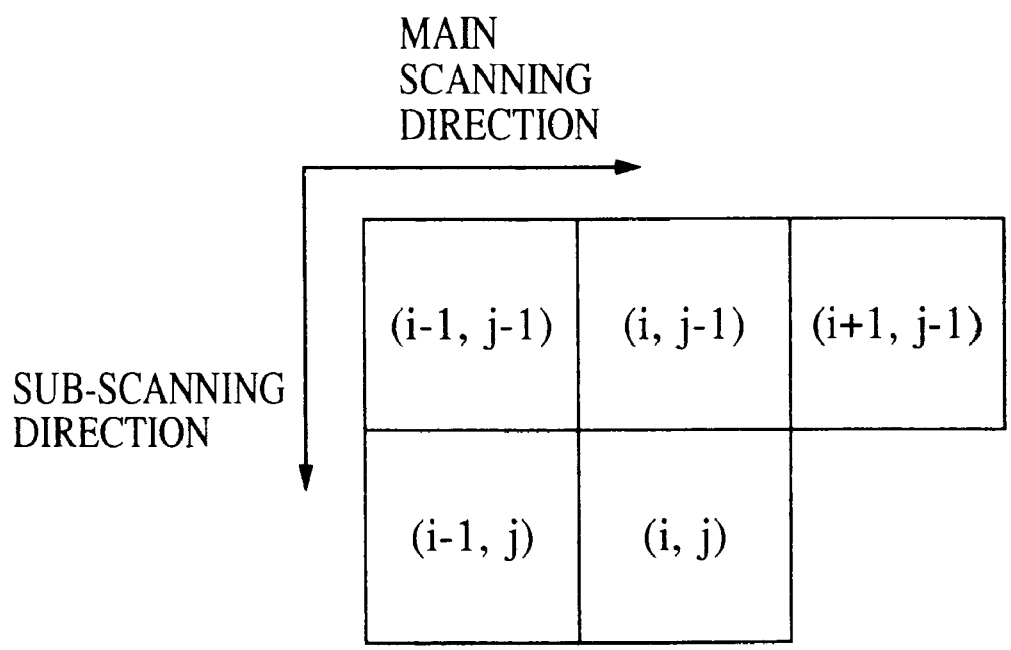
FIG. 29 is a schematic diagram illustrating the relationship between the data and the scanning direction of the calculation unit.

FIG. 28 illustrates the correspondence between the input data and the value output as an edit area signal. FIG. 29 illustrates the relationships among the number of lines, the number of input pixels, and the scanning direction, shown in the input-output correspondence table of FIG. 28.

In FIG. 28, for example, when the memory data at the (i/4)th pixel on the (j/4)th line input from the selector 2501 (FIG. 27) has a value at a level 1, the pixels at the ith through (i+3)th locations on jth through (j+3)th lines represented by the memory data are all within an edit area. In this case, the calculation unit 2505 (FIG. 27) outputs a 1-level signal as an edit area signal for the ith pixel on the jth line wherein the signal at the level 1 indicates that the pixel of interest is within the edit area. For example, the 12th pixel on the 12th line in FIG. 26*a* is such a case.

On the other hand, if the memory data input from the selector 2501 (FIG. 27) has a value at a level 0 indicating that the corresponding pixel is out of the edit area, and if the memory data output from the data memory 1508 (FIG. 25) has a value at a level 1 indicating that the data is a boundary line data (black data) at the ith pixel on the jth line, then the ith pixel on the jth line is located on the boundary line of the edit area or is out of the edit area, and thus the calculation unit 2505 (FIG. 27) outputs a 0-level signal as an edit area signal for the ith pixel on the jth line wherein the signal at the level 0 indicates that the pixel of interest is out of the edit area. For example, the 8th pixel on the 4th line in FIG. 26*a* is such as case.

If the memory data input from the selector 2501 (FIG. 27) has a value at a level 0 indicating that the data is out of the edit area and if the memory data output from the data memory 1508 (FIG. 25) has a value at a level 0 indicating that the data is not a boundary line data (black data) at the ith pixel on the jth line, then the calculation unit 2505 outputs an edit area signal for the ith pixel on the jth line at a level determined by referring to the boundary line data of neighboring pixels and the edit area signals of neighboring pixels output from the second one-line memory 2504 (FIG. 27). For example, the 8th pixel on the 5th line, the 18th pixel on the 10th line, etc., in FIG. 26*a* are such cases.

In the case of patterns 10, 11, 14, and 15 shown in FIG. 28, however, if the edit area signals at neighboring pixels are referred to, the signals can be at the outside of the boundary line. To avoid the above problem, the memory data at the (i/4)th pixel on the (i/4+1)th line output from the neighboring data memory 2502 (FIG. 27) is output as an edit area signal for the above-described four cases. For example, the 7th pixel on the 5th line, the 6th pixel on the 13th line, etc., in FIG. 26*a* are such cases.

FIG. 26*g* illustrates the result of the above interpolation process performed on the document image shown in FIG. 26*a*. In this way, all pixels inside the black data representing the boundary line are taken into the edit area as shown in FIG. 26*g*.

In the specific example described above, the edit area is specified by indicating one point on the document with a marker. However, the edit area may also be specified using a digitizer. In this case, as a marker signal to the area signal generator 212 (FIG. 2), only black data representing an image (boundary line) is written via the CPU 1504 (FIG. 25) in the memory 1503 (FIG. 25) at the corresponding locations. After that, the operation is performed in a manner similar to the above example.

Seventh Embodiment

Figure 30:
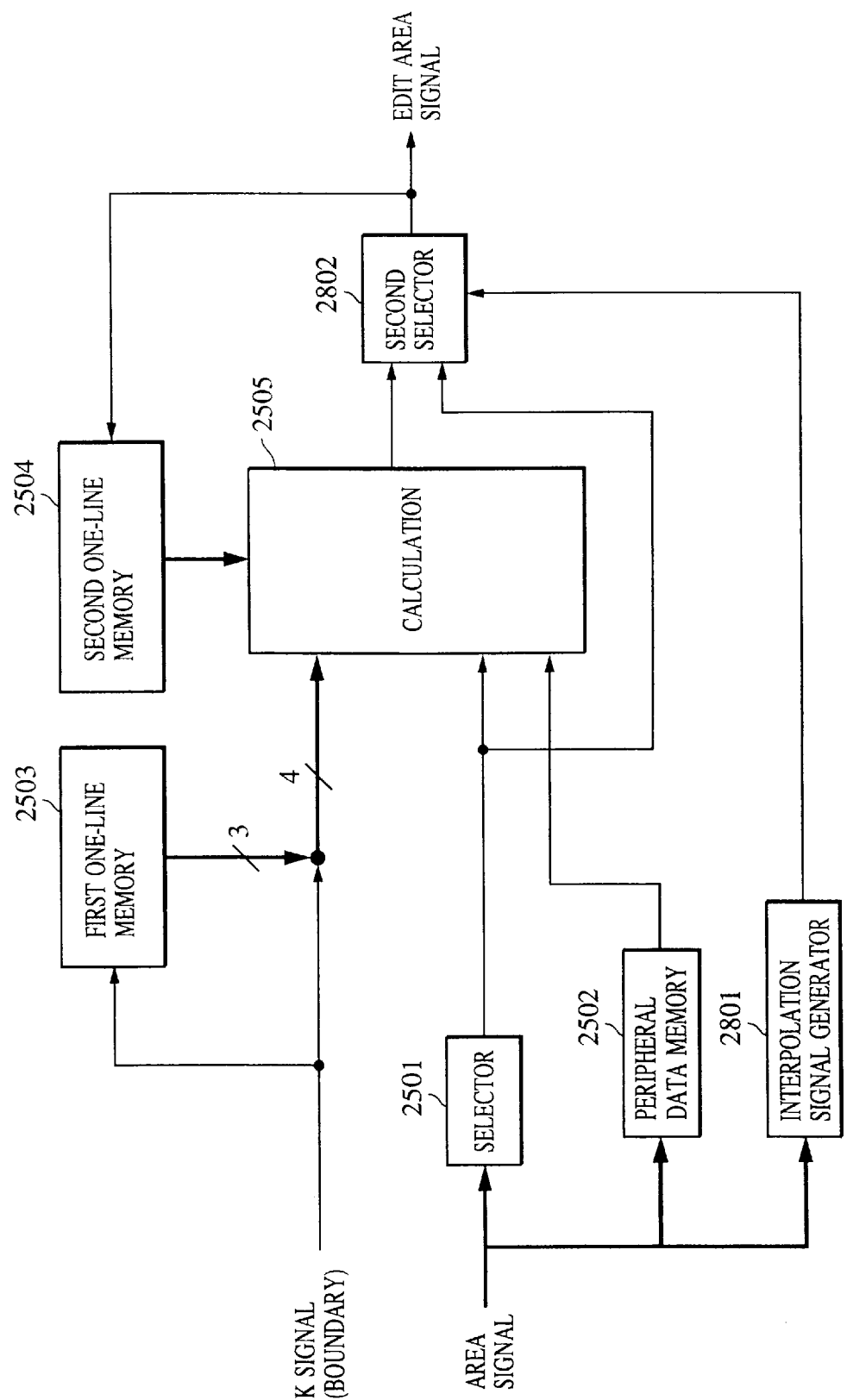
FIG. 30 is a block diagram illustrating the internal structure of an interpolation processing circuit of an area signal generator in an image processing apparatus according to a seventh embodiment of the invention.
Figure 31:
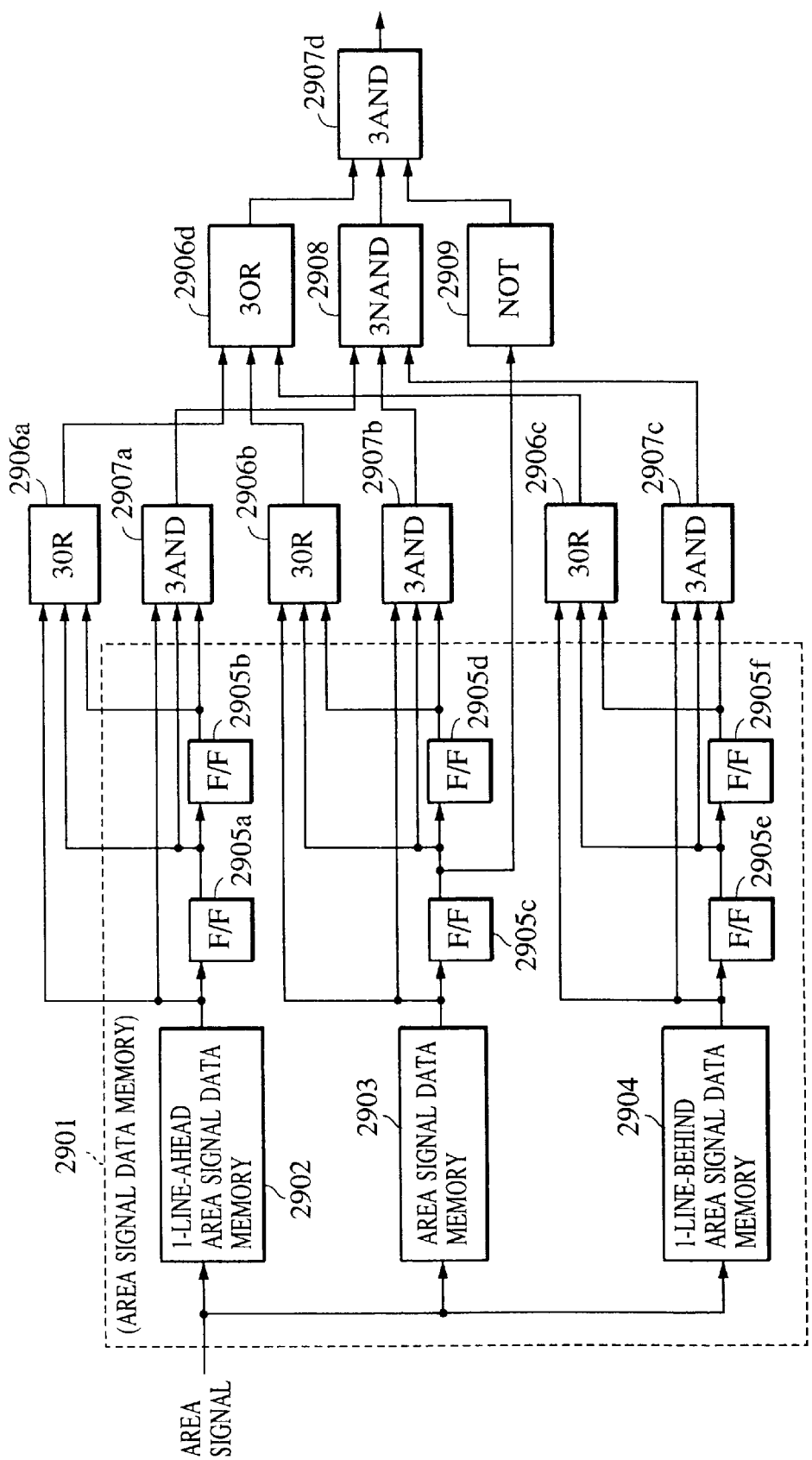
FIG. 31 is a block diagram illustrating the details of the interpolation processing circuit of the area signal generator.

Referring to FIGS. 30 and 31, a seventh embodiment of the invention will be described below. In the present embodiment, the basic construction of the image processing apparatus is similar to that employed in the first embodiment described above with reference to FIGS. 1 and 2, and that employed in the sixth embodiment described above with reference to FIG. 25. Therefore these figures will also be referred to in the following description.

FIG. 30 is a block diagram illustrating the internal structure of an interpolation processing circuit used in the image processing apparatus according to the seventh embodiment of the invention. FIG. 31 is a block diagram illustrating the details of the interpolation signal generator shown in FIG. 30.

In FIG. 30, parts or elements similar to those of the first embodiment shown in FIG. 5 are denoted by similar reference numerals. The interpolation processing circuit shown in FIG. 30 differs from that shown in FIG. 5 in that it further includes the interpolation signal generator 2801 and a second selector 2802.

The interpolation signal generator 2801 stores 9 data consisting of 3 data of an area signal in the main scanning direction×3 data in the sub-scanning direction output from the memory 1503 (FIG. 25), and performs calculation to determine the area where interpolation is to be performed. The second selector 2802 outputs the signal from the calculation unit 2505 as an edit area signal when the interpolation signal generator 2801 outputs an interpolation signal (=1), while the second selector 2802 outputs the edit signal, which has been output from the selector 2501 and stored in the memory 1503 (FIG. 25), as an edit area signal if no interpolation signal is output (that is, if the output signal of the interpolation signal generator is at a 0 level).

FIG. 31 illustrates the internal structure of interpolation signal generator 2801. In FIG. 31, an area signal memory 2901 stores 9 data consisting of 3 data of an area signal in the main scanning direction×3 data in the sub-scanning direction output from the memory 1503 (FIG. 25). The area signal memory 2901 includes an one-line-ahead area signal data memory 2902, an area signal data memory 2903, an one-line-behind area signal data memory 2904, and first through sixth flip-flops (F/Fs) 2905a–2905f.

The interpolation signal generator 2801 also includes first through fourth 3-input OR gates 2906a–2906d. The input terminals of the first 3-input OR gate 2906a are connected to the output terminal of the output terminal of the one-line-ahead area signal data memory 2902, and the output terminals of the first and second flip-flops 2905a and 2905b, respectively. The input terminals of the second 3-input OR gate 2906b are connected to the output terminal of the area signal data memory 2903 and the output terminals of the third and fourth flip-flops 2905c and 2905d, respectively. The input terminals of the third 3-input OR gate 2906c are connected to the output terminal of the one-line-behind area signal data memory 2904 and the output terminals of the fifth and sixth flip-flops 2905e and 2905f, respectively. The output terminals of the first through third 3-input OR gates 2906a–2906c are connected to the respective input terminals of the fourth 3-input OR gate 2906d.

The 3-input OR gate 2906d outputs a signal representing the result of OR operation among 9 area data stored in the area signal memory 2901. If at least one of the area signals stored in the area signal memory 2901 has a value at a level 1 which indicates that the data of interest is within an edit area, the 3-input OR gate 2906d outputs a 1-level signal.

The input terminals of a first 3-input AND gate 2907a are connected to the output terminal of the one-line-ahead area signal data memory 2902 and the output terminals of the first and second flip-flops 2905a and 2905b, respectively. The input terminals of a second 3-input AND gate 2907b are connected to the output terminal of the area signal data memory 2903 and the output terminals of the third and fourth flip-flops 2905c and 2905d, respectively. The input terminals of a third 3-input AND gate 2907c are connected to the output terminal of the one-line-behind area signal data memory 2904 and the output terminals of the fifth and sixth flip-flops 2905e and 2905f, respectively. The input terminals of a fourth 3-input AND gate 2907d are connected to the output terminal of the fourth 3-input OR gate 2906d, the output terminal of a 3-NAND circuit 2908 which will be described later, and the output terminal of a NOT gate 2909 which will be described later, respectively.

The condition for the fourth 3-input AND gate 2907d to output an interpolation signal at a level 1 is that the data of interest (the central data) is not within an edit area and some neighboring data is within the edit area, that is, the data of interest is in contact with the edit area.

The input terminals of the 3-input NAND gate 2908 are connected to the respective output terminals of the first through third 3-input AND gates 2907a–2907c. The output terminal of 3-input NAND gate 2908 is connected to an input terminal of the fourth 3-input AND gate 2907d. The 3-input NAND gate 2908 outputs a signal representing the result of NAND operation among 9 area data stored in the area signal memory 2901. Therefore, if at least one of the area signals stored in the area signal memory 2901 has a value at a level 0 which indicates that the data is not within an edit area, the 3-input NAND gate 2908 outputs a 1-level signal.

The input of the NOT gate 2909 is connected to the output terminal of the third flip-flop 2905c and the output terminal of the NOT gate 2909 is connected to an input terminal of the fourth 3-input AND gate 2907d. The NOT gate 2909 outputs a signal which is an inverted signal of the central data of the 9 area signal data stored in the area signal memory 2901. Accordingly, "1" is output when the central data stored in the area signal memory 2901 is "0" which indicates that the data is not within an edit area.

In this embodiment of the invention, as described above, the interpolation processing circuit 1507 (FIG. 25) of the image processing apparatus outputs an edit area signal in such a manner that when the data stored in the memory 1503 (FIG. 25) is in contact with the edit area signal, the data is output after being subjected to interpolation process in the calculation unit 2505 (FIG. 30), while the edit area signal from the memory 1503 (FIG. 25) is directly output for the other portions. This makes it possible to perform interpolation process only on such portions near the boundary line where a white gap can appear.

Eighth Embodiment

Figure 32:
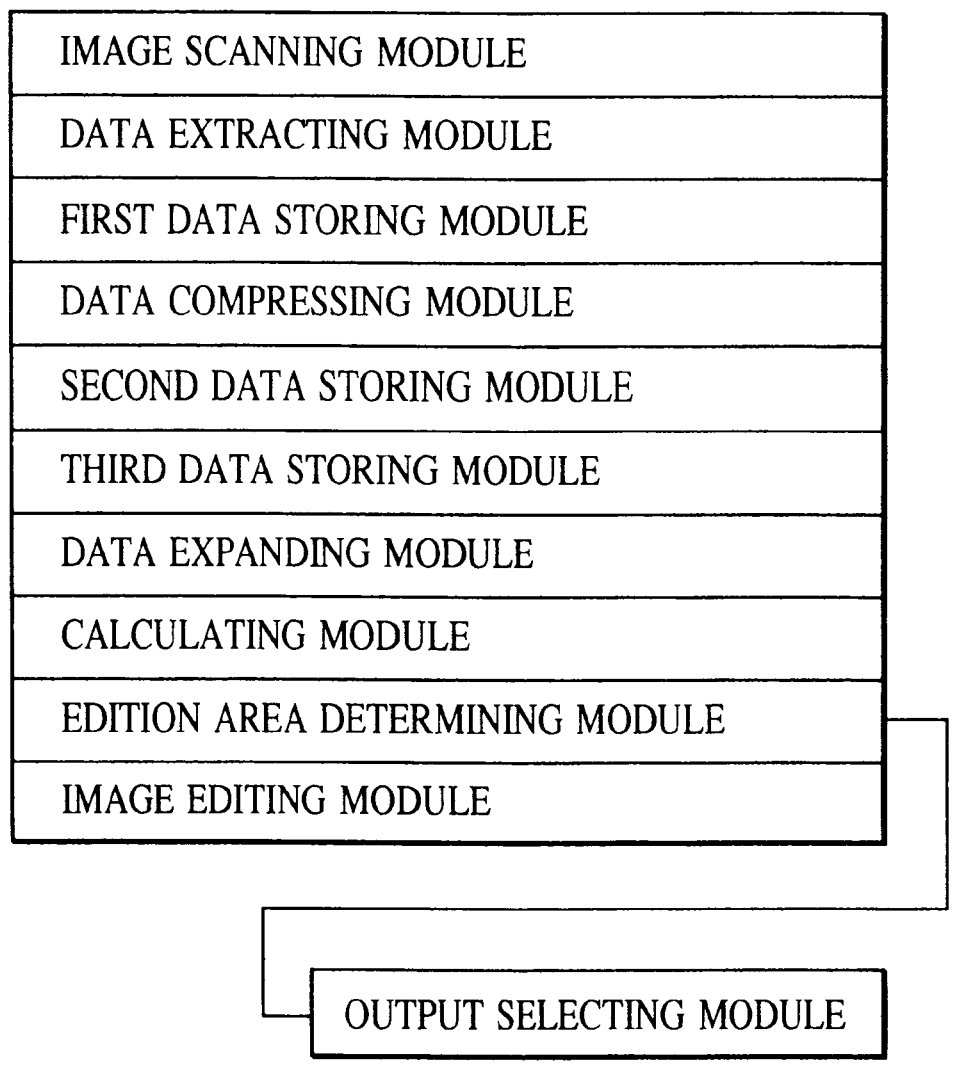
FIG. 32 is a schematic diagram illustrating various program modules of a program stored in a storage medium according to the present invention.
Figure 33:
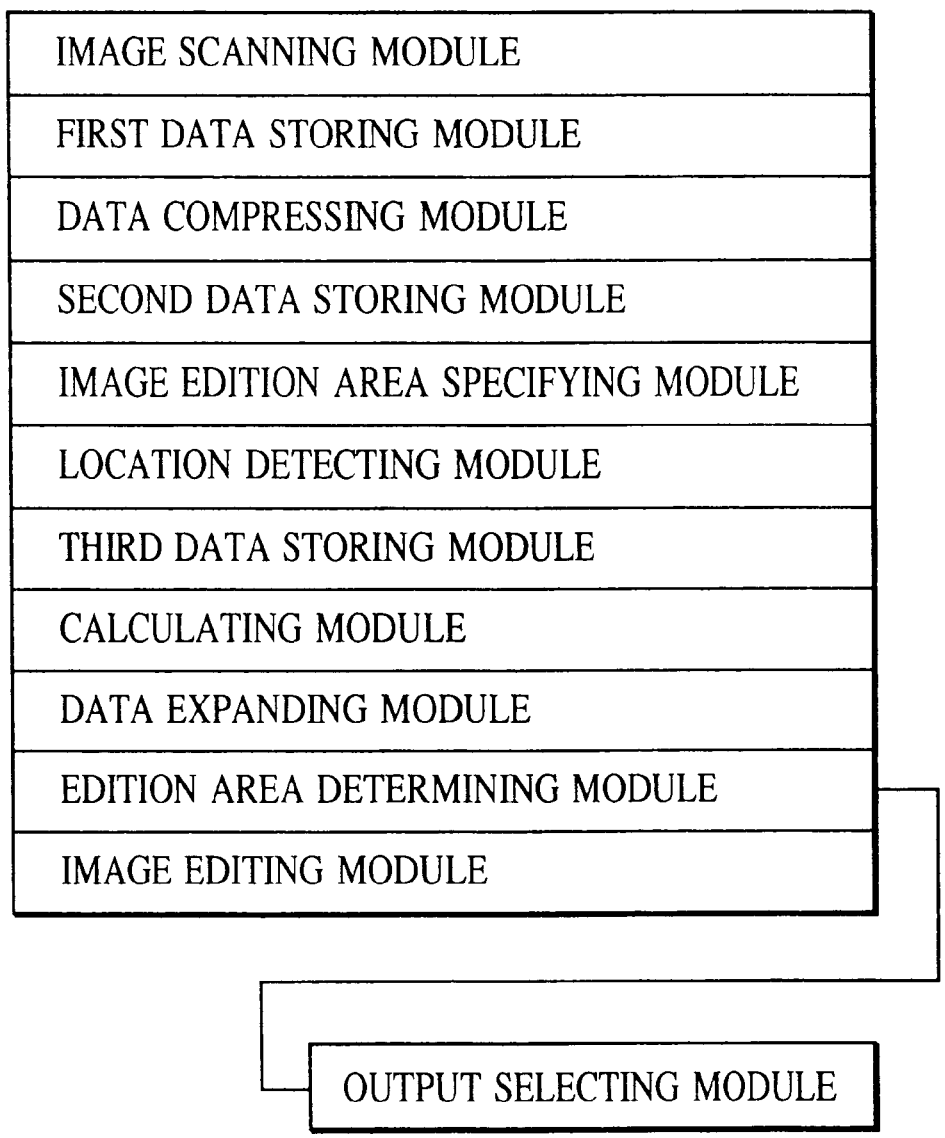
FIG. 33 is a schematic diagram illustrating various program modules of another program stored in a storage medium according to the present invention.

Referring now to FIGS. 32 and 33, a storage medium for use in the apparatus and method for processing an image according to the present invention will be described below.

As shown in FIG. 32, the storage medium stores a program for controlling the image processing apparatus for performing an image editing operation, wherein the program includes at least a document scanning module, a data extracting module, a first data storing module, a data compression module, a second data storing module, a third data storing module, a data expanding module, a calculation module, an edit area determining module, and an image editing module.

The document scanning module is a program module for scanning and sensing a document. The data extracting module is a program module for extracting first data used to specify an image edit area and second data representing the boundary line of the image edit area from the document image data obtained by the document scanning module. The first data storing module is a program module for storing the second data output by the data extracting module in a first memory. The data compression module is a program module for compressing the first and second data output by the data extracting module thereby generating first and second compressed data.

The second data storing module is a program module for storing said first compressed data generated by the data compression module in a second memory. The third data storing module is a program module for storing the second compressed data generated by the data compression module in a third memory. The data expanding module is a program module for expanding data with reference to the document image data obtained by the document scanning module and the data stored in the respective memories. The calculation module is a program module for performing a calculation using the first compressed data and the second compressed data.

The edit area determining module is a program module for determining an edit area with reference to the second data stored in the first memory and the calculation result obtained by the calculation module. The edit area determining module includes an output selecting module for selecting either the output of the data expanding module or the output from the memory storing the calculation result, in accordance with the calculation result stored in the above memory, and outputting the selected data. The image editing module is a program module for performing a predetermined editing process on the document image data obtained by the document scanning module for the image data in the edit area determined by-the edit area determining module, in accordance with the edit signal output by the edit area determining module. The calculation result of the calculation module is stored at least in either the second memory or the third memory.

In FIGS. 32 and 33, the data specifying the image edit area may be a mark drawn on the document, wherein the mark may be a point, a closed curve, etc. The mark may be drawn with a fluorescent color.

FIG. 33 illustrates another storage medium, different from that shown in FIG. 32, for storing a program for controlling the image processing apparatus for performing an image editing process, wherein the program includes at least a document scanning module, a first data storing module, a data compression module, a second data storing module, an image edit area specifying module, a position detecting module, a third data storing module, a calculation module, a data expanding module, an edit area determining module, and an image editing module.

The document scanning module is a program module for scanning and sensing a document. The first data storing module is a program module for storing the document image data obtained by said document scanning module in a first memory. The data compression module is a program module for compressing the document image data obtained by said document scanning module. The second data storing module is a program module for storing the compressed data obtained by the data compression module in a second memory. The image edit area specifying module is a program module for specifying an image edit area.

The position detecting module is a program module for detecting the location on the document of the image edit area specified by the image edit area specifying module. The third data storing module is a program module for storing data in the second memory at a particular location according to the output by the position detecting module. The calculation module is a program module for performing a calculation using the data stored in the first memory and the data stored in the second memory. The data expanding module is a program module for expanding data with reference to the document image data obtained by the document scanning module and the data stored in the respective memories.

The edit area determining module is a program module for determining an edit area with reference to the image data stored in the above-described memory and the calculation result of the calculation module. The image editing module is a program module for performing a predetermined editing process on the document image data obtained by the document scanning module for the image data in the edit area determined by the edit area determining module, in accordance with the edit signal output by the edit area determining module. The calculation result of the calculation module is stored at least in either the second memory or the third memory.

In FIGS. 32 and 33, the data specifying the image edit area may be a mark drawn on the document, wherein the mark may be a point, a closed curve, etc. The mark may be drawn with a fluorescent color.

Figure 34:
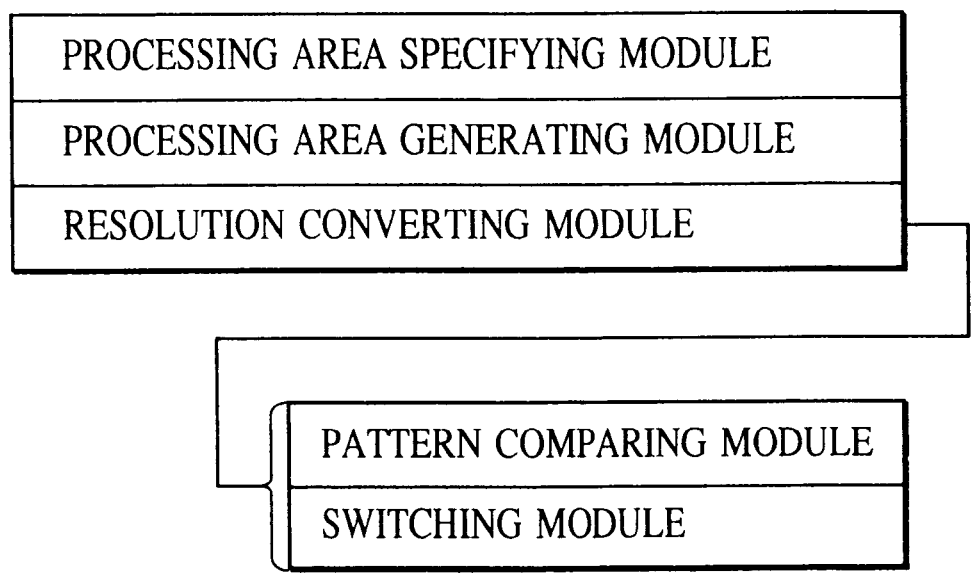
FIG. 34 is a schematic diagram illustrating various program modules of still another program stored in a storage medium according to the present invention.
Figure 35A:
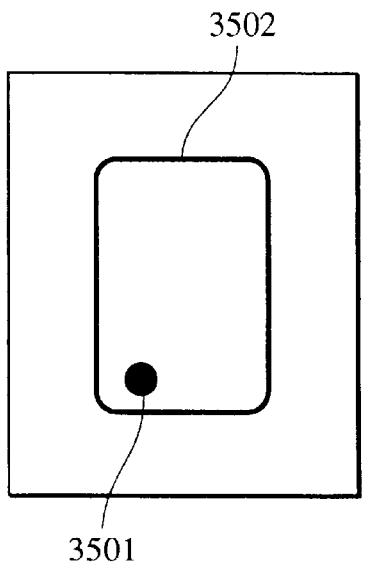
FIGS. 35 A&B are schematic diagrams illustrating the process of printing an image for an area specified by a point drawn on a document with a marker.
Figure 35B:
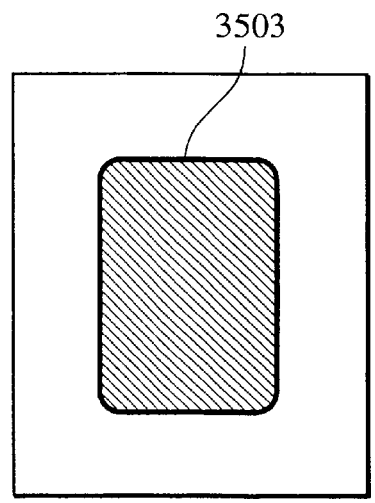

FIG. 34 illustrates still another storage medium, different from those shown in FIGS. 32 and 33, for storing a program for controlling the image processing apparatus for performing an image editing process, wherein the program includes at least a processing area specifying module, a processing area generating module, a resolution converting module, and a switching module.

The processing area specifying module is a program module for specifying an image processing area. The processing area generating module is a program module for generating an image processing area in accordance with the input of the processing area specifying module. The resolution converting module is a program module for converting the resolution of the output signal generated by the processing area generating module to a value higher than that of the input signal of the processing area specifying module. The resolution converting module includes a pattern comparing module for comparing the shape of a part of the area generated by the processing area generating module with a plurality of shape patterns; and a resolution switching module for switching the conversion mode of the resolution converting module in accordance with the comparison result given by the pattern comparing module. The switching module is a program module for switching whether the image signal is used or not in accordance with the processing area specifying mode specified by the processing area specifying module. The comparing process performed by the pattern comparing module uses an image signal.

According to the above-described method and apparatus for processing an image, an edit area signal output from the memory is subjected to interpolation with reference to the edit area signal associated with neighboring pixels and with reference to the original image data thereby reducing gaps (white gaps) between the boundary line and the edit area without increasing the required memory capacity.

Although the present invention is described above with reference to some specific embodiments, the invention is not limited to the these embodiments. Various modifications may be made without departing from the spirit and scope of the invention as defined by the appended claims.

What is claimed is:

1. A method of processing an image, comprising:
 a document scanning step of scanning a document thereby obtaining image data;
 a data extracting step of extracting first data used to specify an image edit area and second data representing the boundary line of the image edit area from the document image data obtained in said document scanning step;
 a first data storing step of storing the second data, which is output in said data extracting step;
 a data compression step of compressing the first and second data extracted in said data extracting step thereby generating first and second compressed data, respectively;
 a second data storing step of storing the first and second compressed data generated in said data compression step;
 a data expanding step of expanding the first compressed data stored in said second data storing step with reference to the second compressed data stored in said second data storing step, thereby generating first expanded data;
 an edit area determining step of determining an edit area with reference to the second data stored in said first storing step and the first expanded data generated in said data expanding step; and
 an image editing step of performing a predetermined editing process on the document image data in the edit area determined in said edit area determining step.

2. A method of processing an image, according to claim 1, wherein the first data specifying the image edit area is the document image data representing a mark drawn on the document.

3. A method of processing an image, according to claim 2, wherein the mark is a point drawn on the document.

4. A method of processing an image, according to claim 1, wherein said data expanding step expands the first compressed data to the boundary line represented by the second compressed data.

5. A method of processing an image, according to claim 1, wherein said edit area determining step determines the edit area by performing an interpolation precessing on the expanded first data.

6. A method of processing an image, according to claim 5, wherein said edit area determining step outputs edit signal based on the determined edit area and said image editing step performs the predetermined editing process in accordance with the edit signal output in said area determining step.

7. A method of processing an image, according to claim 1, wherein said document scanning step obtains color image data representing color images of the document.

8. A method of processing an image, according to claim 7, wherein said data extracting step extracts the first and second data from the color image data obtained in said document scanning step.

9. An apparatus for processing an image, comprising:
 document scanning means for scanning a document, thereby obtaining document image data;
 data extracting means for extracting first data used to specify an image edit area and second data representing the boundary line of the image edit area from the document image data obtained by said document scanning means;
 first data storing means for storing the second data extracted by said data extracting means;
 data compression means for compressing the first and second data extracted by said data extracting means thereby generating first and second compressed data, respectively;
 second data storing means for storing the first and second compressed data generated by said data compression means;
 data expanding means for expanding the first compressed data stored in said second data storing means with reference to the second compressed data stored in said second data storing means thereby generating first expanded data;
 edit area determining means for determining an edit area with reference to the second data stored in said first data storing means and the first expanded data generated by said data expanding means; and
 image editing means for performing a predetermined editing process on the document image data in the edit area determined by said edit area determining means.

10. An apparatus for processing an image, according to claim 9, wherein the first data specifying the image edit area is the document image data representing a mark drawn on the document.

11. An apparatus for processing an image, according to claim 10, wherein the mark is a point drawn on the document.

12. An apparatus for processing an image, according to claim 9, wherein said data expanding means expands the first compressed data to the boundary line represented by the second compressed data.

13. An apparatus for processing an image, according to claim 9, wherein said edit area determining means determines the edit area by performing an interpolation processing on the expanded first data.

14. An apparatus for processing an image, according to claim 13, wherein said edit area determining means outputs edit signals based on the determined edit area and said image editing means performs the predetermined editing process in accordance with the edit signals output from said area determining means.

15. An apparatus for processing an image, according to claim 9, wherein said document scanning means obtains color image data representing color images of the document.

16. An apparatus for processing an image, according to claim 15, wherein said data extracting means extracts the first and second data from the color image data obtained by said document scanning means.

17. A storage medium for storing a program for controlling an image processing apparatus for performing an image editing process on document image data, said storage medium storing a program including:
 a data extracting module for extracting first data used to specify an image edit area and second data representing the boundary line of the image edit area from the document image data;
 a first data storing module for storing the second data extracted by said data extracting module;

a data compression module for compressing the first and second data extracted by said data extracting module thereby generating first and second compressed data, respectively;

a second data storing module for storing the first and second compressed data generated by said data compression module;

a data expanding module for expanding the first compressed data stored by said second data storing module with reference to the second compressed data stored by said second data storing module;

an edit area determining module for determining an edit area with reference to the second data stored by said first data storing module and the first expanded data generated by said data expanding module; and an image editing module for performing a predetermined editing process on the document image data in the edit area determined by said edit area determining module.

18. A storage medium according to claim 17, wherein the first data specifying the image edit area is the document image data representing a mark drawn on a document.

19. A storage medium according to claim 18, wherein the mark is a point drawn on the document.

20. A storage medium according to claim 17, wherein said data expanding module expands the first compressed data to the boundary line represented by the second compressed data.

21. A storage medium according to claim 17, wherein said edit area determining module determines the edit area by performing an interpolation processing on the expanded first data.

22. A storage medium according to claim 21, wherein said edit area determining module outputs edit signals based on the determined edit area and said image editing module performs the predetermined editing process in accordance with the edit signals output by said edit area determining module.

23. A storage medium according to claim 17, further comprising a document scanning module for scanning a document thereby obtaining color image data representing color images of the document.

24. A storage medium according to claim 23, wherein said data extracting module extracts the first and second data from the color image data obtained by said document scanning module.

* * * * *

UNITED STATES PATENT AND TRADEMARK OFFICE
CERTIFICATE OF CORRECTION

PATENT NO. : 6,108,459
DATED : August 22, 2000
INVENTOR(S) : Tsuji et al.

It is certified that error appears in the above-identified patent and that said Letters Patent is hereby corrected as shown below:

Column 2
Line 40, "39011" should read --39011--; and
Line 54, "3905 a" should read --3905--.

Column 5
Line 29, "performing" should read --performing an--;
Line 50, "diagrams" should read --diagram--;
Line 50, "constructions' should read --construction--;
Line 54, "diagrams" should read --diagram--; and
Line 54, "constructions" should read --construction--.

Column 6
Line 8, "illustrates" should read --illustrate-- and
Line 11, "and" should read --an--.

Column 11
Line 46, "the" (second occrrence) should read --such a--.

Column 12
Line 46, "directionx3" should read --direction x 3--; and
Line 60, "directionx3" should read --direction x 3--.

UNITED STATES PATENT AND TRADEMARK OFFICE
CERTIFICATE OF CORRECTION

| | |
|---|---|
| PATENT NO. : 6,108,459 | |
| DATED : August 22, 2000 | |
| INVENTOR(S) : Tsuji et al. | |

It is certified that error appears in the above-identified patent and that said Letters Patent is hereby corrected as shown below:

Column 21
Line 6, "directionx4" should read --direction x 3--.

Column 27
Line 21, "(Fig. 26g)" should read --(Fig. 26g).--.

Column 28
Line 37, "as case." should read --a case--.

Column 29
Line 30, "directionx3" should read --direction x 3--; and
Line 45, "directionx3" should read --direction x 3--.

Column 31
Line 44, "by-the" should read --by the--.

Signed and Sealed this

Twelfth Day of June, 2001

*Attest:*

Nicholas P. Godici

*Attesting Officer*

NICHOLAS P. GODICI
*Acting Director of the United States Patent and Trademark Office*